(12) United States Patent
Nakai et al.

(10) Patent No.: US 10,969,003 B2
(45) Date of Patent: Apr. 6, 2021

(54) OPERATION DEVICE AND WORK VEHICLE

(71) Applicant: KUBOTA CORPORATION, Osaka (JP)

(72) Inventors: Koichi Nakai, Sakai (JP); Takashi Kosaki, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 16/804,527

(22) Filed: Feb. 28, 2020

(65) Prior Publication Data

US 2020/0292063 A1 Sep. 17, 2020

(30) Foreign Application Priority Data

Mar. 12, 2019 (JP) ................................ JP2019-44749
Apr. 17, 2019 (JP) ................................ JP2019-78224

(51) Int. Cl.
*F16H 59/10* (2006.01)
*F16H 59/02* (2006.01)

(52) U.S. Cl.
CPC ... *F16H 59/105* (2013.01); *F16H 2059/0295* (2013.01)

(58) Field of Classification Search
CPC .......... F16H 59/02; F16H 59/08; F16H 59/10; F16H 59/105; F16H 2059/0295
See application file for complete search history.

(56) References Cited

U.S. PATENT DOCUMENTS 5,588,514 A 12/1996 Snell
6,155,130 A 12/2000 Oda et al.
9,122,297 B2 * 9/2015 Kameda ................. G05G 5/005
10,371,251 B2 * 8/2019 Meyer .................. F16H 59/0204
10,450,780 B2 * 10/2019 Tomaszewski ......... E05B 81/16
2018/0172140 A1 * 6/2018 Liubakka ................ F16H 59/10

FOREIGN PATENT DOCUMENTS

EP     1 069 011 A2    1/2001
JP    2018188080 A    11/2018

OTHER PUBLICATIONS

European Search Report issued in corresponding European Patent Application No. 20162069.7-1012, dated Jun. 9, 2020 (7 pages).

* cited by examiner

*Primary Examiner* — Adam D Rogers
(74) *Attorney, Agent, or Firm* — Buchanan Ingersoll & Rooney PC

(57) ABSTRACT

An operation lever is rotatable in a vertical rotation direction about a vertical rotation shaft and rotatable in a front-rear rotation direction about a front-rear rotation shaft non-parallel to the vertical rotation shaft. An urging portion urges the operation lever to move to a predetermined initial position. A neutral cam portion rotates following a rotation of the operation lever in the vertical rotation direction; a forward/backward cam portion rotates following a rotation of the operation lever in the front-rear rotation direction; a neutral switch portion is pressed by the neutral cam portion and detects the pressing in a state where the neutral cam portion is rotated to a neutral pressing position; and a forward/backward switch portion is pressed by the forward/backward cam portion and detects the pressing in a state where the forward/backward cam portion is rotated to a forward pressing position or a backward pressing position.

19 Claims, 31 Drawing Sheets

Fig. 18
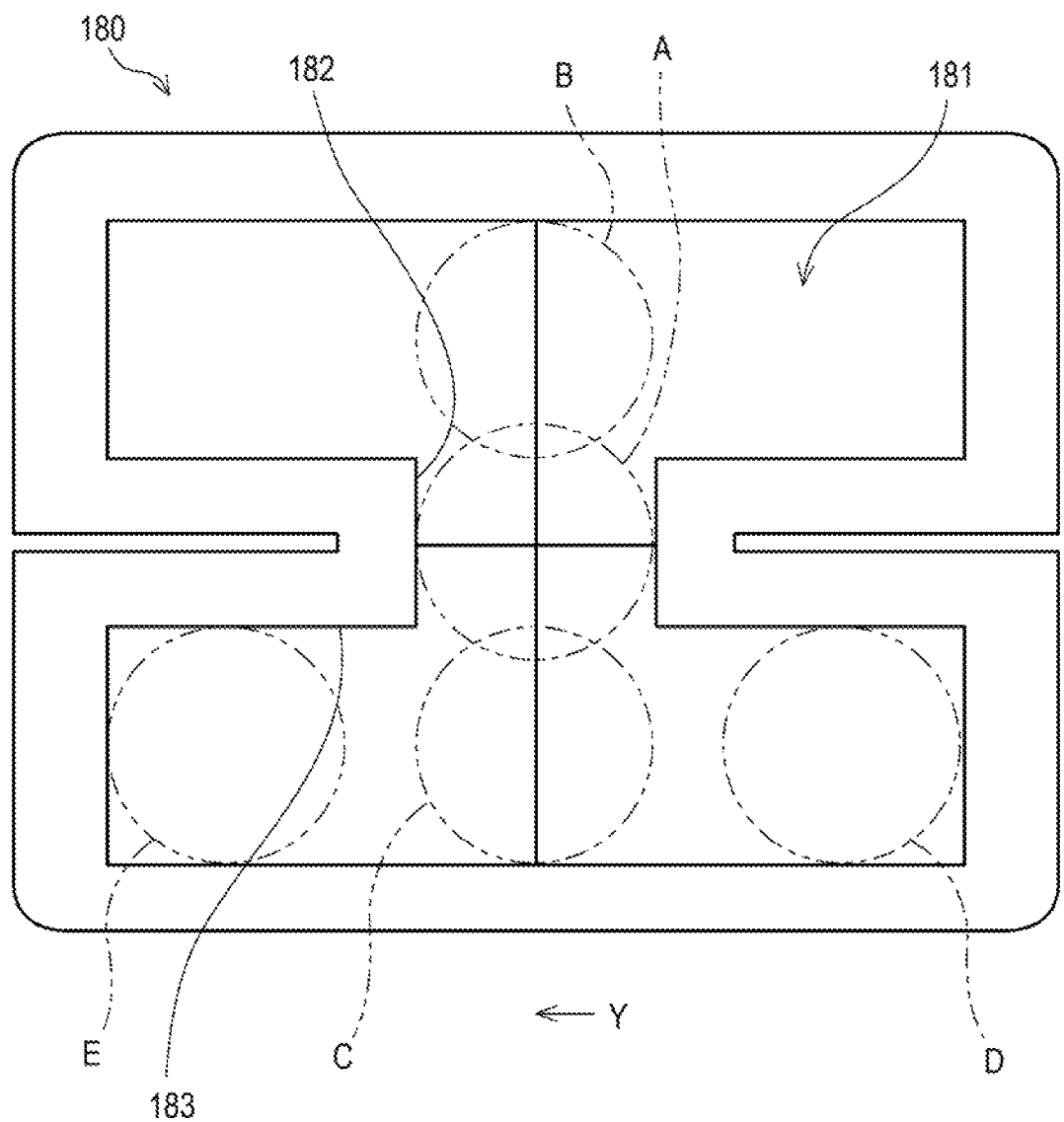
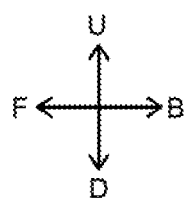

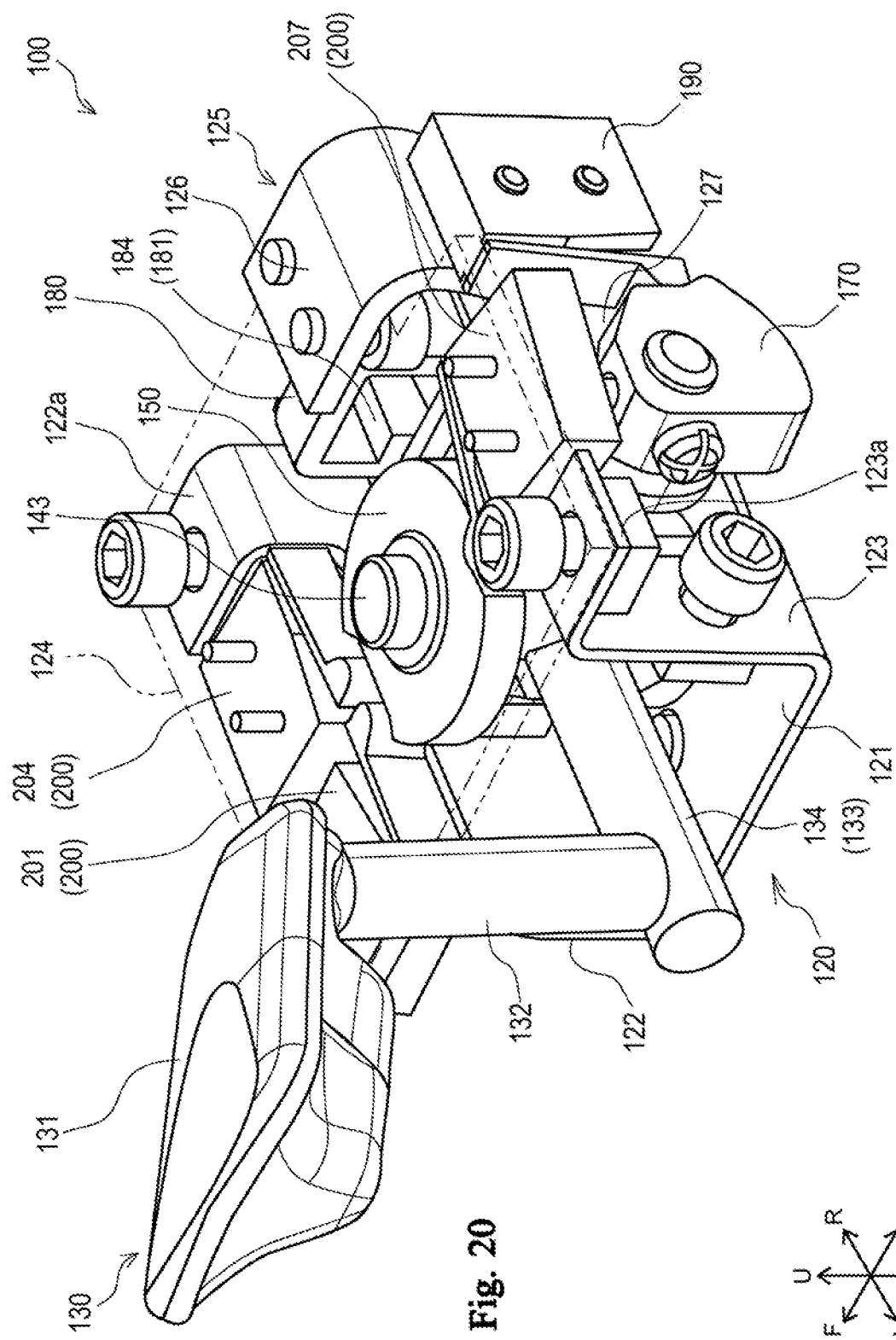
Fig. 20
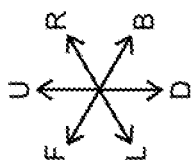

OPERATION DEVICE AND WORK VEHICLE

TECHNICAL FIELD

The disclosure relates to a technique of an operation device and a work vehicle.

BACKGROUND ART

Conventionally, a technique of an operation device capable of switching a transmission of a work vehicle is known. For example, the technique is described in JP 2005-343220 A.

JP 2018-188080 A describes a shift operation device capable of performing an operation of switching a transmission mechanism of a tractor among forward, reverse, and neutral. The shift operation device is capable of switching a transmission by moving an operation tool to a desired shift position.

In the shift operation device described in JP 2018-188080 A, after the operation tool is moved to the desired shift position, the operation tool is held in a state where the operation tool is positioned at the desired shift position.

Here, in a tractor, a configuration in which a plurality of shift operation devices are provided in a driver's seat is conceivable. In this case, in the configuration in which the operation tool is held at the desired shift position as in the shift operation device described in JP 2018-188080 A, in a case where the transmission mechanism is switched based on an operation of another shift operation device, there is a possibility that the operation may be complicated among a plurality of shift operation devices. Therefore, improvement in operability has been demanded.

SUMMARY OF INVENTION

The disclosure has been made in view of the above situation, and the object of the disclosure is to provide an operation device and a work vehicle that can suitably operate switching of a transmission of a work vehicle.

The problem to be solved by the disclosure is as described above. Next, a unit for solving the problem will be described.

An operation device of the disclosure is capable of switching operation of a transmission of a work vehicle. The operation device includes: an operation lever that is rotatable in a first rotation direction about a first rotation shaft and rotatable in a second rotation direction about a second rotation shaft non-parallel to the first rotation shaft; an urging portion that urges the operation lever to move to a predetermined initial position; a first cam portion that rotates following a rotation of the operation lever in the first rotation direction; a second cam portion that rotates following a rotation of the operation lever in the second rotation direction; a first switch portion that is pressed by the first cam portion and detects the pressing in a state where the first cam portion is rotated to a predetermined position; and a second switch portion that is pressed by the second cam portion and detects the pressing in a state where the second cam portion is rotated to a predetermined position.

The operation device of the disclosure further includes: a first transmission portion that transmits the rotation of the operation lever in the first rotation direction to the first cam portion and does not transmit the rotation of the operation lever in the second rotation direction to the first cam portion.

In the operation device of the disclosure, the first transmission portion includes a first receiving portion that moves following the rotation of the operation lever by receiving a force due to the rotation of the operation lever in the first rotation direction and does not receive a force due to the rotation of the operation lever in the second rotation direction, and a first cam portion fixing portion that is rotatably supported with a movement of the first receiving portion and to which the first cam portion is fixed.

The operation device of the disclosure further includes: a second transmission portion that transmits the rotation of the operation lever in the second rotation direction to the second cam portion and does not transmit the rotation of the operation lever in the first rotation direction to the second cam portion.

In the operation device of the disclosure, the second transmission portion includes a second receiving portion that moves following the rotation of the operation lever by receiving a force due to the rotation of the operation lever in the second rotation direction and supports the operation lever to be rotatable in the first rotation direction, and a second cam portion fixing portion that is rotatably supported with a movement of the second receiving portion and to which the second cam portion is fixed.

In the operation device of the disclosure, the second switch portion includes a first cam position detection switch portion that detects pressing by the second cam portion rotated to a first cam position, a second cam position detection switch portion that detects pressing by the second cam portion rotated to a second cam position, and a common switch portion that detects pressing by the second cam portion rotated to the first cam position and pressing by the second cam portion rotated to the second cam position.

In the operation device of the disclosure, the second cam portion includes a first pressing portion that presses the first cam position detection switch portion, a second pressing portion that presses the second cam position detection switch portion, and a recess that is formed between the first pressing portion and the second pressing portion and avoids contact with the first cam position detection switch portion and the second cam position detection switch portion in a state where the operation lever is positioned at the initial position.

In the operation device of the disclosure, the operation lever is displaceable to a first position positioned on one side in the first rotation direction from the initial position, a rotation allowable position that is positioned on another side in the first rotation direction from the initial position and in which rotation about the second rotation shaft is possible, a second position that is positioned on one side in the second rotation direction from the rotation allowable position, and a third position that is positioned on another side in the second rotation direction from the rotation allowable position. The first switch portion detects pressing of the first cam portion in a state where the operation lever is positioned at the first position. The second switch portion detects pressing of the second cam portion in a state where the operation lever is positioned at the second position and pressing of the second cam portion in a state where the operation lever is positioned at the third position.

The operation device of the disclosure further includes: a control device capable of executing a control for switching the transmission among a neutral state, a forward state, and a backward state. The control device sets the transmission to the neutral state based on detection of the pressing of the first cam portion in a state where the operation lever is positioned at the first position, the transmission to the forward state based on detection of the pressing of the second cam portion in a state where the operation lever is positioned at the second position, and the transmission to the backward state based on detection of the pressing of the second cam portion in a state where the operation lever is positioned at the third position.

In the operation device of the disclosure, the operation lever is rotatable about the second rotation shaft at a position different from the rotation allowable position.

In the operation device of the disclosure, the operation lever is movable to a plurality of operation positions. The operation device further includes: a movement holding portion that moves the operation lever to the initial position when the operation lever is positioned at a first operation position among the plurality of operation positions and holds the operation lever in a state where the operation lever is positioned at a second operation position when the operation lever is positioned at the second operation position.

In the operation device of the disclosure, the movement holding portion includes an extendable portion that is provided on the operation lever and is expandable, and a recess that receives a tip portion of the extendable portion in an extension direction. The urging portion urges the extendable portion to extend such that the tip portion in the extension direction abuts on the recess. The recess includes a first inclined portion that guides the extendable portion such that the operation lever positioned at the first operation position is moved to the initial position, and a second inclined portion that guides the extendable portion such that the operation lever positioned at the second operation position is held at the second operation position.

In the operation device of the disclosure, the recess guides a movement of the operation lever to the plurality of operation positions.

The operation device of the disclosure further includes: a control device capable of executing a control for switching the transmission between a predetermined shift state and a parking state. The control device sets the transmission to the shift state based on a movement of the operation lever to the first operation position, and the transmission to the parking state based on a movement of the operation lever to the second operation position.

In the operation device of the disclosure, the shift state includes a neutral state, a forward state, and a backward state. The first operation position includes a neutral position, a forward position, and a backward position. The control device sets the transmission to the neutral state based on a movement of the operation lever to the neutral position, the transmission to the forward state based on a movement of the operation lever to the forward position, and the transmission to the backward state based on a movement of the operation lever to the backward position.

In the operation device of the disclosure, the operation lever is at a position rotated from the initial position to one side in the first rotation direction and is movable to a rotation allowable position where rotation about the second rotation shaft is possible. The forward position is a position rotated from the rotation allowable position to one side in the second rotation direction, the backward position is a position rotated from the rotation allowable position to another side in the second rotation direction, the neutral position is a position rotated from the initial position to another side in the first rotation direction, and a position where rotation about the second rotation shaft is possible, and the second operation position is a position rotated from the neutral position to the one side or the other side in the second rotation direction.

The operation device of the disclosure further includes: a first transmission portion that transmits the rotation of the operation lever in the first rotation direction to the first cam portion and does not transmit the rotation of the operation lever in the second rotation direction to the first cam portion.

The operation device of the disclosure further includes: a second transmission portion that transmits the rotation of the operation lever in the second rotation direction to the second cam portion and does not transmit the rotation of the operation lever in the first rotation direction to the second cam portion.

A work vehicle of the disclosure includes the operation device as described herein.

The disclosure has the following effects.

In the operation device of the disclosure, switching of the transmission of the work vehicle can be operated suitably.

In the operation device of the disclosure, the first cam portion is prevented from following the rotation of the operation lever in the second rotation direction, and thus the unintended contact of the first switch portion accompanying the rotation of the operation lever in the second rotation direction can be suppressed.

In the operation device of the disclosure, the first transmission portion is rotated following the rotation of the operation lever in the first rotation direction, and thus the first cam portion can be rotated but not affected by the rotation of the operation lever in the second rotation direction.

In the operation device of the disclosure, the second cam portion is prevented from following the rotation of the operation lever in the first rotation direction, and thus the unintended contact of the second switch portion accompanying the rotation of the operation lever in the first rotation direction can be suppressed.

In the operation device of the disclosure, the second transmission portion is rotated following the rotation of the operation lever in the second rotation direction, and thus the second cam portion can be rotated but not affected by the rotation of the operation lever in the first rotation direction.

In the operation device of the disclosure, a malfunction of the switch can be detected.

In the operation device of the disclosure, the common recess for avoiding contact with the first cam position detection switch portion and the second cam position detection switch portion is provided in the second cam portion, so that the shape of the second cam portion can be simplified.

In the operation device of the disclosure, operability can be improved.

In the operation device of the disclosure, switching among the neutral state, the forward state, and the backward state of the transmission can be operated suitably.

In the operation device of the disclosure, the operation lever can be displaced to a further position in addition to the first position, the second position, and the third position.

In the operation device of the disclosure, operability can be improved.

In the operation device of the disclosure, the operation device can have a relatively simple configuration.

In the operation device of the disclosure, the number of members of the operation device can be relatively reduced.

In the operation device of the disclosure, when the transmission is set to a predetermined shift state, the operation lever returns to the initial position for each operation, and when the transmission is in the parking state, the operation lever can be held in a state where the operation lever is positioned at the second operation position.

In the operation device of the disclosure, for each operation of switching the transmission among the neutral state, the forward state, or the backward state, the operation lever can return to the initial position.

In the operation device of the disclosure, the first cam portion is prevented from following the rotation of the operation lever in the second rotation direction, and thus the unintended contact of the first switch portion accompanying the rotation of the operation lever in the second rotation direction can be suppressed.

In the operation device of the disclosure, the second cam portion is prevented from following the rotation of the operation lever in the first rotation direction, and thus the unintended contact of the second switch portion accompanying the rotation of the operation lever in the first rotation direction can be suppressed.

In the work vehicle of the disclosure, switching of the transmission of the work vehicle can be operated suitably.

BRIEF DESCRIPTION OF DRAWINGS

FIG. 18 is a side view illustrating another example of the regulating portion;

FIG. 20 is a perspective view illustrating an inside of the operation device;

DESCRIPTION OF EMBODIMENT

Figure 1:
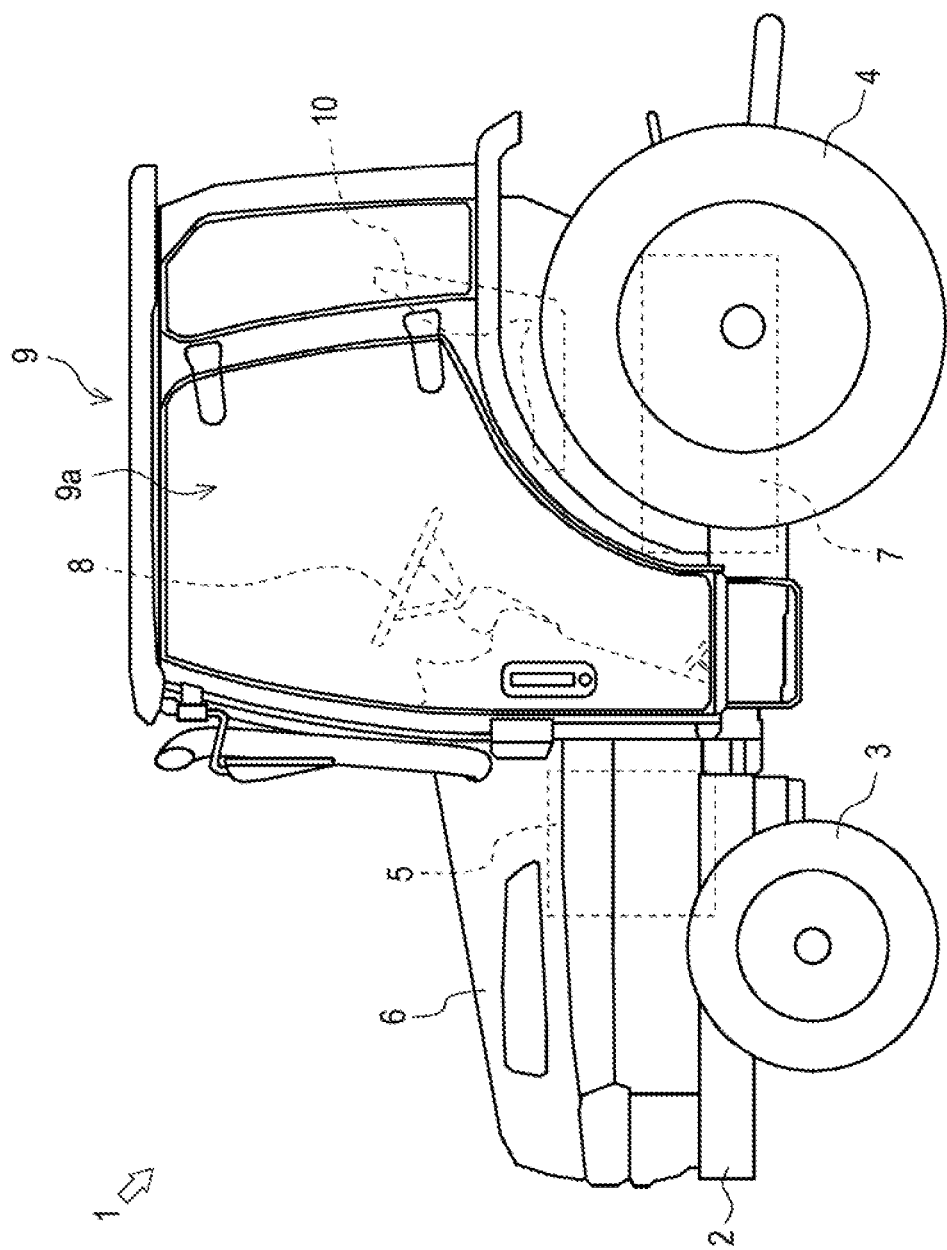
FIG. 1 is a side view illustrating an overall configuration of a tractor according to a first embodiment of the disclosure.

In the following, a description is given with the directions indicated by arrows U, D, F, B, L and R in the drawing defined as upward, downward, forward, backward, leftward and rightward, respectively.

First, the overall configuration of a tractor 1 according to a first embodiment of the disclosure will be described with reference to FIG. 1.

Incidentally, in this embodiment, the tractor 1 is exemplified as a work vehicle, but the disclosure is not limited to this. That is, the work vehicle may be another agricultural vehicle, construction vehicle, industrial vehicle, or the like.

The tractor 1 mainly includes a body frame 2, front wheels 3, rear wheels 4, an engine 5, a hood 6, a transmission 7, a steering 8, a cabin 9, a seat 10, and an operation device 100.

The body frame 2 is disposed with the longitudinal direction extending in a front-rear direction. The front portion of the body frame 2 is supported by a pair of right and left front wheels 3 via a front axle mechanism (not illustrated). The transmission 7 is provided at the rear portion of the body frame 2. The rear portion of the transmission 7 is supported by a pair of right and left rear wheels 4 via a rear axle mechanism (not illustrated). The engine 5 is provided at the front portion of the body frame 2. The engine 5 is covered with the hood 6.

After the power of the engine 5 is shifted by the transmission 7, the power can be transmitted to the front wheels 3 through the front axle mechanism and can be transmitted to the rear wheels 4 through the rear axle mechanism. The front wheel 3 and the rear wheel 4 are driven to rotate by the power of the engine 5, so that the tractor 1 can run.

The cabin 9 is provided at the rear portion of the engine 5. A living space 9a on which a driver boards is formed inside the cabin 9. In the living space 9a, the steering 8, a pedal, the seat 10 on which the driver sits, and the like are disposed. The steering 8 is provided with an operation device 100 capable of switching the transmission 7 (see FIG. 2). An armrest and a side console (not illustrated) provided with a plurality of operation tools are disposed on the right side of the seat 10.

Figure 2:
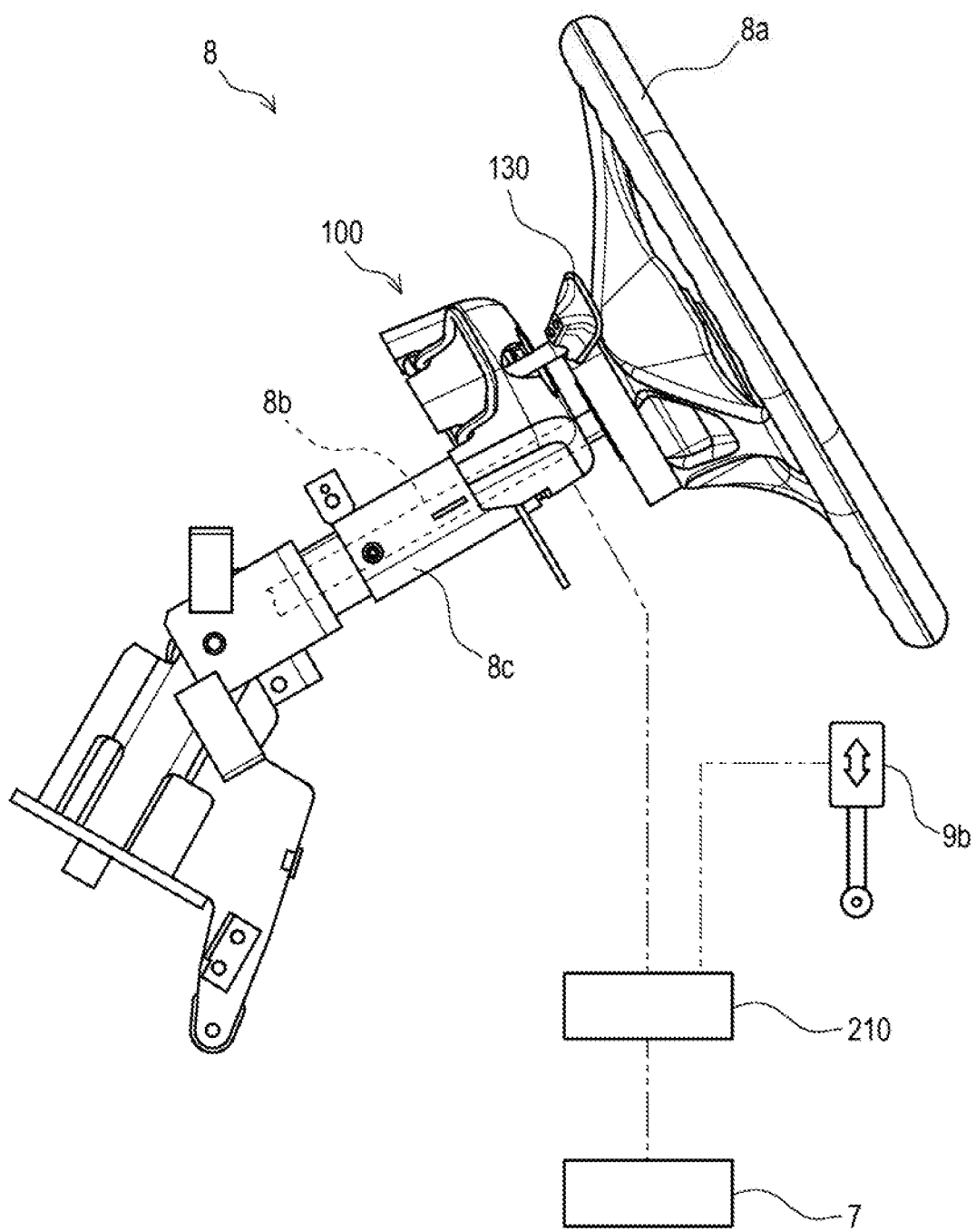
FIG. 2 is a side view illustrating a steering.

In this embodiment, the armrest or the side console is provided with a side operation tool 9b capable of switching the transmission 7 (see FIG. 2). The side operation tool 9b is provided with a predetermined changeover switch (button) capable of switching the transmission 7 between a forward state and a backward state.

Hereinafter, the steering 8 will be described with reference to FIG. 2.

The steering 8 is for adjusting the turning angle of the front wheels 3. The steering 8 includes a steering wheel 8a, a steering shaft 8b, and a steering post 8c.

The steering wheel 8*a* is an operation tool held by the driver. The steering shaft 8*b* supports the steering wheel 8*a*. The steering shaft 8*b* forms a long shaft member. The steering post 8*c* covers the steering shaft 8*b* from the outside in the living space 9*a*.

Hereinafter, the details of the operation device 100 will be described with reference to FIGS. 2 to 17. In the following, the operation device 100 will be described with the axial direction of the steering shaft 8*b* referred to as the "vertical direction" and the direction perpendicular to the "vertical direction" and the right-left direction referred to as the "front-rear direction" for convenience.

The operation device 100 performs an operation of switching the transmission 7 among a forward state, a backward state, and a neutral state. The operation device 100 is provided at the left portion of the steering post 8*c*. The operation device 100 mainly includes a cover portion 110, a base portion 120, an operation lever 130, a frame portion 137, a forward/backward transmission portion 140, a forward/backward cam portion 150, a neutral transmission portion 160, a neutral cam portion 170, a regulating portion 180, a neutral switch portion 190, a forward/backward switch portion 200, and a control device 210.

Figure 3:
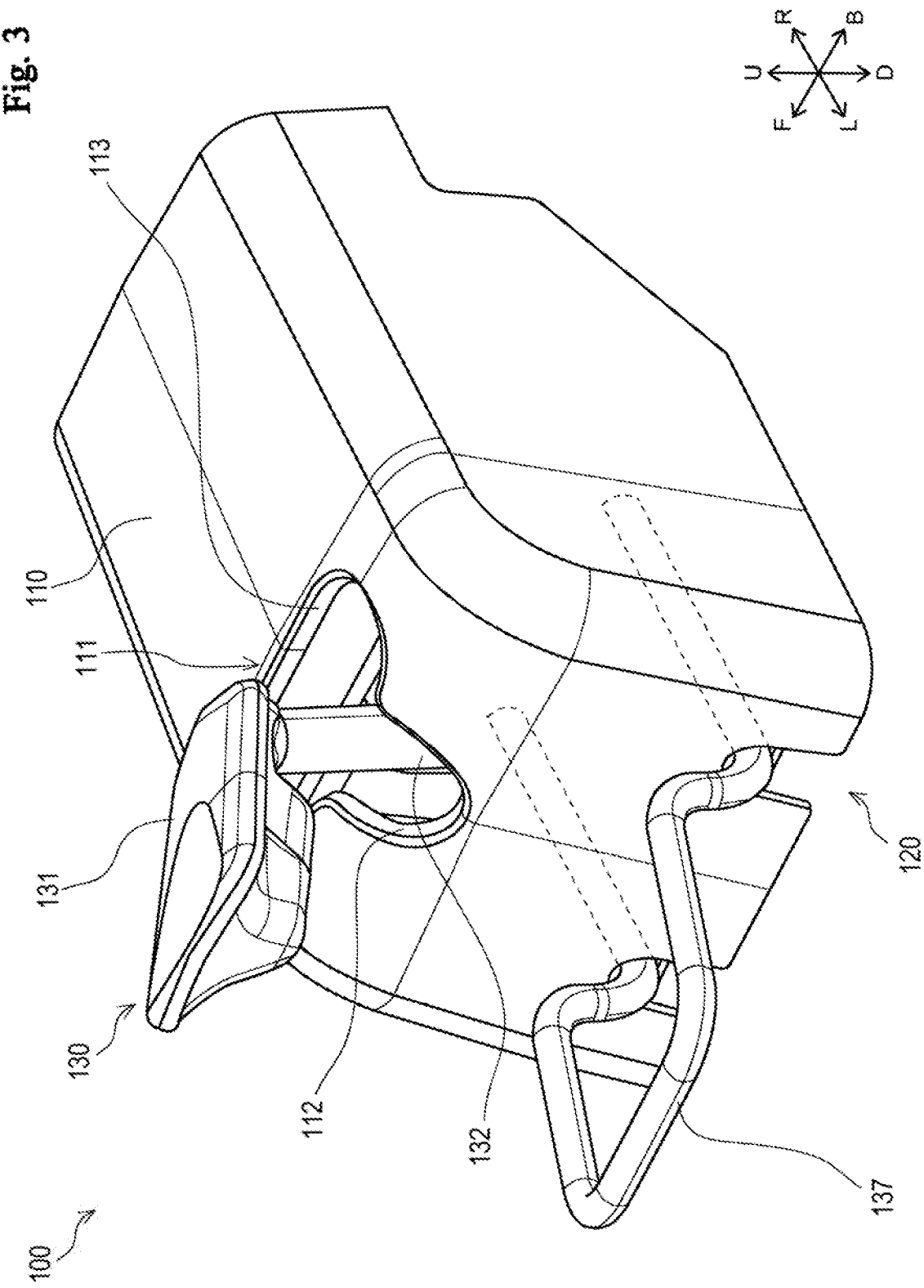
FIG. 3 is a perspective view illustrating an operation device.

The cover portion 110 illustrated in FIG. 3 forms the outline of the operation device 100. The cover portion 110 covers the base portion 120 described later and various members mounted on the base portion 120. The cover portion 110 has a substantially rectangular parallelepiped box shape that opens to a lower side and a right side. The cover portion 110 includes a guide portion 111.

The guide portion 111 guides the operation lever 130 described later. The guide portion 111 forms a hole that penetrates the cover portion 110 in a thickness direction. The guide portion 111 is provided at a corner between the upper surface and the left surface of the cover portion 110. The guide portion 111 has a substantially T-shape in plan view (when viewed in the vertical direction). The guide portion 111 includes a vertical guide portion 112 and a front-rear guide portion 113.

The vertical guide portion 112 is a portion extending substantially in the vertical direction (obliquely lower left direction). The vertical guide portion 112 forms the left portion of the guide portion 111.

The front-rear guide portion 113 is a portion extending in the front-rear direction. The front-rear guide portion 113 forms the right portion of the guide portion 111. The central portion of the front-rear guide portion 113 in the front-rear direction communicates with the upper portion of the vertical guide portion 112.

Figure 4:
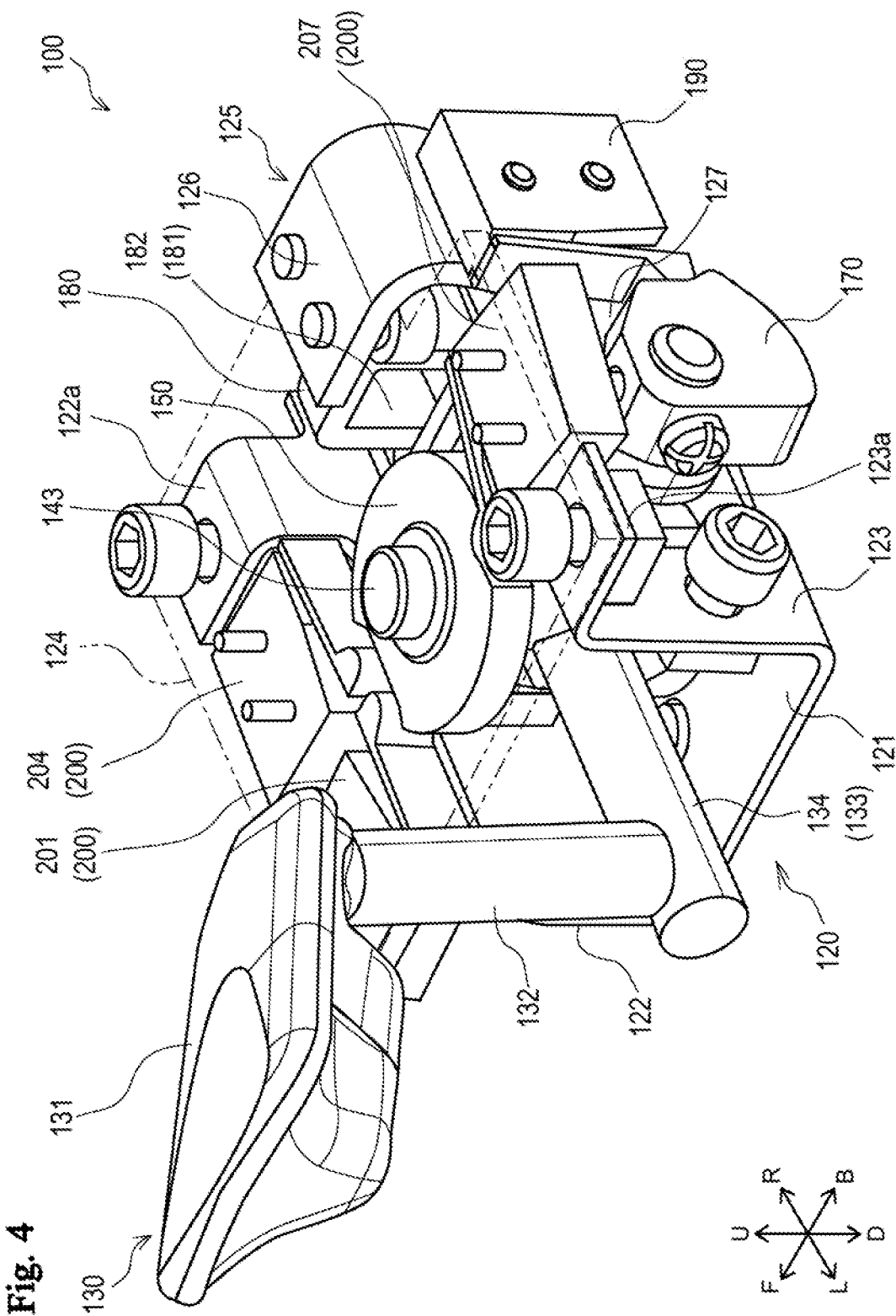
FIG. 4 is a perspective view illustrating an inside of the operation device.
Figure 5:
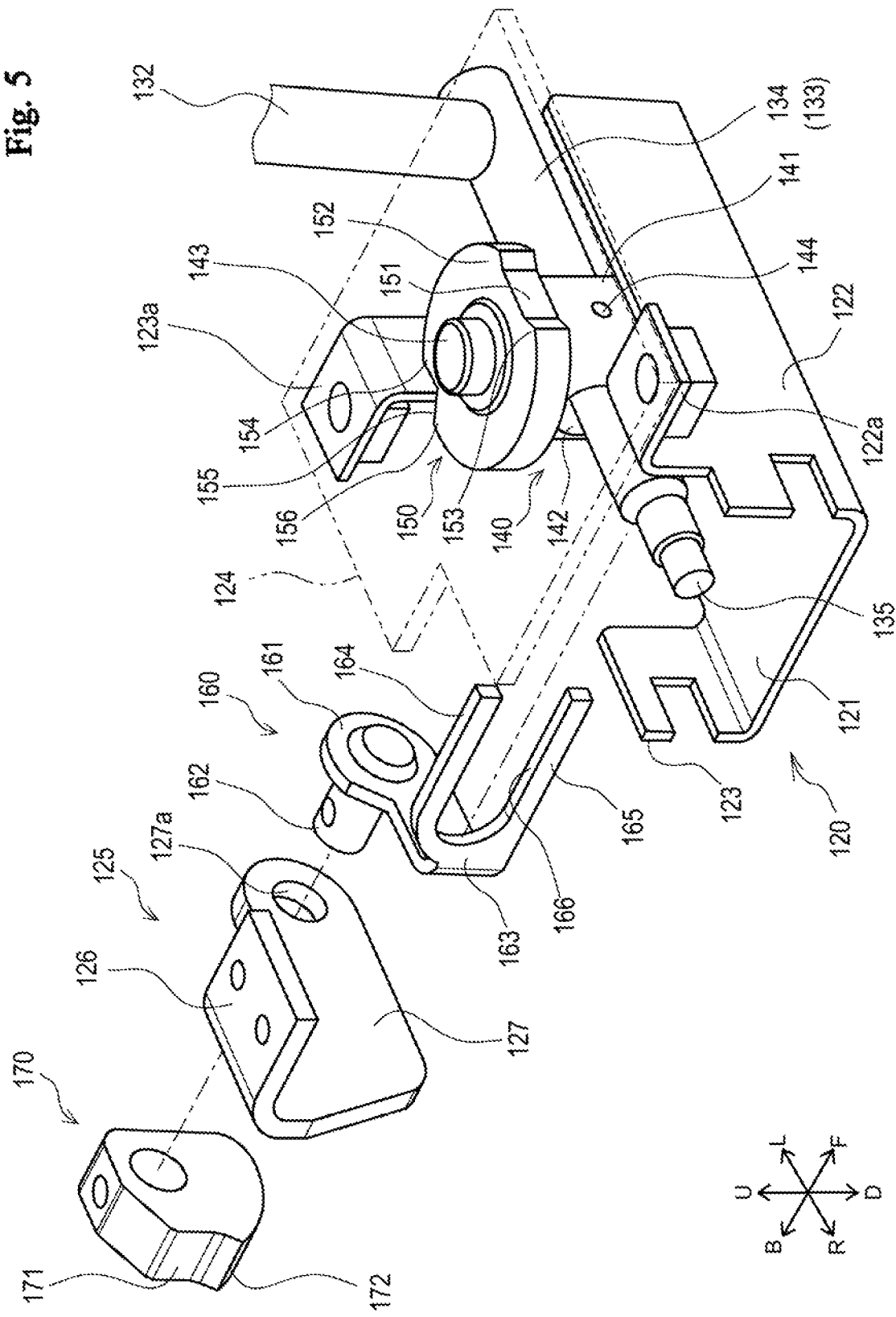
FIG. 5 is an exploded perspective view illustrating the inside of the operation device.

The base portion 120 illustrated in FIGS. 4 and 5 is mounted with the operation lever 130, the forward/backward transmission portion 140, the neutral transmission portion 160, and the like which will be described later. The base portion 120 is fixed to the steering post 8*c* through a predetermined fixing tool. The base portion 120 includes a bottom plate portion 121, a first side plate portion 122, a second side plate portion 123, a top plate portion 124, and a support portion 125.

The bottom plate portion 121 forms the bottom portion of the base portion 120. The bottom plate portion 121 has a plate shape with the thickness direction extending in the vertical direction. The bottom plate portion 121 has a substantially rectangular shape in plan view.

The first side plate portion 122 forms the front portion of the base portion 120. The first side plate portion 122 is formed to rise from the front end portion of the bottom plate portion 121. The first side plate portion 122 has a plate shape with the thickness direction extending in the front-rear direction. A fixing portion 122*a* is formed at the upper right end portion of the first side plate portion 122.

The fixing portion 122*a* is a portion for fixing the top plate portion 124 described later. The fixing portion 122*a* has a plate shape with the thickness direction extending in the vertical direction. A hole penetrating in the vertical direction is formed in the fixing portion 122*a*. A nut communicating with the hole is provided on the lower surface of the fixing portion 122*a*.

The second side plate portion 123 forms the rear portion of the base portion 120. The second side plate portion 123 is formed to rise from the rear end portion of the bottom plate portion 121. The second side plate portion 123 has a plate shape with the thickness direction extending in the front-rear direction. In the second side plate portion 123, a middle portion in the right-left direction is cut out substantially over the whole in the vertical direction. A fixing portion 123*a* is formed at the upper left end portion of the second side plate portion 123.

The fixing portion 123*a* is a portion for fixing the top plate portion 124 described later. The fixing portion 123*a* has a plate shape with the thickness direction extending in the vertical direction. The hole penetrating in the vertical direction is formed in the fixing portion 123*a*. A nut communicating with the hole is provided on the lower surface of the fixing portion 123*a*.

The top plate portion 124 forms the top portion of the base portion 120. The top plate portion 124 has a plate shape with the thickness direction extending in the vertical direction. The top plate portion 124 has a shape in which a rear right corner is cut out. In the top plate portion 124, holes corresponding to the fixing portions 122*a* and 123*a* are formed at the front right corner and the rear left corner. When predetermined stoppers such as bolts are inserted into the holes and are fastened to nuts provided on the fixing portion 122*a* and the fixing portion 123*a*, the top plate portion 124 is fixed to the first side plate portion 122 and the second side plate portion 123.

The support portion 125 supports the neutral transmission portion 160 and the neutral switch portion 190 described later. The support portion 125 includes a fixing piece 126 and a support piece 127.

The fixing piece 126 is a portion fixed to the top plate portion 124. The fixing piece 126 has a plate shape with the thickness direction extending in the vertical direction. The fixing piece 126 is fixed to a portion where a notch is formed at the rear right corner of the top plate portion 124. The fixing piece 126 is fixed to the top plate portion 124 through a predetermined stopper in contact with the upper surface of the top plate portion 124.

The support piece 127 is a portion that supports the neutral transmission portion 160 and the neutral switch portion 190 described later. The support piece 127 has a plate shape with the thickness direction extending in the front-rear direction. The support piece 127 has a shape that hangs downward from the rear end portion of the fixing piece 126 and extends leftward. A through hole 127*a* penetrating in the front-rear direction is formed at the left end portion of the support piece 127.

The operation lever 130 illustrated in FIGS. 3 to 6 forms the operation tool in the operation device 100. The operation lever 130 is rotatable with respect to the base portion 120 in a vertical rotation direction about a rotation axis (a vertical rotation shaft portion 144 described later) along the front-rear direction. In addition, the operation lever 130 is rotatable with respect to the base portion 120 in a front-rear rotation direction about a rotation shaft (a front-rear rotation shaft portion 143 described later) along the vertical direction. The operation lever 130 includes a grip portion 131, a first shaft portion 132, and a second shaft portion 133.

The grip portion 131 is a portion that is gripped by the driver. The grip portion 131 has a substantially rectangular shape in plan view.

The first shaft portion 132 is a portion connected to the grip portion 131. The first shaft portion 132 has a shape extending substantially in the vertical direction. The first shaft portion 132 is inserted into the guide portion 111 of the cover portion 110.

The second shaft portion 133 is a portion connected to the first shaft portion 132 and mounted on the base portion 120. The second shaft portion 133 has a shape extending substantially in the right-left direction. The left end portion of the second shaft portion 133 is connected to the lower end portion of the first shaft portion 132. That is, the operation lever 130 has a substantially L-shape. The second shaft portion 133 includes a main body 134, a protrusion 135, and an urging portion 136.

The main body 134 forms most of the second shaft portion 133. The main body 134 has a substantially cylindrical shape that opens to a right side.

The protrusion 135 is housed inside the main body 134 and protrudes to a right side from the right end portion of the main body 134. The protrusion 135 has a substantially cylindrical shape.

Figure 6:
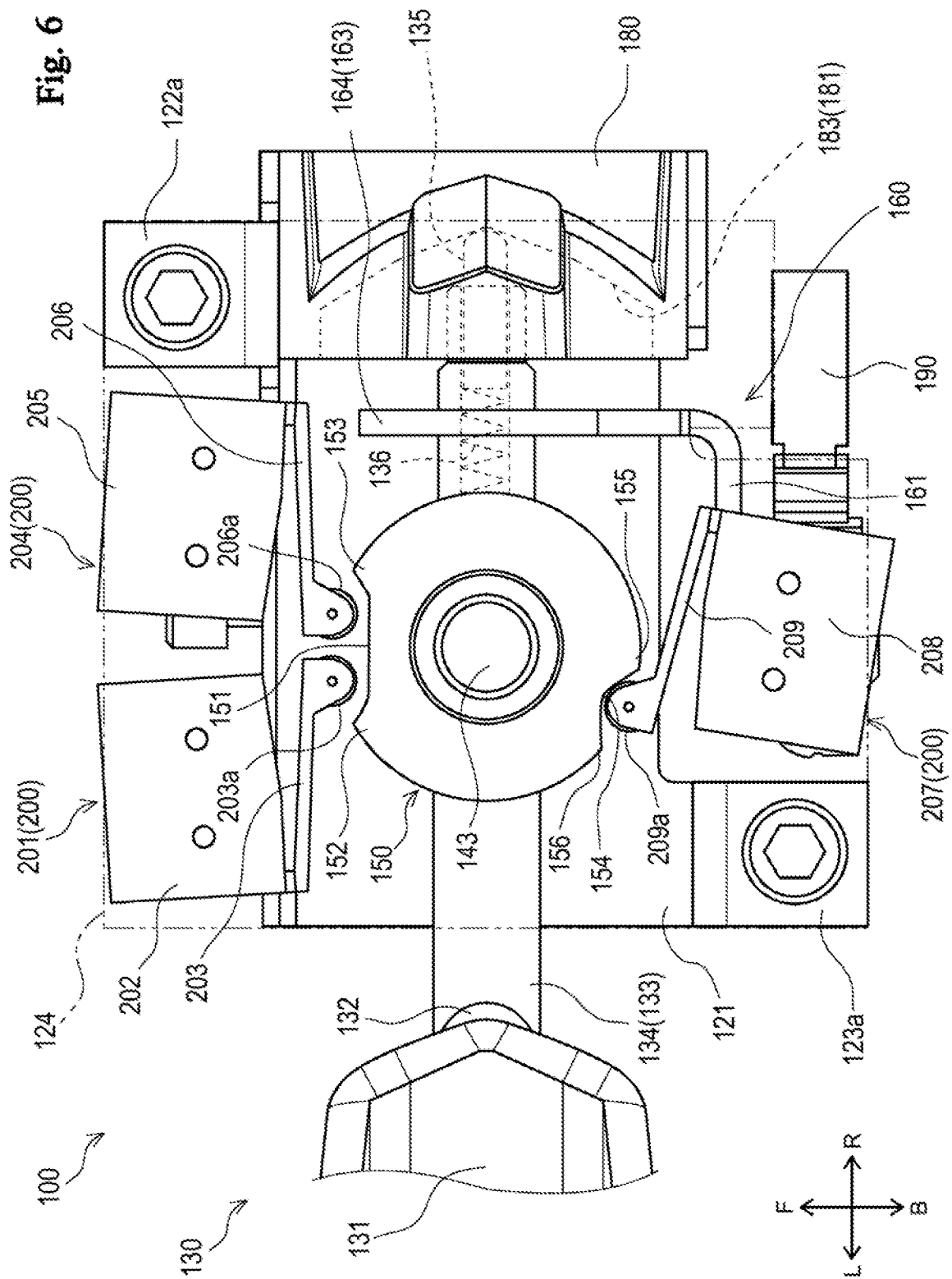
FIG. 6 is a plan view illustrating the operation device in an initial position.

The urging portion 136 illustrated in FIG. 6 is housed inside the main body 134 and urges the protrusion 135 to the right side. As the urging portion 136, for example, a coil spring may be adopted. The urging portion 136 is not limited to the coil spring, and various springs can be used.

The frame portion 137 illustrated in FIG. 3 protrudes to the left side from the left end portions of the cover portion 110 and the base portion 120. The frame portion 137 has a substantially U-shape in plan view. The right end portion of the frame portion 137 that opens in plan view is fixed to the bottom plate portion 121 of the base portion 120. The frame portion 137 is positioned below the operation lever 130 and has a left end portion positioned on the left side from the left end portion of the operation lever 130.

By providing the frame portion 137, the operability of the operation lever 130 can be improved. That is, based on the relative positional relationship between the frame portion 137 and the operation lever 130, the position of the operation lever 130 can be easily grasped. For example, a configuration can be made in which the operation lever 130 can be easily operated without visual inspection. Further, unintended contact with the operation lever 130 from below can be suppressed.

The forward/backward transmission portion 140 illustrated in FIGS. 5 and 7 supports the operation lever 130 rotatably in the vertical rotation direction and the front-rear rotation direction and transmits the rotation of the operation lever 130 in the front-rear rotation direction to the forward/backward cam portion 150 described later. The forward/backward transmission portion 140 includes a main body 141, the front-rear rotation shaft portion 143, and the vertical rotation shaft portion 144.

The main body 141 supports the operation lever 130. The main body 141 is mounted on the bottom plate portion 121 of the base portion 120 through the front-rear rotation shaft portion 143 described later. The main body 141 has a substantially cylindrical shape. The forward/backward cam portion 150 described later is fixed to the upper end portion of the main body 141. A through hole 142 that penetrates in the right-left direction is formed in the main body 141.

The through hole 142 has an elongated hole shape that is long in the vertical direction. The second shaft portion 133 of the operation lever 130 is inserted into the through hole 142.

The front-rear rotation shaft portion 143 is disposed so that the axial direction extends in the vertical direction. The front-rear rotation shaft portion 143 is provided at the central portion of the main body 141 in plan view. The front-rear rotation shaft portions 143 are provided in a pair so as to protrude vertically from an upper end portion (the upper surface of the forward/backward cam portion 150 described later) and the lower end portion of the main body 141. The upper front-rear rotation shaft portion 143 is inserted into a hole penetrating the top plate portion 124 in the vertical direction. Further, the lower front-rear rotation shaft portion 143 is inserted into a hole penetrating the bottom plate portion 121 in the vertical direction. The main body 141 is rotatably supported by the base portion 120 through the front-rear rotation shaft portion 143.

The vertical rotation shaft portion 144 is disposed with the axial direction extending in the front-rear direction. The vertical rotation shaft portion 144 is disposed so as to penetrate the vertically middle portion of the main body 141 and the laterally middle portion of the second shaft portion 133 of the operation lever 130. Accordingly, the second shaft portion 133 is rotatably supported by the main body 141.

With the above configuration, the forward/backward transmission portion 140 can support the operation lever 130 so as to be rotatable in the front-rear rotation direction about the front-rear rotation shaft portion 143 with respect to the base portion 120. In addition, the forward/backward transmission portion 140 can support the operation lever 130 so as to be rotatable in the vertical rotation direction about the vertical rotation shaft portion 144 with respect to the main body 141.

The forward/backward cam portion 150 illustrated in FIGS. 4 to 7 transmits the rotation of the operation lever 130 in the front-rear rotation direction to the forward/backward switch portion 200 described later. The forward/backward cam portion 150 has a plate shape with the thickness direction extending in the vertical direction. The forward/backward cam portion 150 has a substantially circular shape in plan view.

The forward/backward cam portion 150 is fixed to the upper end portion of the main body 141 of the forward/backward transmission portion 140 so as not to rotate. The upper front-rear rotation shaft portion 143 is provided on the upper surface of the forward/backward cam portion 150. In this embodiment, the forward/backward cam portion 150, the main body 141, and the front-rear rotation shaft portion 143 are integrally formed. The configuration is not limited to such a configuration, and the forward/backward cam portion 150, the main body 141, and the front-rear rotation shaft portion 143, which are separately provided, may be combined. The forward/backward cam portion 150 includes a first recess 151, a first forward pressing portion 152, a first backward pressing portion 153, a second recess 154, a second forward pressing portion 155, and a second backward pressing portion 156.

The first recess 151 illustrated in FIG. 6 is a portion obtained by cutting out the front portion of the forward/backward cam portion 150. The first recess 151 is formed so as to be recessed backward in the entire vertical direction of the forward/backward cam portion 150. The first recess 151 can receive a roller portion 203a of the forward switch portion 201 and a roller portion 206a of the backward switch portion 204 which will be described later.

The first forward pressing portion 152 is a portion that presses the forward switch portion 201 described later. The first forward pressing portion 152 is provided on the left side of the first recess 151. The first forward pressing portion 152 has a shape protruding radially outward of the forward/backward cam portion 150 with respect to the bottom surface of the first recess 151 (a surface facing forward in FIG. 6).

The first backward pressing portion 153 is a portion that presses the backward switch portion 204 described later. The first backward pressing portion 153 is provided to the right of the first recess 151. The first backward pressing portion 153 has a shape protruding radially outward of the forward/backward cam portion 150 with respect to the bottom surface of the first recess 151.

In the first forward pressing portion 152 and the first backward pressing portion 153, the surfaces adjacent to the bottom surface of the first recess 151 are formed as inclined surfaces to spread toward each other radially outward of the forward/backward cam portion 150.

The second recess 154 is a portion obtained by cutting out the rear portion of the forward/backward cam portion 150. The second recess 154 is formed so as to be recessed obliquely forward and rightward in the entire vertical direction of the forward/backward cam portion 150. The second recess 154 is capable of receiving a roller portion 209a of a common switch portion 207 described later.

The second forward pressing portion 155 is a portion that presses the common switch portion 207 described later. The second forward pressing portion 155 is provided on the right side of the second recess 154. The second forward pressing portion 155 has a shape protruding radially outward of the forward/backward cam portion 150 with respect to the bottom surface of the second recess 154 (a surface facing an obliquely left rear side in FIG. 6).

The second backward pressing portion 156 is a portion that presses the common switch portion 207 described later. The second backward pressing portion 156 is provided on the left side of the second recess 154. The second backward pressing portion 156 has a shape protruding radially outward of the forward/backward cam portion 150 with respect to the bottom surface of the second recess 154.

In the second forward pressing portion 155 and the second backward pressing portion 156, the surfaces adjacent to the bottom surface of the second recess 154 are formed as inclined surfaces to spread toward each other radially outward of the forward/backward cam portion 150.

The neutral transmission portion 160 illustrated in FIGS. 5 and 7 transmits the rotation of the operation lever 130 in the vertical rotation direction to the neutral cam portion 170 described later. The neutral transmission portion 160 includes a supported piece 161 and a receiving piece 163.

The supported piece 161 is rotatably supported by the support piece 127 of the base portion 120 in the vertical rotation direction. The supported piece 161 has a plate shape with the thickness direction extending in the front-rear direction. The supported piece 161 has a long shape in the right-left direction. The supported piece 161 is disposed along the front surface of the support piece 127. The supported piece 161 includes a rotation shaft portion 162.

The rotation shaft portion 162 is disposed with the axial direction extending in the front-rear direction. The rotation shaft portion 162 is provided so as to protrude rearward from the left end portion on the rear surface of the supported piece 161. The rotation shaft portion 162 is disposed on the same axis as the vertical rotation shaft portion 144 of the forward/backward transmission portion 140. The rotation shaft portion 162 is inserted into the through hole 127a of the support piece 127. Accordingly, the supported piece 161 is pivotally supported by the support piece 127 to be rotatable in the vertical rotation direction.

The receiving piece 163 receives a force due to the rotation of the operation lever 130 in the vertical rotation direction. The receiving piece 163 has a plate shape with the thickness direction extending in the right-left direction. The receiving piece 163 is provided so as to extend forward from the right end portion of the supported piece 161. That is, the neutral transmission portion 160 has a substantially L-shape in plan view. The receiving piece 163 includes an upper piece 164, a lower piece 165, and an escape portion 166.

The upper piece 164 forms the upper portion of the receiving piece 163. The upper piece 164 has a long shape in the right-left direction.

The lower piece 165 forms the lower portion of the receiving piece 163. The upper piece 164 has a long shape in the right-left direction. The lower piece 165 is disposed so as to be vertically separated from the upper piece 164.

The escape portion 166 is a portion obtained by cutting out the portion between the upper piece 164 and the lower piece 165. The escape portion 166 is formed from the front end portion of the receiving piece 163 over the large portion in the front-rear direction. That is, the receiving piece 163 has a substantially U-shape in side view. The vertical dimension of the escape portion 166 is formed larger than the outer diameter dimension of the second shaft portion 133 of the operation lever 130. Accordingly, the escape portion 166 can receive the second shaft portion 133 of the operation lever 130.

Figure 7:
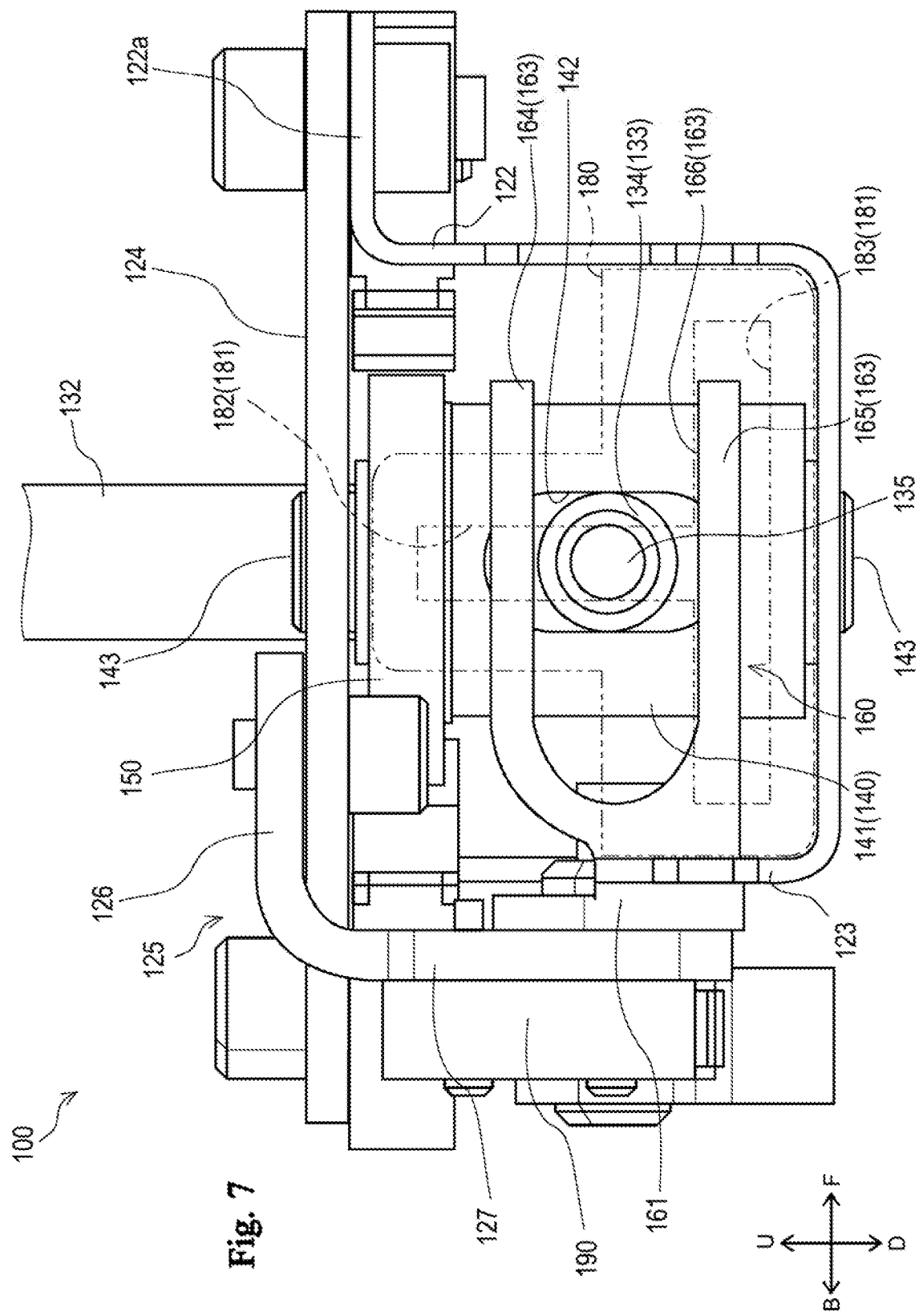
FIG. 7 is a side view illustrating the operation device in the initial position.
Figure 12:
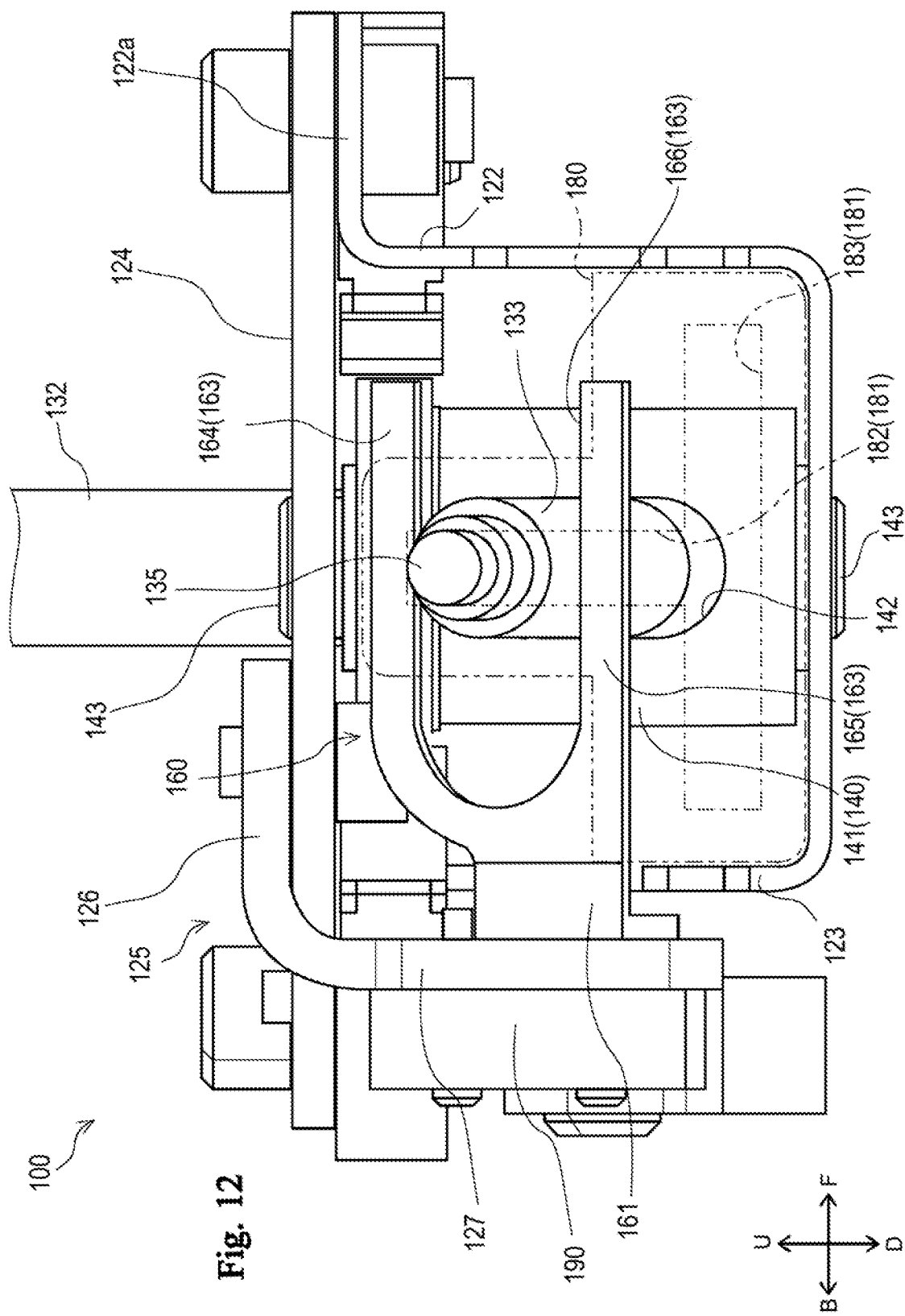
FIG. 12 is a side view illustrating the operation device in the neutral position.
Figure 13:
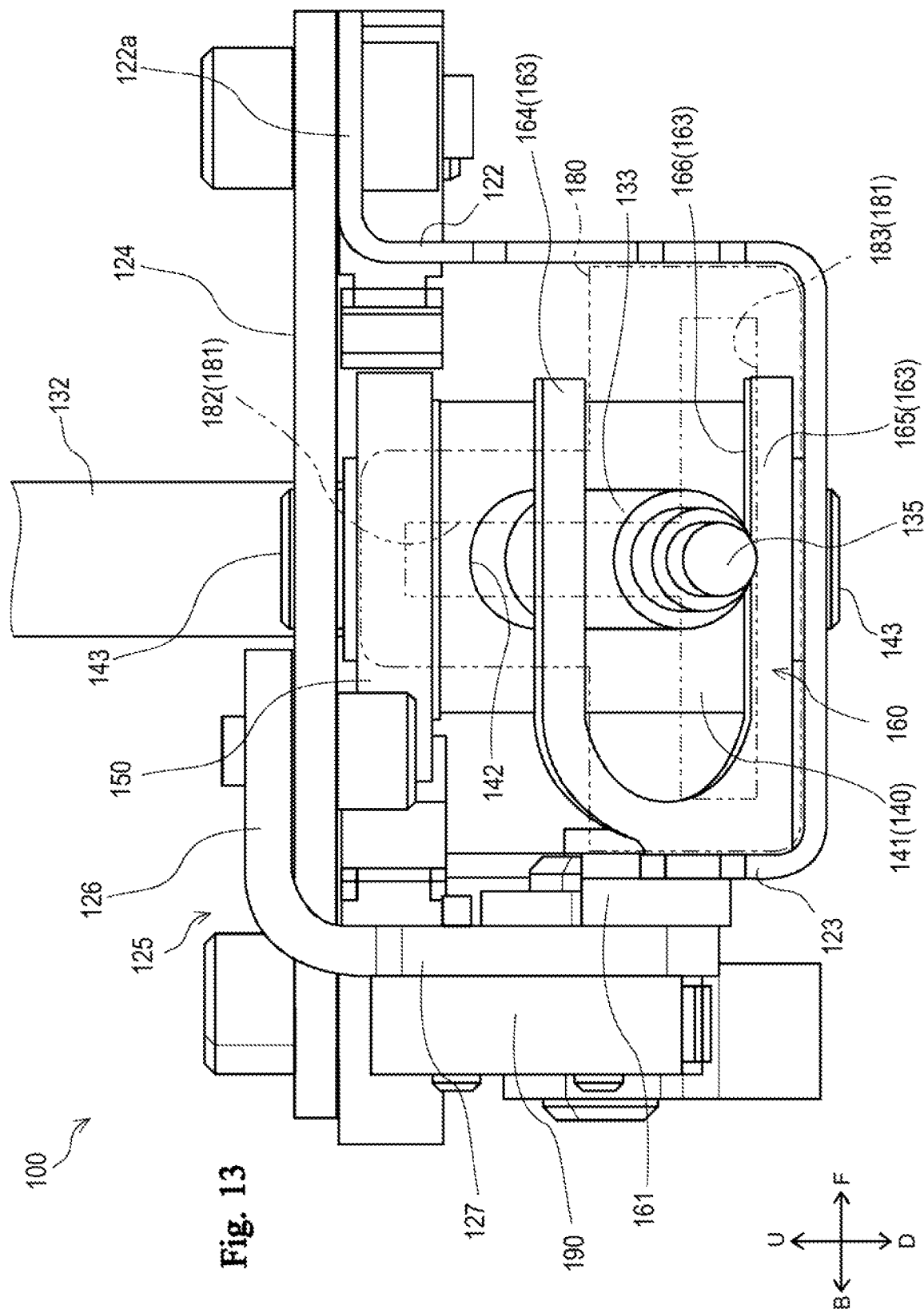
FIG. 13 is a side view illustrating the operation device at a rotation allowable position.

As illustrated in FIG. 7, when the supported piece 161 is supported by the support piece 127, the right portion of the second shaft portion 133 is positioned between the upper piece 164 and the lower piece 165. Therefore, as illustrated in FIGS. 12 and 13, when the operation lever 130 is rotated in the vertical rotation direction, the upper piece 164 or the lower piece 165 receives a force in the vertical rotation direction through the second shaft portion 133. Accordingly, the neutral transmission portion 160 rotates about the rotation shaft portion 162 in the vertical rotation direction following the rotation of the operation lever 130.

Figure 14:
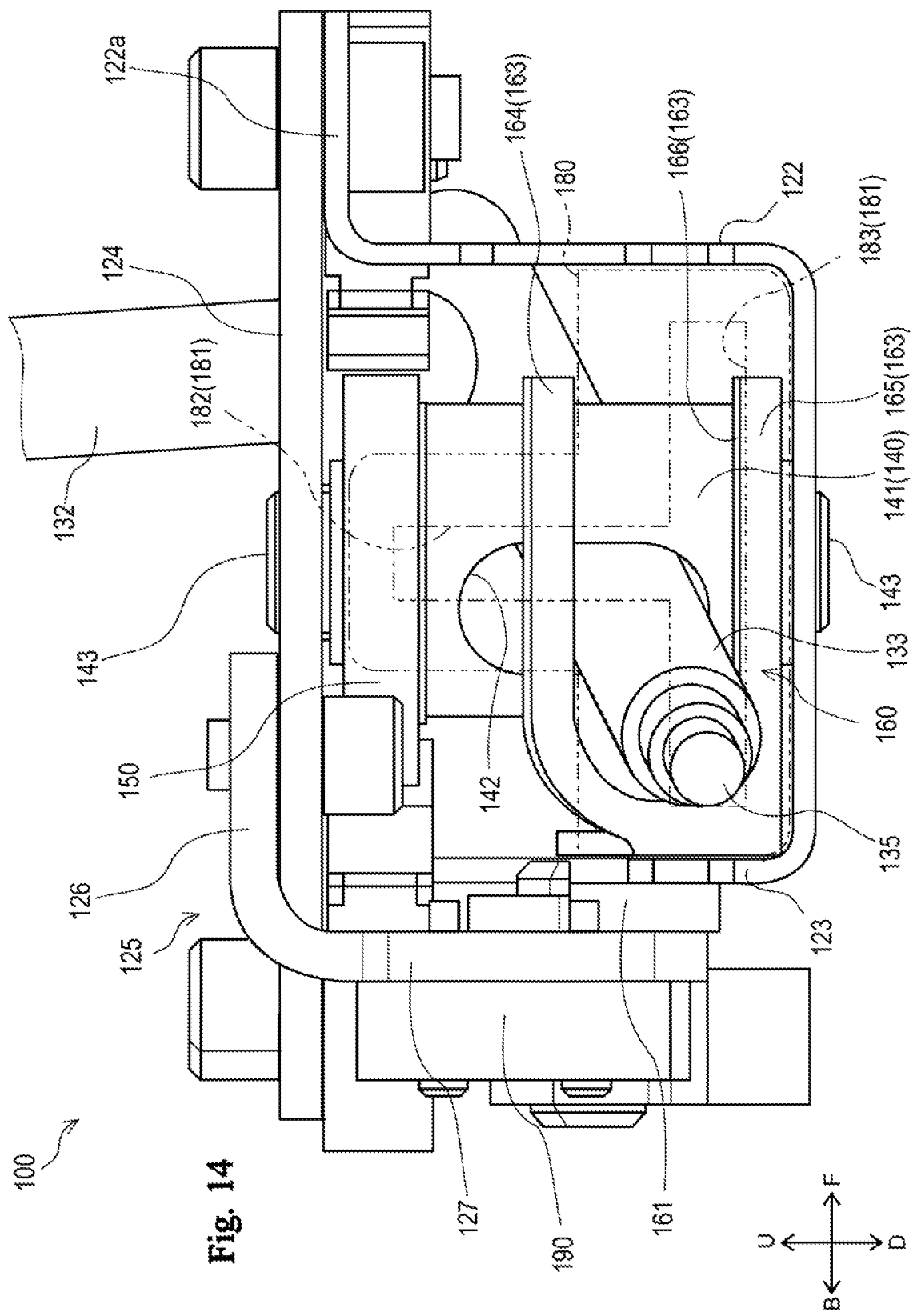
FIG. 14 is a side view illustrating the operation device in a forward position.
Figure 16:
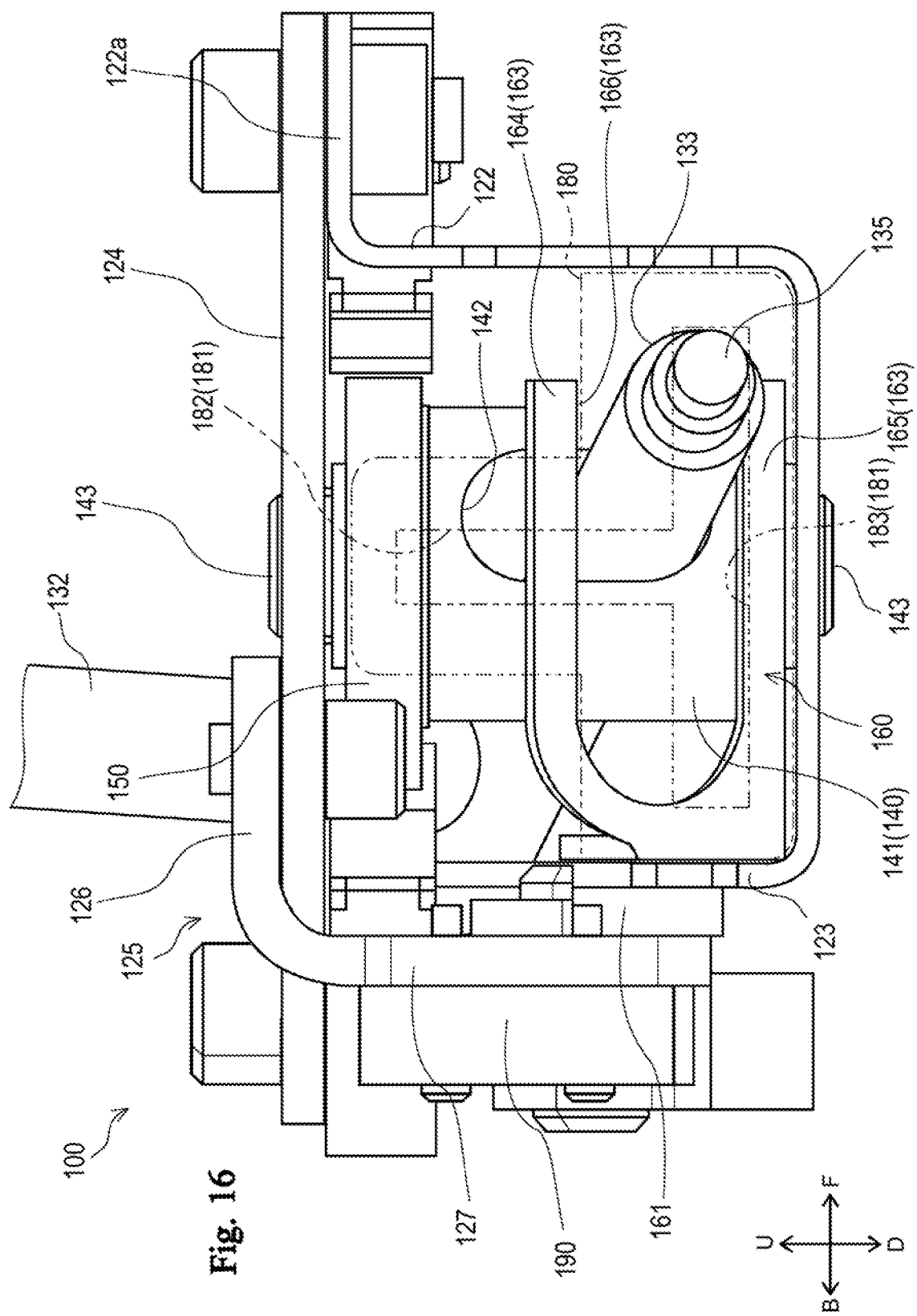
FIG. 16 is a side view illustrating the operation device in a backward position.

On the other hand, as illustrated in FIGS. 14 and 16, when the operation lever 130 is rotated in the front-rear rotation direction, the second shaft portion 133 of the operation lever 130 moves in the escape portion 166 in the front-rear direction. For this reason, even if the operation lever 130 is rotated in the front-rear rotation direction, the neutral transmission portion 160 does not receive a force in the front-rear rotation direction through the second shaft portion 133, so as not to be affected by the front-rear rotation direction of the operation lever 130.

The neutral cam portion 170 illustrated in FIGS. 5 and 8 transmits the rotation of the operation lever 130 in the vertical rotation direction to the neutral switch portion 190 described later. The neutral cam portion 170 has a plate shape with the thickness direction extending in the front-rear direction. In rear view, the neutral cam portion 170 has a shape in which a circular left portion and an upper portion are removed.

The neutral cam portion 170 is disposed along the rear surface of the support piece 127. The rotation shaft portion 162 of the neutral transmission portion 160 is inserted into the neutral cam portion 170, and the neutral cam portion 170 is fixed to the rotation shaft portion 162 so as not to rotate.

Accordingly, the neutral cam portion 170 rotates in the vertical rotation direction with the rotation of the neutral transmission portion 160. The neutral cam portion 170 includes a recess 171 and a pressing portion 172.

The recess 171 is a portion obtained by cutting out the right side of the neutral cam portion 170. The recess 171 is formed so as to be recessed leftward in the entire front-rear direction of the neutral cam portion 170. The recess 171 is capable of receiving a roller portion 192a of the neutral switch portion 190 described later.

The pressing portion 172 is a portion that presses the neutral switch portion 190 described later. The pressing portion 172 is provided below the recess 171. The pressing portion 172 has a shape protruding radially outward of the neutral cam portion 170 with respect to the bottom surface of the recess 171 (a surface facing a right side in FIG. 8). In the pressing portion 172, the surface adjacent to the bottom surface of the recess 171 (a surface facing an obliquely right upper side in FIG. 8) is formed as an inclined surface with respect to the bottom surface of the recess 171.

The regulating portion 180 illustrated in FIGS. 4, 6, 7, 10, and 11 regulates the movement of the operation lever 130. The regulating portion 180 is provided at the rear end portion on the upper surface of the bottom plate portion 121 of the base portion 120. Further, the regulating portion 180 is provided so as to be sandwiched between the first side plate portion 122 and the second side plate portion 123 of the base portion 120. The regulating portion 180 has an inverted T-shape in side view. The regulating portion 180 includes a regulating recess 181.

The regulating recess 181 is opened on the front surface of the regulating portion 180, and receives the protrusion 135 of the operation lever 130. The regulating recess 181 includes a first regulating recess 182 and a second regulating recess 183.

Figure 11A:
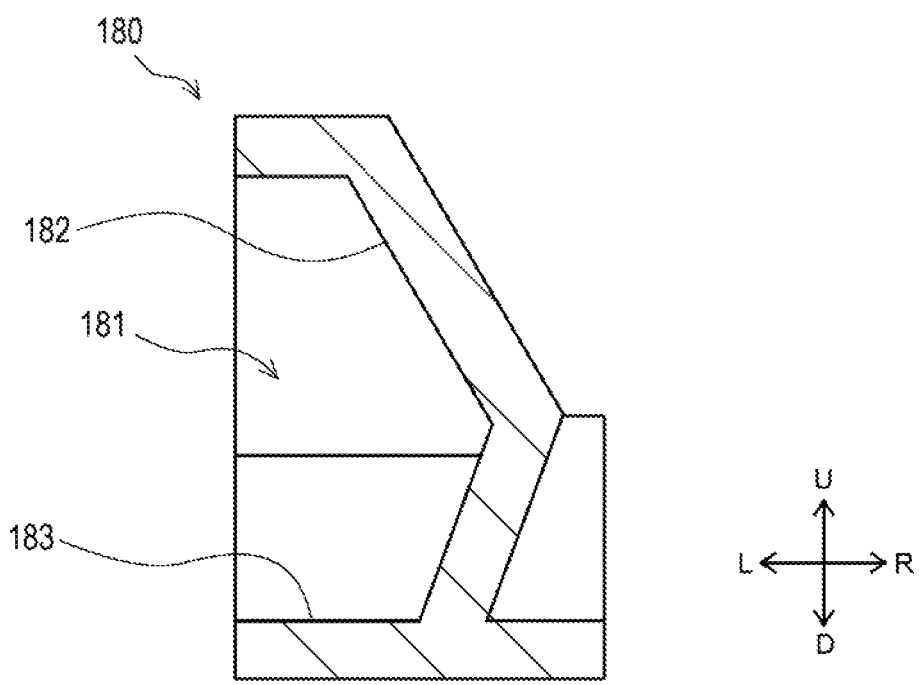
FIG. 11A is a cross-sectional view taken along line Y-Y in FIG. 10.

The first regulating recess 182 is a portion having a vertically long groove shape. The first regulating recess 182 is provided substantially at the center of the regulating portion 180 in the front-rear direction. The groove width dimension of the first regulating recess 182 is a dimension corresponding to the outer diameter dimension of the protrusion 135. Accordingly, when the protrusion 135 is positioned in the first regulating recess 182, the rotation of the operation lever 130 in the front-rear rotation direction is regulated. As illustrated in FIG. 11A, the groove bottom surface of the first regulating recess 182 is formed as an inclined surface such that the groove depth dimension of the vertically central portion of the first regulating recess 182 is the largest.

Figure 11B:
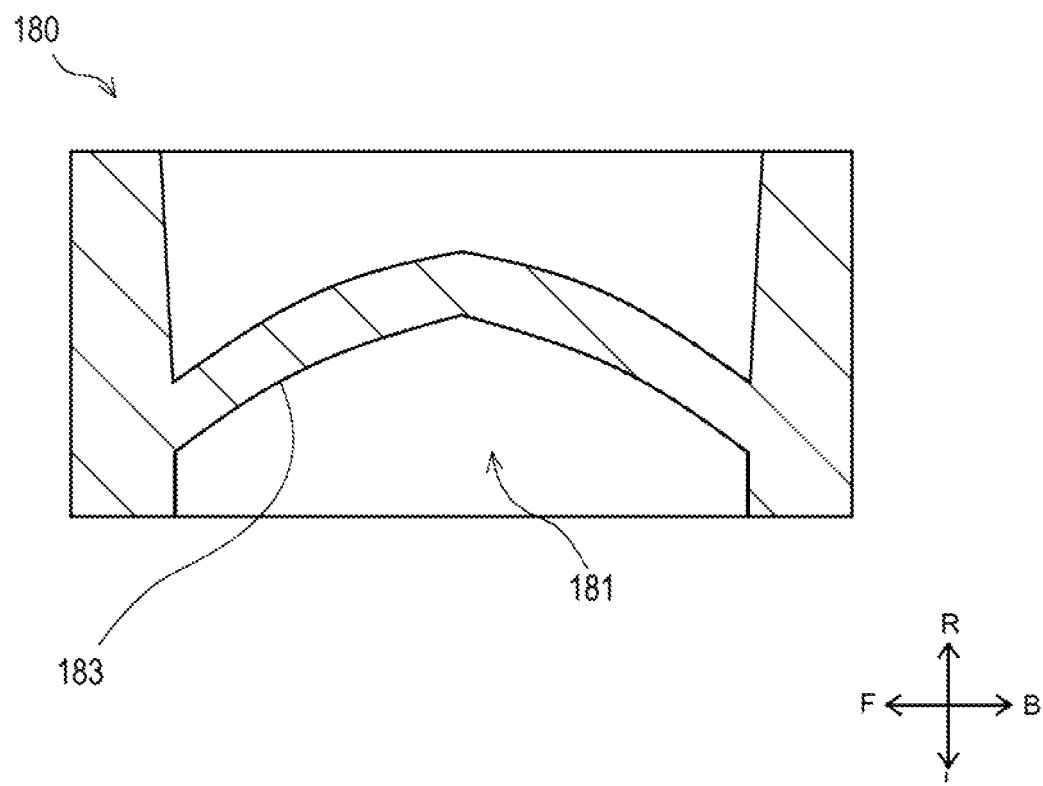
FIG. 11B is a cross-sectional view taken along line X-X in FIG. 10.

The second regulating recess 183 is a portion having a groove shape that is long in the front-rear direction. The second regulating recess 183 is provided in the lower portion of the regulating portion 180. The second regulating recess 183 has a central portion in the front-rear direction communicating with the lower portion of the first regulating recess 182. The groove width dimension of the second regulating recess 183 is a dimension corresponding to the outer diameter dimension of the protrusion 135. Accordingly, when the protrusion 135 is positioned in the second regulating recess 183, the rotation of the operation lever 130 in the vertical rotation direction is regulated. As illustrated in FIG. 11B, the groove bottom surface of the second regulating recess 183 is formed as an inclined surface such that the groove depth dimension of the central portion of the second regulating recess 183 in the front-rear direction is the largest.

The protrusion 135 is configured to be urged rightward by the urging portion 136 such that the tip portion is always in contact with the groove bottom of the first regulating recess 182 or the second regulating recess 183. In addition, the protrusion 135 is guided by the groove bottom surfaces of the first regulating recess 182 and the second regulating recess 183 which are formed as inclined surfaces and is guided to be positioned at the vertically central portion of the first regulating recess 182 or the central portion of the second regulating recess 183 in the front-rear direction.

In this embodiment, the groove depth dimension of the vertically central portion of the first regulating recess 182 is formed larger than the groove depth dimension of the center portion of the second regulating recess 183 in the front-rear direction. Therefore, when the operation lever 130 is not operated, the operation lever 130 is guided such that the protrusion 135 is positioned at the vertically central portion (the position indicated by A in FIG. 10) of the first regulating recess 182. Hereinafter, the position of the operation lever 130 in a state where the protrusion 135 is guided to the vertically central portion of the first regulating recess 182 as described above will be described as an initial position. In this state, since the protrusion 135 is positioned in the first regulating recess 182, the rotation of the operation lever 130 in the front-rear rotation direction is regulated.

Figure 9:
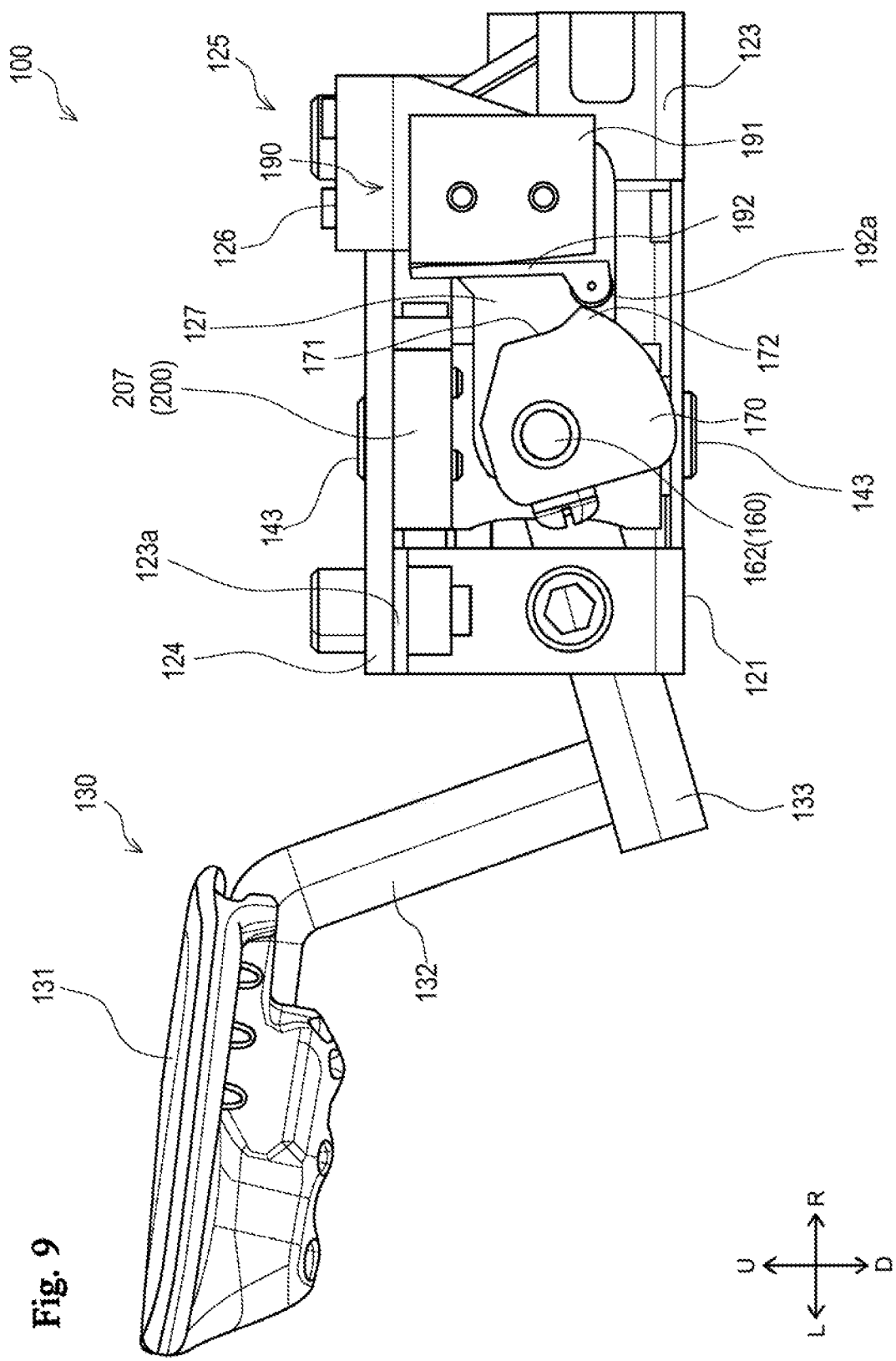
FIG. 9 is a rear view illustrating the operation device in a neutral position.
Figure 10:
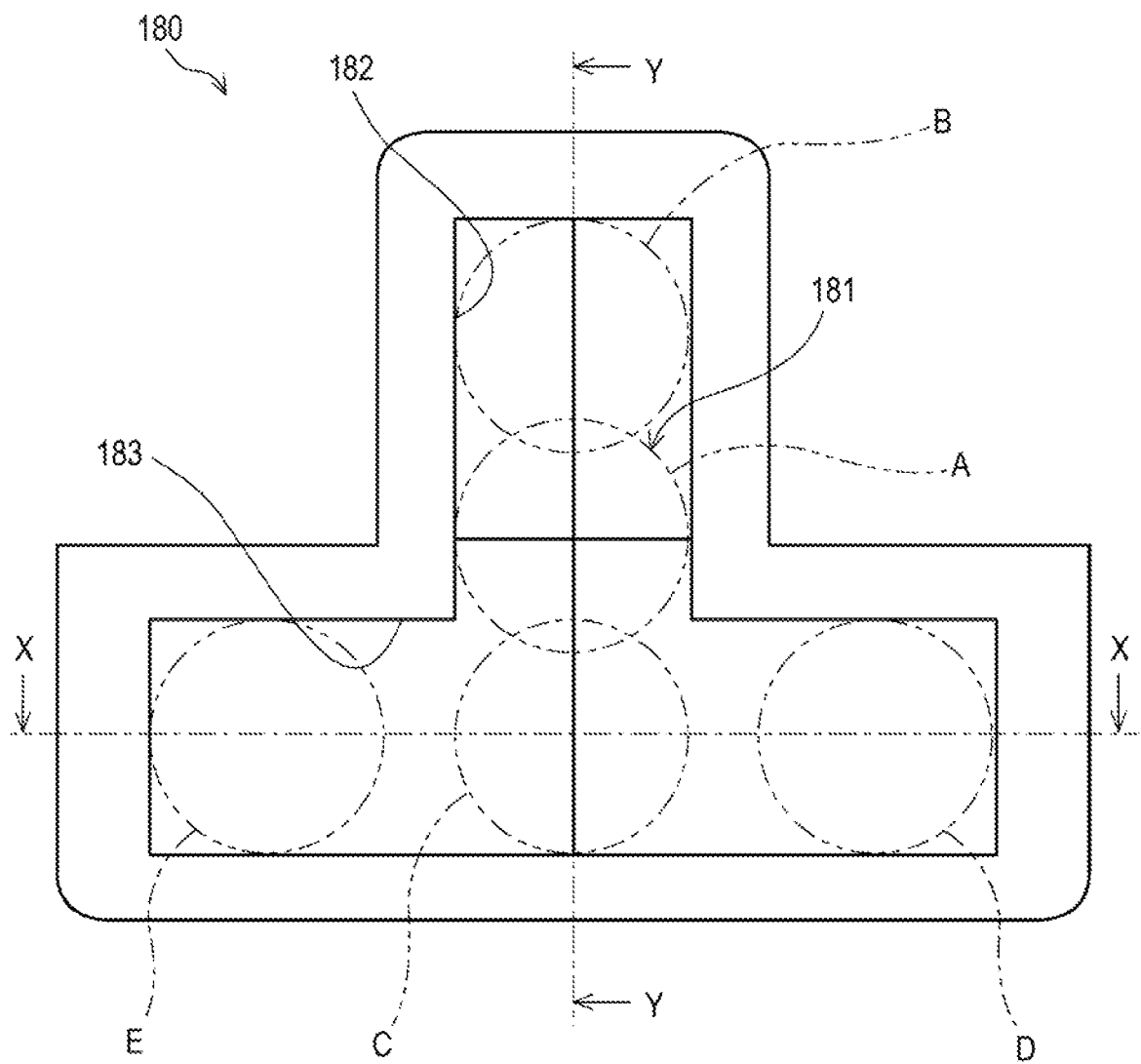
FIG. 10 is a side view illustrating a regulating portion.

In the following, a state in which the operation lever 130 is moved downward from the initial position as illustrated in FIGS. 9 and 12 will be described as a neutral position. In this state, the protrusion 135 is positioned at the upper end portion (the position indicated by B in FIG. 10) of the first regulating recess 182.

In the following, a state in which the operation lever 130 is moved upward from the initial position as illustrated in FIG. 13 will be described as a rotation allowable position. In this state, the protrusion 135 is positioned at the central portion (the position indicated by C in FIG. 10) of the second regulating recess 183 in the front-rear direction. Accordingly, the operation lever 130 can rotate in the front-rear rotation direction.

Figure 15:
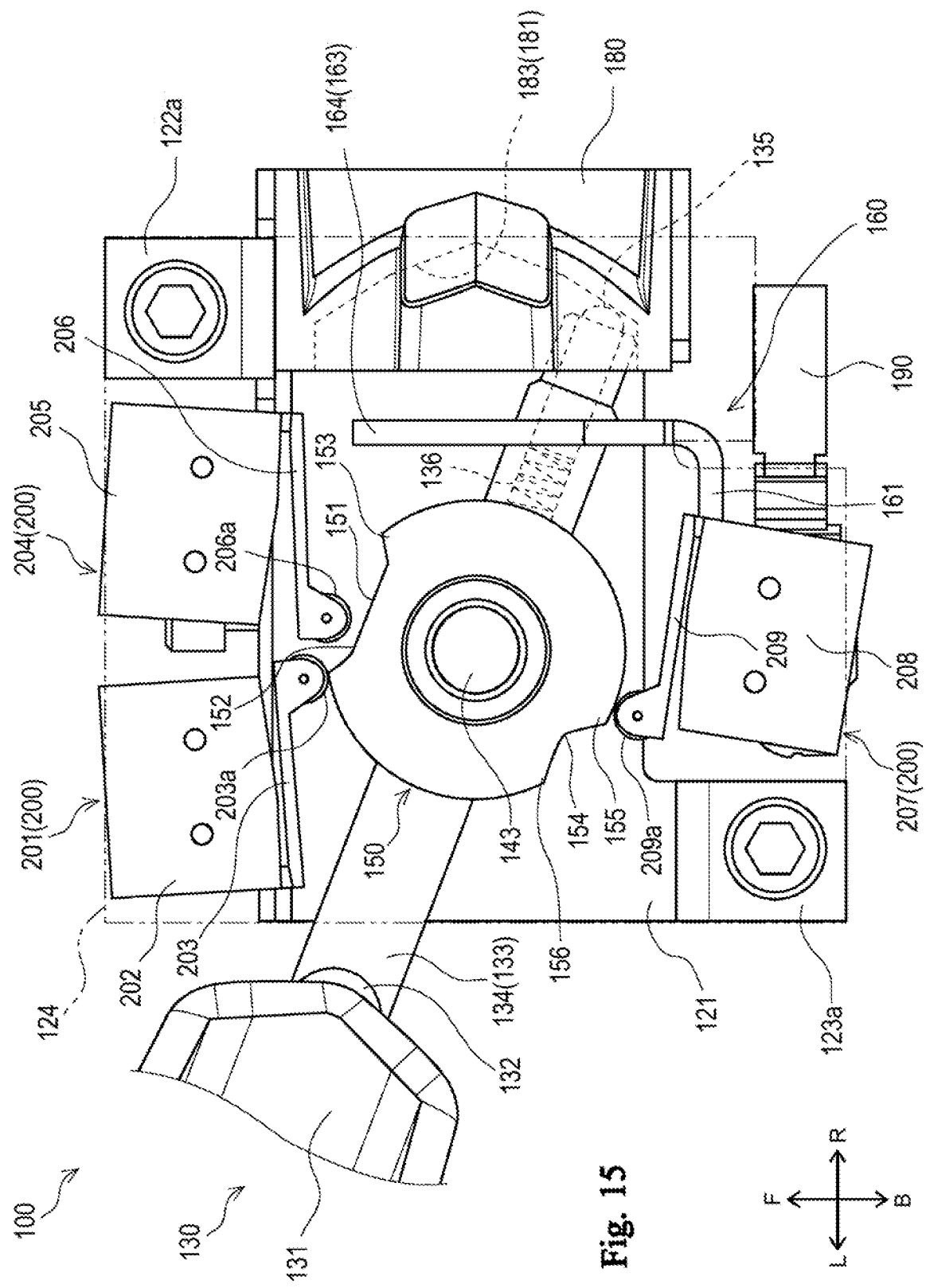
FIG. 15 is a plan view illustrating the operation device in the forward position.

Hereinafter, as illustrated in FIGS. 14 and 15, a state in which the operation lever 130 is moved forward from the rotation allowable position will be described as a forward position. In this state, the protrusion 135 is positioned at the rear end portion (the position indicated by D in FIG. 10) of the second regulating recess 183.

Figure 17:
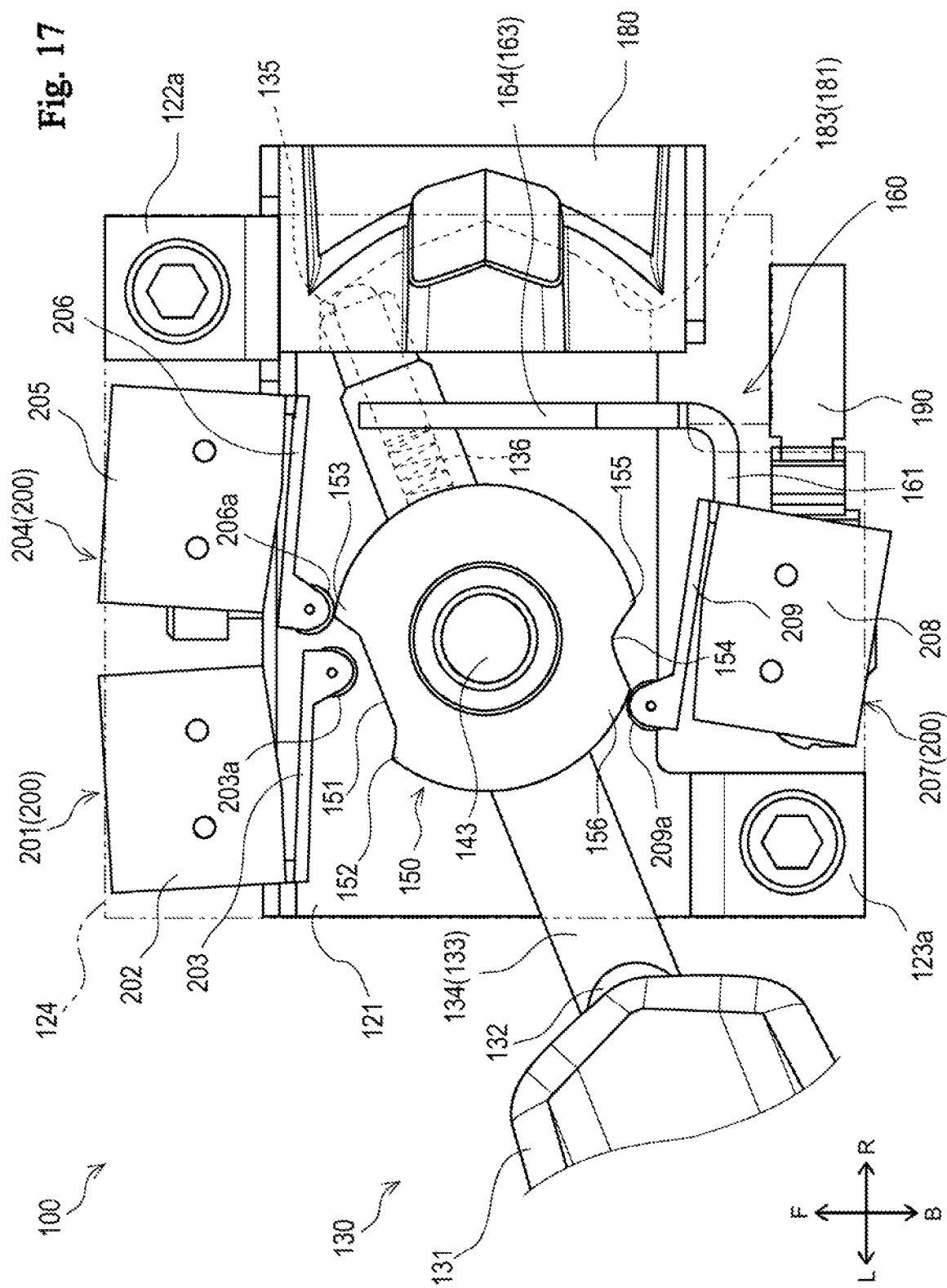
FIG. 17 is a plan view illustrating the operation device in the backward position.

Hereinafter, a state in which the operation lever 130 is moved rearward from the rotation allowable position as illustrated in FIGS. 16 and 17 will be described as a backward position. In this state, the protrusion 135 is positioned at the front end portion (the position indicated by E in FIG. 10) of the second regulating recess 183.

Figure 8:
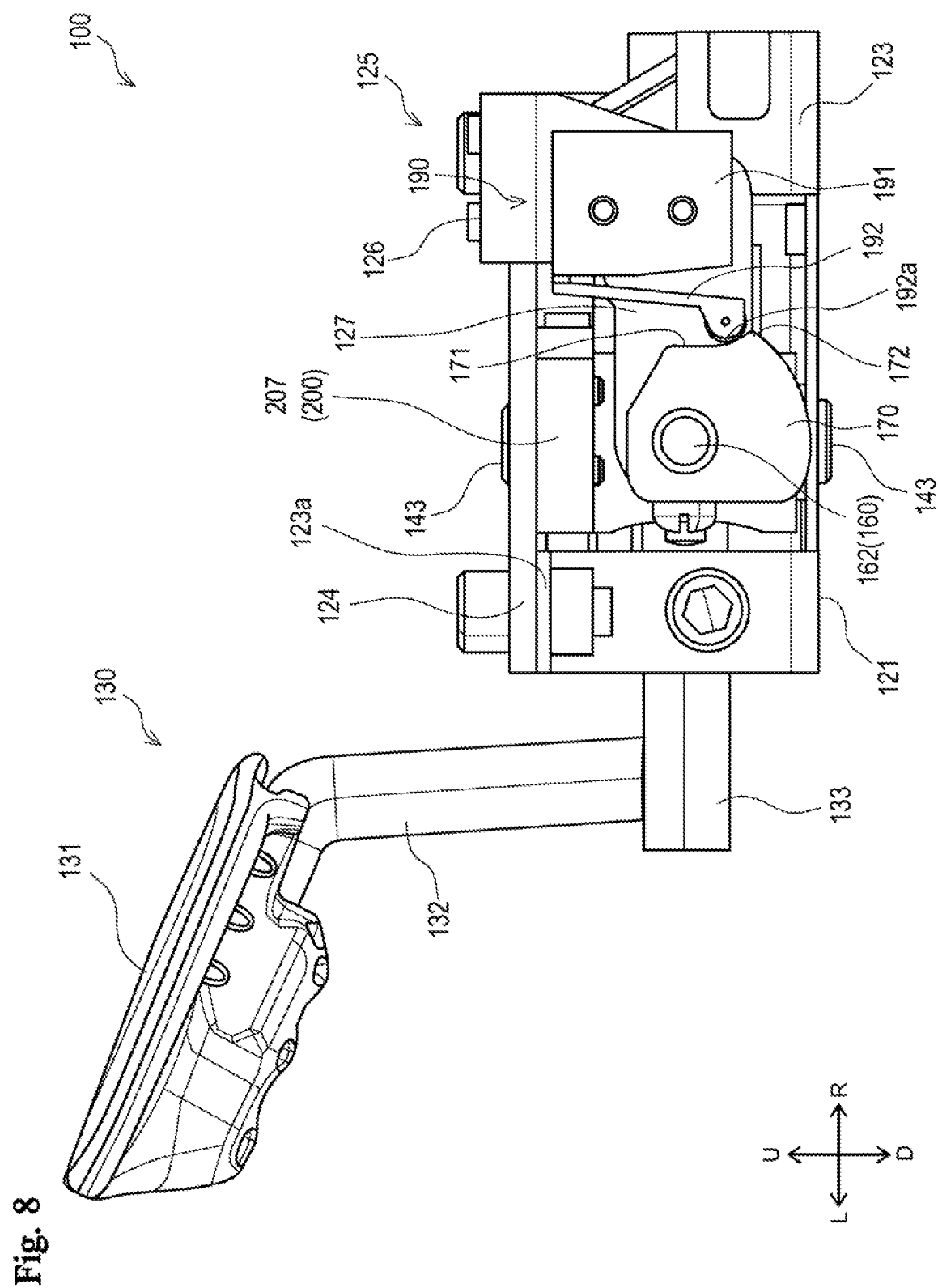
FIG. 8 is a rear view illustrating the operation device in the initial position.

The neutral switch portion 190 illustrated in FIG. 8 detects the pressing by the neutral cam portion 170. The neutral switch portion 190 is provided on the right side of the neutral cam portion 170 on the rear surface of the support piece 127. The neutral switch portion 190 is electrically connected to the control device 210 described later. The neutral switch portion 190 includes a main body 191 and a lever portion 192.

The main body 191 forms the main body of the neutral switch portion 190. The main body 191 is fixed to the rear surface of the support piece 127 through a predetermined stopper. The main body 191 has a plate shape with the thickness direction extending in the front-rear direction. The main body 191 has a substantially rectangular shape in rear view.

The lever portion 192 is provided so as to be displaceable with respect to the main body 191. The lever portion 192 has a generally long shape in the vertical direction. In the lever portion 192, the upper end portion (base end) is pivotally supported to be rotatable about a shaft along the thickness direction of the main body 191 with respect to the upper end portion on the left surface of the main body 191. The lever portion 192 is disposed such that the longitudinal direction is inclined obliquely downward and leftward. When the lower end portion (tip portion) of the lever portion 192 rotates around the axis so as to move rightward, the main body 191 detects the rotation. The lever portion 192 includes a roller portion 192a.

The roller portion 192a is a portion pressed by the pressing portion 172 of the neutral cam portion 170. The roller portion 192a is pivotally supported to be rotatable about the shaft along the thickness direction of the main body 191 at the lower end portion (tip portion) of the lever portion 192.

The forward/backward switch portion 200 illustrated in FIG. 6 detects the pressing by the forward/backward cam portion 150. The forward/backward switch portion 200 is provided on the lower surface of the top plate portion 124 of the base portion 120. The forward/backward switch portion 200 is electrically connected to the control device 210 described later. The forward/backward switch portion 200 includes a forward switch portion 201, a backward switch portion 204, and a common switch portion 207.

The forward switch portion 201 detects the pressing by the first forward pressing portion 152 of the forward/backward cam portion 150. The forward switch portion 201 includes a main body 202 and a lever portion 203. Incidentally, the main body 202 and the lever portion 203 have the same configuration as the main body 191 and the lever portion 192 of the neutral switch portion 190 except for the installation location and direction.

The main body 202 forms the main body of the forward switch portion 201. The main body 202 is fixed to the left front corner portion of the lower surface of the top plate portion 124 through a predetermined stopper. The main body 202 is disposed so that the thickness direction extends in the vertical direction.

The lever portion 203 is provided so as to be displaceable with respect to the main body 202. The lever portion 203 is disposed on the rear surface of the main body 202 such that the base end is positioned to the left side. In other words, in the lever portion 203, the left end portion (base end) is pivotally supported to be rotatable about a shaft along the thickness direction of the main body 202 with respect to the left end portion on the rear surface of the main body 202.

The roller portion 203a is a portion pressed by the first forward pressing portion 152 of the forward/backward cam portion 150. The roller portion 203a is pivotally supported to be rotatable about the shaft along the thickness direction of the main body 202 at the right end portion (tip portion) of the lever portion 203.

The backward switch portion 204 detects the pressing by the first backward pressing portion 153 of the forward/backward cam portion 150. The backward switch portion 204 includes a main body 205 and a lever portion 206. Incidentally, the main body 205 and the lever portion 206 have the same configuration as the main body 191 and the lever portion 192 of the neutral switch portion 190 except for the installation location and direction.

The main body 205 forms the main body of the backward switch portion 204. The main body 205 is fixed to the lower surface of the top plate portion 124 on the right side of the forward switch portion 201 through a predetermined stopper. The main body 205 is disposed so that the thickness direction extends in the vertical direction.

The lever portion 206 is provided so as to be displaceable with respect to the main body 205. The lever portion 206 is disposed on the rear surface of the main body 205 such that the base end is positioned on the right side. In other words, in the lever portion 206, the right end portion (base end) is pivotally supported to be rotatable about a shaft along the thickness direction of the main body 205 with respect to the right end portion on the rear surface of the main body 205.

The roller portion 206a is a portion pressed by the first backward pressing portion 153 of the forward/backward cam portion 150. The roller portion 206a is pivotally supported to be rotatable about the shaft along the thickness direction of the main body 205 at the left end portion (tip portion) of the lever portion 206.

As illustrated in FIG. 6, the forward switch portion 201 and the backward switch portion 204 are provided symmetrically so that the roller portion 203a and the roller portion 206a face each other. Accordingly, the forward switch portion 201 and the backward switch portion 204 can be received in the common first recess 151 provided in the forward/backward cam portion 150.

The common switch portion 207 detects the pressing by the second forward pressing portion 155 and the second backward pressing portion 156 of the forward/backward cam portion 150. The common switch portion 207 includes a main body 208 and a lever portion 209. Incidentally, the main body 208 and the lever portion 209 have the same configuration as the main body 191 and the lever portion 192 of the neutral switch portion 190 except for the installation location and direction.

The main body 208 forms the main body of the common switch portion 207. The main body 208 is fixed to the substantially central portion of the rear end portion in the right-left direction on the lower surface of the top plate portion 124 through a predetermined stopper. The main body 208 is disposed so that the thickness direction extends in the vertical direction.

The lever portion 209 is provided so as to be displaceable with respect to the main body 208. The lever portion 209 is disposed on the front surface of the main body 208 such that the base end portion is positioned to the right side. In other words, in the lever portion 209, the right end portion (base end) is pivotally supported to be rotatable about a shaft along the thickness direction of the main body 208 with respect to the right end portion on the front surface of the main body 208.

The roller portion 209a is a portion pressed by the second forward pressing portion 155 and the second backward pressing portion 156 of the forward/backward cam portion 150. The roller portion 209a is pivotally supported to be rotatable about the shaft along the thickness direction of the main body 208 at the left end portion (tip portion) of the lever portion 209.

The control device 210 illustrated in FIG. 2 executes a control for switching the transmission 7 to the neutral state, the forward state, and the backward state based on a switching operation through the operation lever 130. The control device 210 includes a storage unit, an arithmetic processing unit, and the like. The control device 210 is disposed at a predetermined position inside the tractor 1. The control device 210 is electrically connected to the neutral switch portion 190, the forward/backward switch portion 200, the side operation tool 9b, and the transmission 7 through predetermined signal lines.

The control device 210 executes a control for switching the transmission 7 to the forward state, the backward state, and the neutral state by controlling a predetermined control valve based on the detection of the neutral switch portion 190 and the forward/backward switch portion 200. Specifically, when the control device 210 detects the pressing of the neutral switch portion 190, the control device 210 executes a control to set the transmission 7 to the neutral state.

When the control device 210 detects the pressing of the forward switch portion 201 and the common switch portion 207, the control device 210 executes a control to set the transmission 7 to the forward state. Further, when the control device 210 detects the pressing of the backward switch portion 204 and the common switch portion 207, the control device 210 executes a control to set the transmission 7 to the backward state.

As described above, when the transmission 7 is set to the forward state or the backward state, the control device 210 requires pressing of two switch portions. That is, for example, when the detection based on the forward switch portion 201 or the backward switch portion 204 is performed even though the detection based on the common switch portion 207 is not performed, the control device 210 does not execute a control to set the transmission 7 to the forward state or the backward state. Accordingly, it possible to detect that any of the switches is malfunctioning.

The control device 210 can execute a control for switching the transmission 7 to the forward state or the backward state by the switching operation through the changeover switch provided on the side operation tool 9b. That is, in this embodiment, the transmission 7 can be switched by either the operation using the operation lever 130 or the operation through the changeover switch.

Hereinafter, an operation mode by the operation device 100 will be described.

As illustrated in FIGS. 6 to 8, when the operation lever 130 is in the initial position, the roller portion 192a of the neutral switch portion 190 is received in the recess 171 of the neutral cam portion 170. Further, as illustrated in FIG. 6, the roller portion 203a of the forward switch portion 201 and the roller portion 206a of the backward switch portion 204 are received in the first recess 151 of the forward/backward cam portion 150. Further, the roller portion 209a of the common switch portion 207 is received in the second recess 154. In this state, neither the neutral switch portion 190 nor the forward/backward switch portion 200 is pressed.

As illustrated in FIGS. 9 and 12, when the operation lever 130 is rotated downward about the vertical rotation shaft portion 144 to be in the neutral position, the second shaft portion 133 of the operation lever 130 presses the upper piece 164 of the receiving piece 163 of the neutral transmission portion 160. Accordingly, the upper piece 164 receives a force due to the rotation of the second shaft portion 133, and the neutral transmission portion 160 rotates about the rotation shaft portion 162 following the rotation of the operation lever 130.

When the neutral cam portion 170 rotates about the rotation shaft portion 162 with the rotation of the neutral transmission portion 160, the pressing portion 172 moves rightward to be displaced to a neutral pressing position of pressing the roller portion 192a of the neutral switch portion 190.

Further, as illustrated in FIG. 13, when the operation lever 130 is rotated upward about the vertical rotation shaft portion 144 to be in the rotation allowable position, the second shaft portion 133 of the operation lever 130 presses the lower piece 165 of the neutral transmission portion 160. Accordingly, the lower piece 165 receives a force due to the rotation of the second shaft portion 133, and the neutral transmission portion 160 rotates about the rotation shaft portion 162 following the rotation of the operation lever 130. In this state, the operation lever 130 can rotate in the front-rear rotation direction.

As illustrated in FIGS. 14 and 15, when the operation lever 130 in the rotation allowable position is rotated forward about the front-rear rotation shaft portion 143 to be in the forward position, the forward/backward transmission portion 140 receives a force due to the rotation through the vertical rotation shaft portion 144 and rotates about the front-rear rotation shaft portion 143 following the rotation of the operation lever 130.

When the forward/backward cam portion 150 rotates about the front-rear rotation shaft portion 143 following the rotation of the forward/backward transmission portion 140, the forward/backward cam portion 150 is displaced to the forward pressing position where the first forward pressing portion 152 of the forward/backward cam portion 150 presses the roller portion 203a of the forward switch portion 201 and the second forward pressing portion 155 of the forward/backward cam portion 150 presses the roller portion 209a of the common switch portion 207.

As illustrated in FIGS. 16 and 17, when the operation lever 130 in the rotation allowable position is rotated rearward about the front-rear rotation shaft portion 143 to be in the backward position, the forward/backward transmission portion 140 receives a force due to the rotation through the vertical rotation shaft portion 144 and rotates about the front-rear rotation shaft portion 143 following the rotation of the operation lever 130.

When the forward/backward cam portion 150 rotates about the front-rear rotation shaft portion 143 following the rotation of the forward/backward transmission portion 140, the forward/backward cam portion 150 is displaced to the backward pressing position where the first backward pressing portion 153 of the forward/backward cam portion 150 presses the roller portion 206a of the backward switch portion 204 and the second backward pressing portion 156 of the forward/backward cam portion 150 presses the roller portion 209a of the common switch portion 207.

In a state where the operation lever 130 is positioned at any one of the neutral position, the forward position, and the backward position, when a hand is released from the grip portion 131 of the operation lever 130 to release the operation, the operation lever 130 returns to the initial position. Accordingly, the pressure of the neutral switch portion 190 and the forward/backward switch portion 200 is released in each operation by the operation lever 130.

With the above-described configuration, for example, even in a case where an operation of switching the transmission 7 to the forward state or the backward state is performed through the operation lever 130, and then the switching of the transmission 7 is performed through the side operation tool 9b, it is possible to suppress inconsistency between the operation through the operation lever 130 and the actual state of the transmission 7. That is, in an operation device different from the above-described configuration, in a case where the operation lever 130 is moved to a predetermined position and then held (locked) at the predetermined position without returning to the initial position, for example, in a case where the operation lever 130 is moved to the forward position and then the transmission 7 is switched to the backward state through the side operation tool 9b, inconsistency (mismatch) occurs between the operation through the operation lever 130 and the actual state of the transmission 7. On the other hand, according to the operation device 100, it is possible to suppress the occurrence of inconsistency between the operation through the operation lever 130 and the actual state of the transmission 7 as described above.

As described above, the operation device 100 according to this embodiment is capable of switching operation of the transmission 7 of the tractor 1 (work vehicle). The operation device includes: an operation lever 130 that is rotatable in the vertical rotation direction (first rotation direction) about a vertical rotation shaft portion 144 (first rotation shaft) and rotatable in a front-rear rotation direction (second rotation direction) about a front-rear rotation shaft portion 143 (second rotation shaft) non-parallel to the vertical rotation shaft portion 144; an urging portion 136 that urges the operation lever 130 to move to a predetermined initial position; a neutral cam portion 170 (first cam portion) that rotates following a rotation of the vertical rotation shaft portion 144 of the operation lever 130; a forward/backward cam portion 150 (second cam portion) that rotates following a rotation of the operation lever 130 in the front-rear rotation direction; a neutral switch portion 190 (first switch portion) that is pressed by the neutral cam portion 170 and detects the pressing in a state where the neutral cam portion 170 is rotated to a predetermined position; and a forward/backward switch portion 200 (second switch portion) that is pressed by the forward/backward cam portion 150 and detects the pressing in a state where the forward/backward cam portion 150 is rotated to a predetermined position.

With such a configuration, switching of the transmission 7 of the tractor 1 can be operated suitably. That is, after the operation lever 130 is operated in the vertical rotation direction or the front-rear rotation direction, and a predetermined switch is pressed to a predetermined cam portion, the operation lever 130 can be returned to the initial position. Accordingly, the pressure of each switch is released in each operation by the operation lever 130. Therefore, even when the transmission 7 is switched based on the operation of another operation device, it is possible to suppress the occurrence of inconsistency between the operation through the operation lever 130 and the actual state of the transmission 7.

The operation device 100 further includes the neutral transmission portion 160 (first transmission portion) that transmits the rotation of the operation lever 130 in the vertical rotation direction to the neutral cam portion 170 and does not transmit the rotation of the operation lever 130 in the front-rear rotation direction to the neutral cam portion 170.

With this configuration, the neutral cam portion 170 is prevented from following the rotation of the operation lever 130 in the front-rear rotation direction, and thus the unintended contact of the neutral switch portion 190 accompanying the rotation of the operation lever 130 in the front-rear rotation direction can be suppressed.

The neutral transmission portion 160 includes a receiving piece 163 (first receiving portion) that moves following the rotation of the operation lever 130 by receiving a force due to the rotation of the operation lever 130 in the vertical rotation direction and does not receive a force due to the rotation of the operation lever 130 in the front-rear rotation direction, and a supported piece 161 (first cam portion fixing portion) that is rotatably supported with a movement of the receiving piece 163 and to which the neutral cam portion 170 is fixed.

With this configuration, the neutral transmission portion 160 is rotated following the rotation of the operation lever 130 in the vertical rotation direction, and thus the neutral cam portion 170 can be rotated but not affected by the rotation of the operation lever 130 in the front-rear rotation direction.

The operation device 100 further includes: a forward/backward transmission portion 140 (second transmission portion) that transmits the rotation of the operation lever 130 in the front-rear rotation direction to the forward/backward cam portion 150 and does not transmit the rotation of the operation lever 130 in the vertical rotation direction to the forward/backward cam portion 150.

With this configuration, the forward/backward cam portion 150 is prevented from following the rotation of the operation lever 130 in the vertical rotation direction, and thus the unintended contact of the forward/backward switch portion 200 accompanying the rotation of the operation lever 130 in the front-rear rotation direction can be suppressed.

The forward/backward transmission portion 140 includes a vertical rotation shaft portion 144 (second receiving portion) that moves following the rotation of the operation lever 130 by receiving a force due to the rotation of the operation lever 130 in the front-rear rotation direction and supports the operation lever 130 to be rotatable in the vertical rotation direction, and a main body 141 (second cam portion fixing portion) that is rotatably supported with a movement of the vertical rotation shaft portion 144 and to which the second cam portion is fixed.

With this configuration, the forward/backward transmission portion 140 is rotated following the rotation of the operation lever 130 in the front-rear rotation direction, and thus the forward/backward cam portion 150 can be rotated but not affected by the rotation of the operation lever 130 in the vertical rotation direction.

The forward/backward switch portion 200 includes a forward switch portion 201 (first cam position detection switch portion) that detects pressing by the forward/backward cam portion 150 rotated to a forward pressing position (first cam position), a backward switch portion 204 (second cam position detection switch portion) that detects pressing by the forward/backward cam portion 150 rotated to a backward pressing position (second cam portion), and a common switch portion 207 that detects pressing by the forward/backward cam portion 150 rotated to the forward pressing position and pressing by the forward/backward cam portion 150 rotated to the backward pressing position.

With such a configuration, malfunction of the switch can be detected.

That is, when the forward/backward switch portion 200 is configured by the forward switch portion 201, the backward switch portion 204, and the common switch portion 207, for example, in a case where the detection based on the forward switch portion 201 or the backward switch portion 204 is performed even when the detection based on the common switch portion 207 is not performed, it is possible to detect that any of the switches is malfunctioning.

The forward/backward cam portion 150 includes a first forward pressing portion 152 (first pressing portion) that presses the forward switch portion 201, a first backward pressing portion 153 (second pressing portion) that presses the backward switch portion 204, and a first recess 151 (recess) that is formed between the first forward pressing portion 152 and the first backward pressing portion 153 and avoids contact with the forward switch portion 201 and the backward switch portion 204 in a state where the operation lever 130 is positioned at the initial position.

With this configuration, the forward/backward cam portion 150 is provided with the common first recess 151 for avoiding contact with the forward switch portion 201 and the backward switch portion 204, and thus it is possible to simplify the shape of the forward/backward cam portion 150.

The operation lever 130 is displaceable to a neutral position (first position) positioned on a lower side (one side in the first rotation direction) from the initial position, a rotation allowable position that is positioned on upper side (another side in the first rotation direction) from the initial position and in which rotation about the front-rear rotation shaft portion 143 is possible, a forward position (second position) that is positioned on a front side (one side in the second rotation direction) from the rotation allowable position, and a backward position (third position) that is positioned on a rear side (another side in the second rotation direction) from the rotation allowable position. The neutral switch portion 190 detects pressing of the neutral cam portion 170 in a state where the operation lever 130 is positioned at the neutral position, and the forward/backward switch portion 200 detects pressing of the forward/backward cam portion 150 in a state where the operation lever 130 is positioned in the forward position and pressing of the forward/backward cam portion 150 in a state where the operation lever 130 is positioned in the backward position.

With such a configuration, the operability can be improved. In other words, by positioning the initial position at a substantially middle portion among the neutral position, the forward position, and the backward position, the operation lever 130 can be easily moved from the initial position to each position, thereby improving the operability.

The operation device 100 further includes: a control device 210 capable of executing a control for switching the transmission 7 among a neutral state, a forward state, and a backward state. The control device 210 sets the transmission 7 to the neutral state based on detection of the pressing of the neutral cam portion 170 in a state where the operation lever 130 is positioned at the neutral position, the transmission 7 to the forward state based on detection of the pressing of the forward/backward cam portion 150 in a state where the operation lever 130 is positioned at the forward position, and the transmission 7 to the backward state based on detection of the pressing of the forward/backward cam portion 150 in a state where the operation lever 130 is positioned at the backward position.

With this configuration, it is possible to suitably operate switching of the transmission 7 among the neutral state, the forward state, and the backward state.

The tractor 1 according to this embodiment includes the operation device 100 according to this embodiment.

With such a configuration, switching of the transmission 7 of the tractor 1 can be operated suitably.

The tractor 1 according to this embodiment is one embodiment of the work vehicle according to the disclosure.

The vertical rotation shaft portion 144 according to this embodiment is an embodiment of the first rotation shaft according to the disclosure.

The front-rear rotation shaft portion 143 according to this embodiment is an embodiment of the second rotation shaft according to the disclosure.

The vertical rotation direction according to this embodiment is an embodiment of the first rotation direction according to the disclosure.

The front-rear rotation direction according to this embodiment is an embodiment of the second rotation direction according to the disclosure.

The neutral cam portion 170 according to this embodiment is an embodiment of the first cam portion according to the disclosure.

The forward/backward cam portion 150 according to this embodiment is an embodiment of the second cam portion according to the disclosure.

The neutral switch portion 190 according to this embodiment is an embodiment of the first switch portion according to the disclosure.

The forward/backward switch portion 200 according to this embodiment is an embodiment of the second switch portion according to the disclosure.

The neutral transmission portion 160 according to this embodiment is an embodiment of the first transmission portion according to the disclosure.

The receiving piece 163 according to this embodiment is an embodiment of the first receiving portion according to the disclosure.

The supported piece 161 according to this embodiment is an embodiment of the first cam portion fixing portion according to the disclosure.

The forward/backward transmission portion 140 according to this embodiment is an embodiment of the second transmission portion according to the disclosure.

The vertical rotation shaft portion 144 according to this embodiment is an embodiment of the second receiving portion according to the disclosure.

The main body 141 according to this embodiment is an embodiment of the second cam portion fixing portion according to the disclosure.

The forward pressing position according to this embodiment is an embodiment of the first cam position according to the disclosure.

The backward pressing position according to this embodiment is an embodiment of the second cam position according to the disclosure.

The forward switch portion 201 according to this embodiment is an embodiment of the first cam position detection switch portion according to the disclosure.

The backward switch portion 204 according to this embodiment is an embodiment of the second cam position detection switch portion according to the disclosure.

The first forward pressing portion 152 according to this embodiment is an embodiment of the first pressing portion according to the disclosure.

The first backward pressing portion 153 according to this embodiment is an embodiment of the second pressing portion according to the disclosure.

The first recess 151 according to this embodiment is an embodiment of the recess according to the disclosure.

As described above, the first embodiment of the disclosure has been described. However, the disclosure is not limited to the above configuration, and various changes can be made within the scope of the disclosure described in the claims.

For example, in this embodiment, the operation device 100 switches the transmission 7 among the neutral state, the forward state, and the backward state, but is not limited to such an embodiment. For example, the transmission 7 may be switched to another shift state.

In this embodiment, the example has been described in which the forward/backward switch portion 200 is configured by the three switch portions of the forward switch portion 201, the backward switch portion 204, and the common switch portion 207, but the disclosure is not limited to such an embodiment. For example, the forward/backward switch portion 200 may be configured by the forward switch portion 201 and the backward switch portion 204.

In this embodiment, an example has been described in which the operation lever 130 can be moved to any one of the neutral position, the forward position, and the backward position, but the disclosure is not limited to such an embodiment. For example, in addition to the neutral position, the forward position, and the backward position, the number of the positions to which the operation lever 130 can move may be increased. In this case, the operation lever 130 may be configured to be rotatable about the front-rear rotation shaft portion 143 at a position different from the rotation allowable position. For example, the operation lever 130 may be configured to be movable in the front-rear rotation direction at the neutral position. In this case, as illustrated in FIG. 18, the regulating portion 180 has a shape that allows the operation lever 130 to move.

With the configuration, the forward/backward switch portion 200 can be pressed in a state where the neutral switch portion 190 is pressed. Accordingly, when the pressing of the neutral switch portion 190, the forward switch portion 201, and the common switch portion 207 is detected, or the pressing of the neutral switch portion 190, the backward switch portion 204, and the common switch portion 207 is detected, the control device 210 can execute a predetermined control.

As described above, the operation lever 130 in the above-described example can rotate about the front-rear rotation shaft portion 143 at a position different from the rotation allowable position.

With this configuration, the operation lever 130 can be displaced to a further position in addition to the neutral position, the forward position, and the backward position.

Incidentally, when the number of the positions to which the operation lever 130 can move is increased, the operation lever 130 is not limited to the configuration in which the operation lever 130 can be moved from the neutral position in the front-rear rotation direction as described above. For example, the operation lever 130 may be configured to be movable in the front-rear rotation direction in a state where the operation lever 130 is positioned further below the neutral position, or in a state where the operation lever 130 is positioned further above the rotation allowable position. In this case, a switch portion capable of detecting the position of the operation lever 130 may be further provided.

The outline of the second embodiment of the disclosure is shown below.

The operation device 100 according to the second embodiment of the disclosure illustrated in FIGS. 19 to 31 performs the operation to switch the transmission 7 among the forward state, the backward state, the neutral state, and the parking state (a state in which the transmission 7 is mechanically locked). The operation device 100 according to the second embodiment is different from the first embodiment mainly in the configuration of the cover portion 110, the operation lever 130, a guide portion 180, and the control device 210. Incidentally, the guide portion 180 corresponds to the regulating portion 180 according to the first embodiment. The operation device 100 according to the second embodiment is substantially the same as the operation device 100 according to the first embodiment except for the configuration described above. Hereinafter, the description of the same points as those in the first embodiment will be appropriately omitted.

Figure 19:
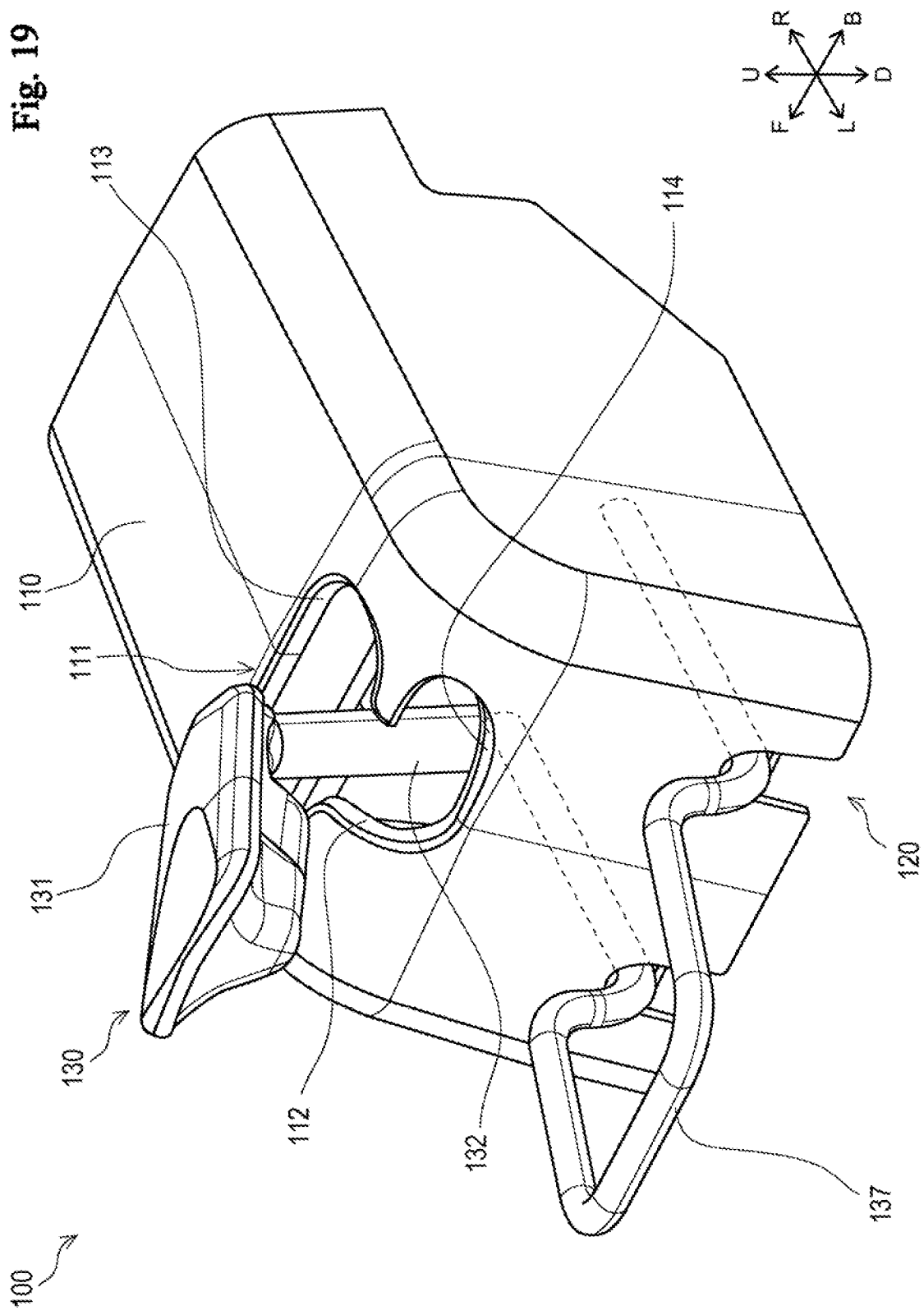
FIG. 19 is a perspective view illustrating an operation device according to a second embodiment of the disclosure.
Figure 21:
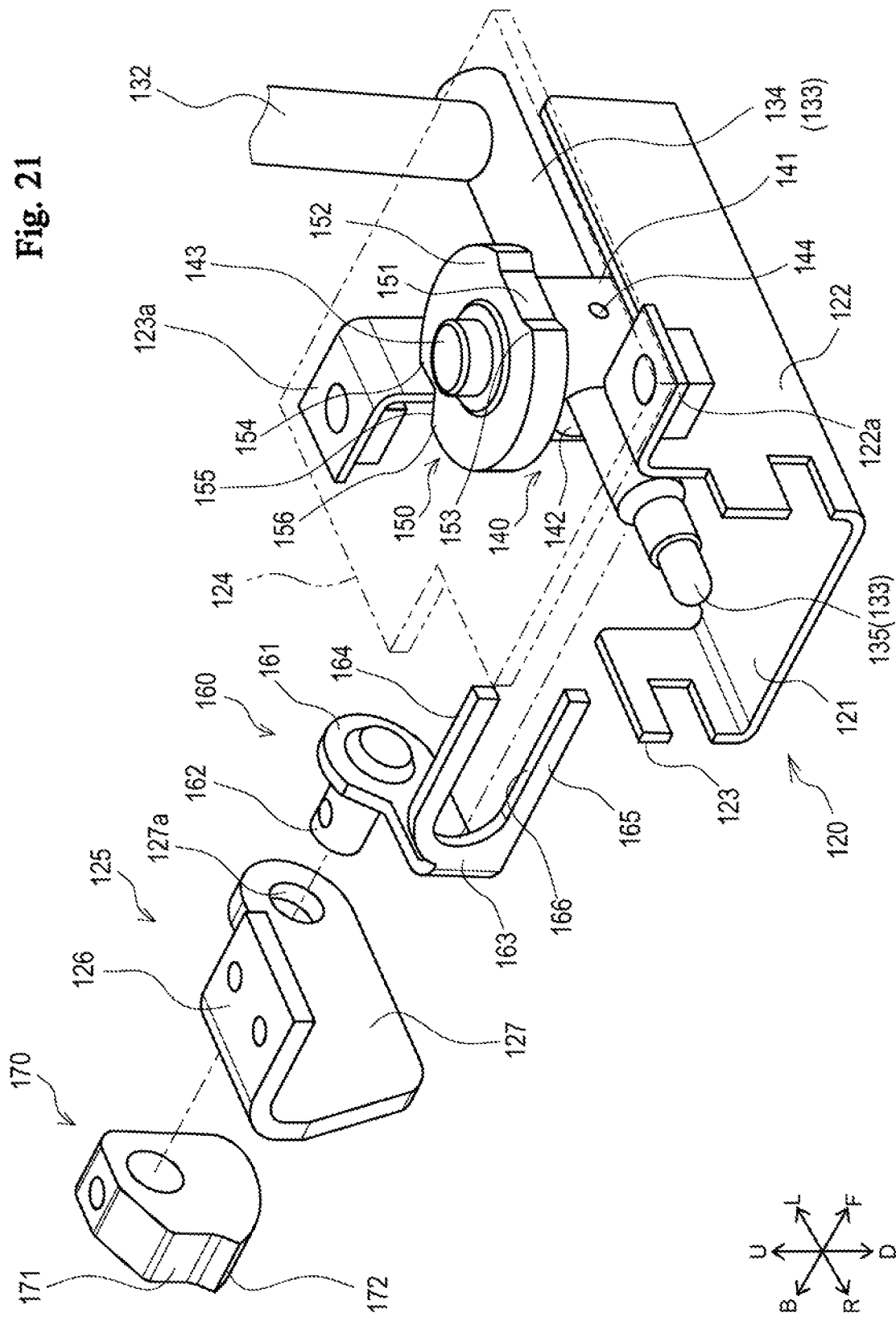
FIG. 21 is an exploded perspective view illustrating the inside of the operation device.

The cover portion 110 illustrated in FIG. 19 forms the outline of the operation device 100. The cover portion 110 includes a guide hole 111. The guide hole 111 corresponds to the guide portion 111 according to the first embodiment.

The guide hole 111 includes a vertical guide hole 112, a first front-rear guide hole 113, and a second front-rear guide hole 114. Incidentally, the vertical guide hole 112 and the first front-rear guide hole 113 correspond to the vertical guide portion 112 and the front-rear guide portion 113 according to the first embodiment, respectively.

The second front-rear guide hole 114 is a portion extending in the front-rear direction. The second front-rear guide hole 114 forms the left portion of the guide hole 111. The second front-rear guide hole 114 is provided to extend rearward from the lower portion of the vertical guide hole 112.

The operation lever 130 illustrated in FIGS. 6, 19 to 21 forms the operation tool in the operation device 100. The operation lever 130 is rotatable with respect to the base portion 120 in a vertical rotation direction about a rotation axis (a vertical rotation shaft portion 144 described later) along the front-rear direction. In addition, the operation lever 130 is rotatable with respect to the base portion 120 in a front-rear rotation direction about a rotation shaft (a front-rear rotation shaft portion 143 described later) along the vertical direction. The operation lever 130 includes the grip portion 131, the first shaft portion 132, the second shaft portion 133, and the urging portion 136. Incidentally, the grip portion 131 and the first shaft portion 132 are the same as in the above-described first embodiment, and the description thereof will be omitted.

The second shaft portion 133 is a portion connected to the first shaft portion 132 and mounted on the base portion 120. The second shaft portion 133 has a shape extending substantially in the right-left direction. The left end portion of the second shaft portion 133 is connected to the lower end portion of the first shaft portion 132. That is, the operation lever 130 has a substantially L-shape. The second shaft portion 133 includes the main body 134 and the protrusion 135.

The main body 134 forms most of the second shaft portion 133. The main body 134 has a substantially cylindrical shape that opens to a right side.

The protrusion 135 is housed to be slidable in the right-left direction inside the main body 134 and protrudes rightward from the right end portion of the main body 134. The protrusion 135 has a substantially cylindrical shape. When the protrusion 135 slides with respect to the main body 134, the second shaft portion 133 can expand and contract in the right-left direction.

The urging portion 136 illustrated in FIG. 6 is housed inside the main body 134 and urges the protrusion 135 to the right side (extending direction). As the urging portion 136, for example, a coil spring may be adopted. The urging portion 136 is not limited to the coil spring, and various springs can be used.

The guide portion 180 illustrated in FIGS. 6, 20, 22, 23 to 25 guides the movement of the operation lever 130 in the vertical direction and the front-rear direction. The guide portion 180 is provided at the rear end portion on the upper surface of the bottom plate portion 121 of the base portion 120. Further, the guide portion 180 is provided so as to be sandwiched between the first side plate portion 122 and the second side plate portion 123 of the base portion 120. The guide portion 180 has a substantially rectangular shape in which an upper rear portion is cut out in side view. The guide portion 180 includes a guide recess 181. Incidentally, the guide recess 181 corresponds to the regulating recess 181 according to the first embodiment.

The guide recess 181 is opened on the left side surface of the guide portion 180, and receives the protrusion 135 of the operation lever 130. The guide recess 181 includes a vertical guide recess 182, a first front-rear guide recess 183, and a second front-rear guide recess 184. The vertical guide recess 182 and the first front-rear guide recess 183 correspond to the first regulating recess 182 and the second regulating recess 183 according to the first embodiment.

The vertical guide recess 182 has a groove shape extending in the vertical direction. The vertical guide recess 182 is provided substantially at the center of the guide portion 180 in the front-rear direction. The groove width dimension of the vertical guide recess 182 is a dimension corresponding to the outer diameter dimension of the protrusion 135. Accordingly, when the protrusion 135 is positioned in the vertical guide recess 182, the rotation of the operation lever 130 in the front-rear rotation direction is regulated. The vertical guide recess 182 includes a vertical guide inclined portion 182a.

Figure 24:
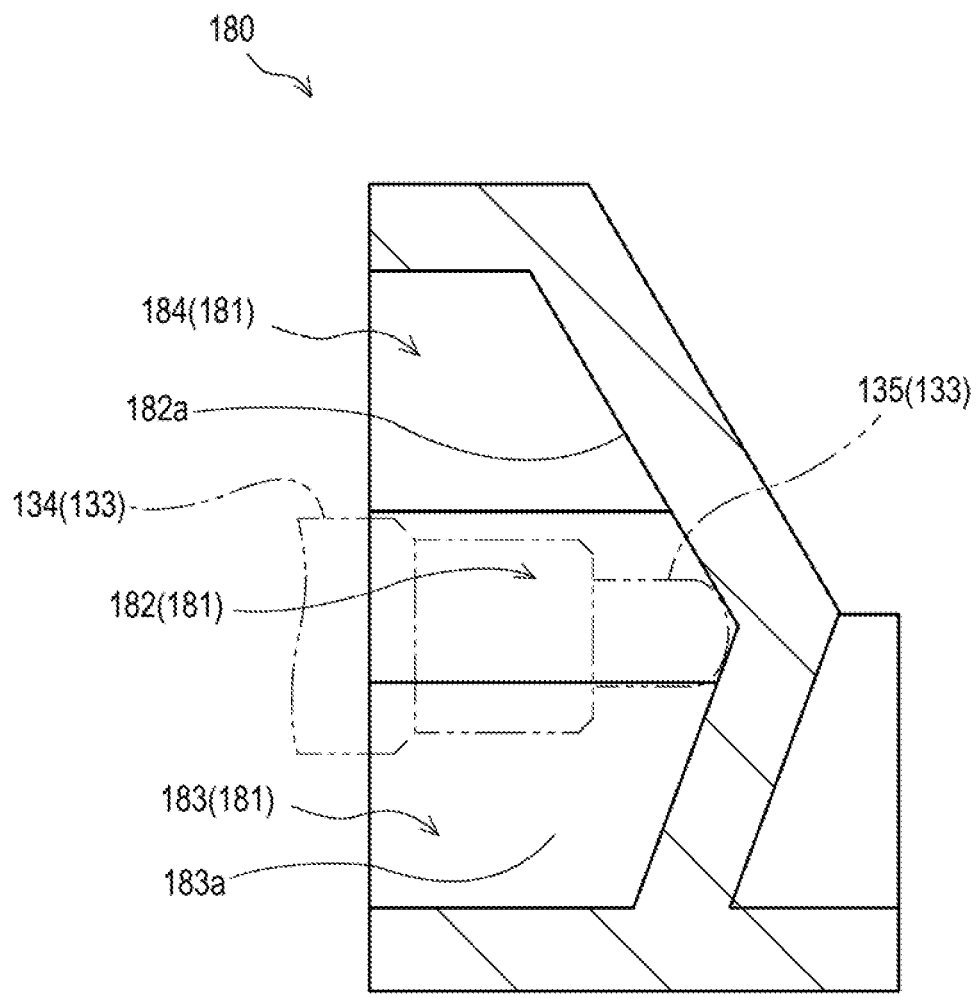
FIG. 24 is a cross-sectional view taken along line Y-Y in FIG. 23.
Figure 25A:
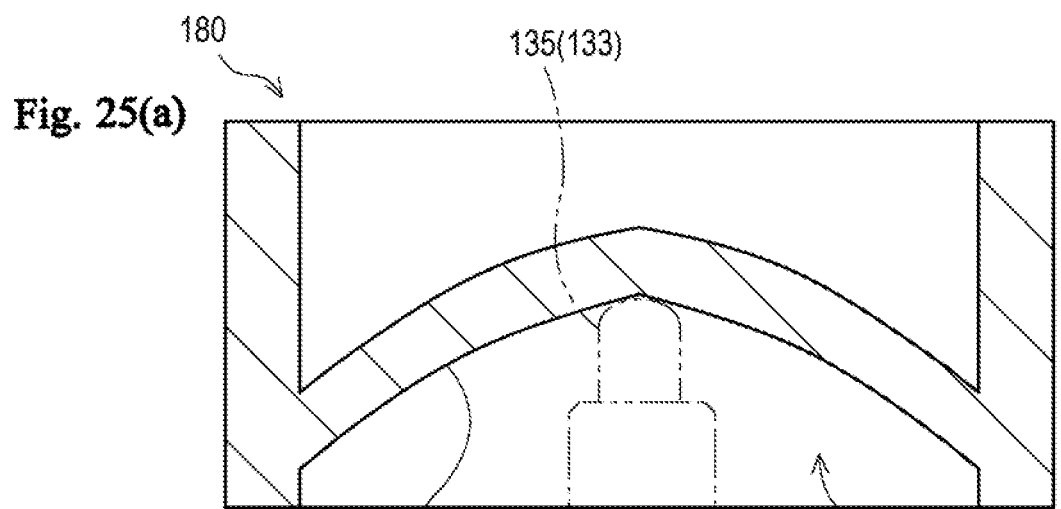
FIG. 25A is a cross-sectional view taken along line X1-X1 in FIG. 23.
Figure 25B:
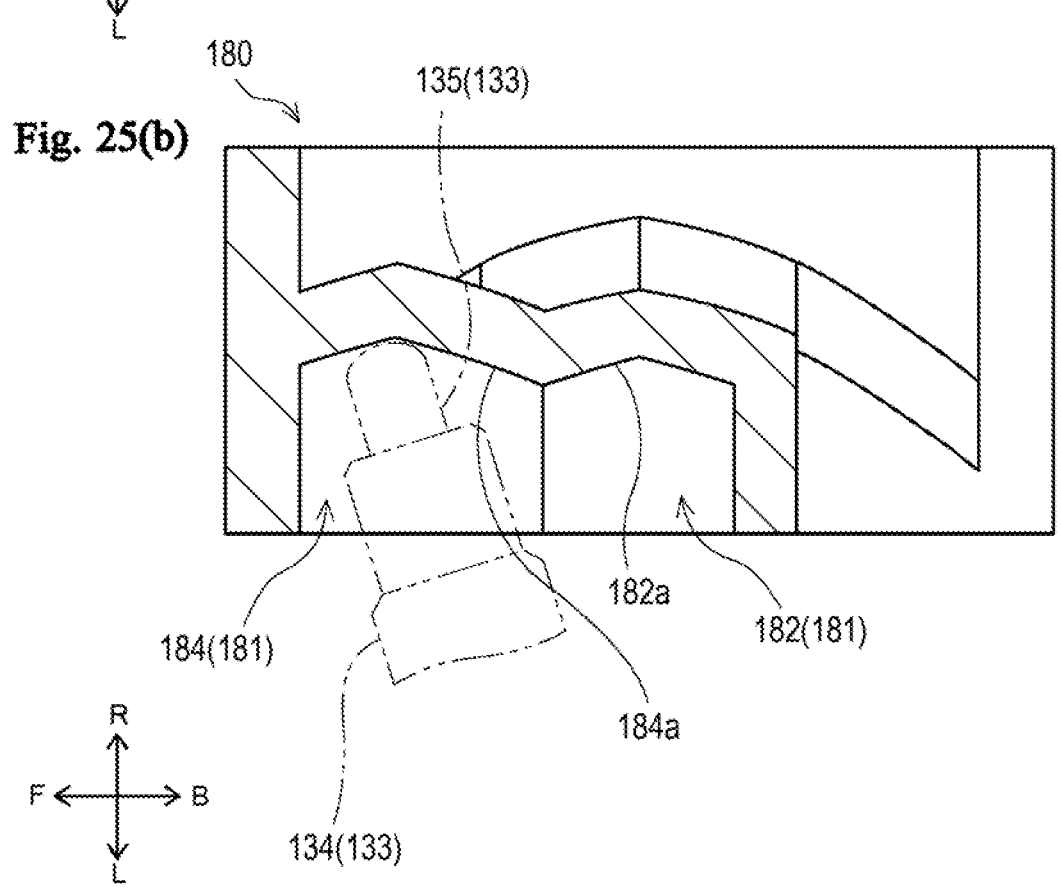
FIG. 25B is a cross-sectional view taken along line X2-X2 in FIG. 23.

The vertical guide inclined portion 182a forms the groove bottom surface of the vertical guide recess 182. As illustrated in FIG. 24, the vertical guide inclined portion 182a is formed as an inclined surface such that the groove depth of the vertically central portion of the vertical guide recess 182 becomes the largest. Further, as illustrated in FIG. 25B, the vertical guide inclined portion 182a is formed as an inclined surface such that the groove depth of the central portion of the vertical guide recess 182 in the front-rear direction becomes the largest.

The first front-rear guide recess 183 has a groove shape extending in the front-rear direction. The first front-rear guide recess 183 is provided in the lower portion of the guide portion 180. The first front-rear guide recess 183 has a central portion in the front-rear direction communicating with the lower portion of the vertical guide recess 182. The groove width dimension of the first front-rear guide recess 183 is a dimension corresponding to the outer diameter dimension of the protrusion 135. Accordingly, when the protrusion 135 is positioned in the first front-rear guide recess 183, the rotation of the operation lever 130 in the vertical rotation direction is regulated. The first front-rear guide recess 183 includes a first front-rear guide inclined portion 183a.

The first front-rear guide inclined portion 183a forms the groove bottom surface of the first front-rear guide recess 183. As illustrated in FIG. 25A, the first front-rear guide inclined portion 183a is formed as an inclined surface such that the groove depth of the central portion of the first front-rear guide recess 183 in the front-rear direction becomes the largest.

The second front-rear guide recess 184 has a groove shape extending in the front-rear direction. The second front-rear guide recess 184 is provided in the upper portion of the guide portion 180. The second front-rear guide recess 184 is provided to extend forward from the upper part of the vertical guide recess 182. The groove width dimension of the second front-rear guide recess 184 is a dimension corresponding to the outer diameter dimension of the protrusion 135. Accordingly, when the protrusion 135 is positioned in the second front-rear guide recess 184, the rotation of the operation lever 130 in the vertical rotation direction is regulated. The second front-rear guide recess 184 includes a second front-rear guide inclined portion 184a.

The second front-rear guide inclined portion 184a forms the groove bottom surface of the second front-rear guide recess 184. As illustrated in FIG. 25B, the second front-rear guide inclined portion 184a is formed as an inclined surface such that the groove depth of the central portion of the second front-rear guide recess 184 in the front-rear direction becomes the largest. Herein, since the second front-rear guide inclined portion 184a and the vertical guide inclined portion 182a are formed as inclined surfaces such that the groove depth of the central portion in the front-rear direction is increased, as illustrated in FIG. 25B, a ridge protruding leftward is formed at the boundary between the second front-rear guide inclined portion 184a and the vertical guide inclined portion 182a.

The protrusion 135 is configured to be urged rightward by the urging portion 136 such that the tip portion is always in contact with any one of the vertical guide inclined portion 182a, the first front-rear guide inclined portion 183a, and the second front-rear guide inclined portion 184a. When the tip portion is positioned in the vertical guide recess 182 or the first front-rear guide recess 183, the protrusion 135 is guided by the vertical guide inclined portion 182a or the first front-rear guide inclined portion 183a and is guided to be positioned at the vertically central portion of the vertical guide recess 182 or the central portion of the first front-rear guide recess 183 in the front-rear direction.

In this embodiment, the groove depth of the vertically central portion of the vertical guide recess 182 is formed to be larger than the groove depth of the central portion of the first front-rear guide recess 183 in the front-rear direction. Therefore, when the operation lever 130 is not operated in a state where the protrusion 135 is positioned in the vertical guide recess 182 or the first front-rear guide recess 183, the protrusion 135 is guided to be positioned at the vertically central portion (the position indicated by A in FIG. 23) of the vertical guide recess 182. Hereinafter, the position of the operation lever 130 in a state where the protrusion 135 is guided to the vertically central portion of the vertical guide recess 182 as described above will be described as an initial position. In this state, since the protrusion 135 is positioned in the vertical guide recess 182, the rotation of the operation lever 130 in the front-rear rotation direction is regulated.

Figure 26:
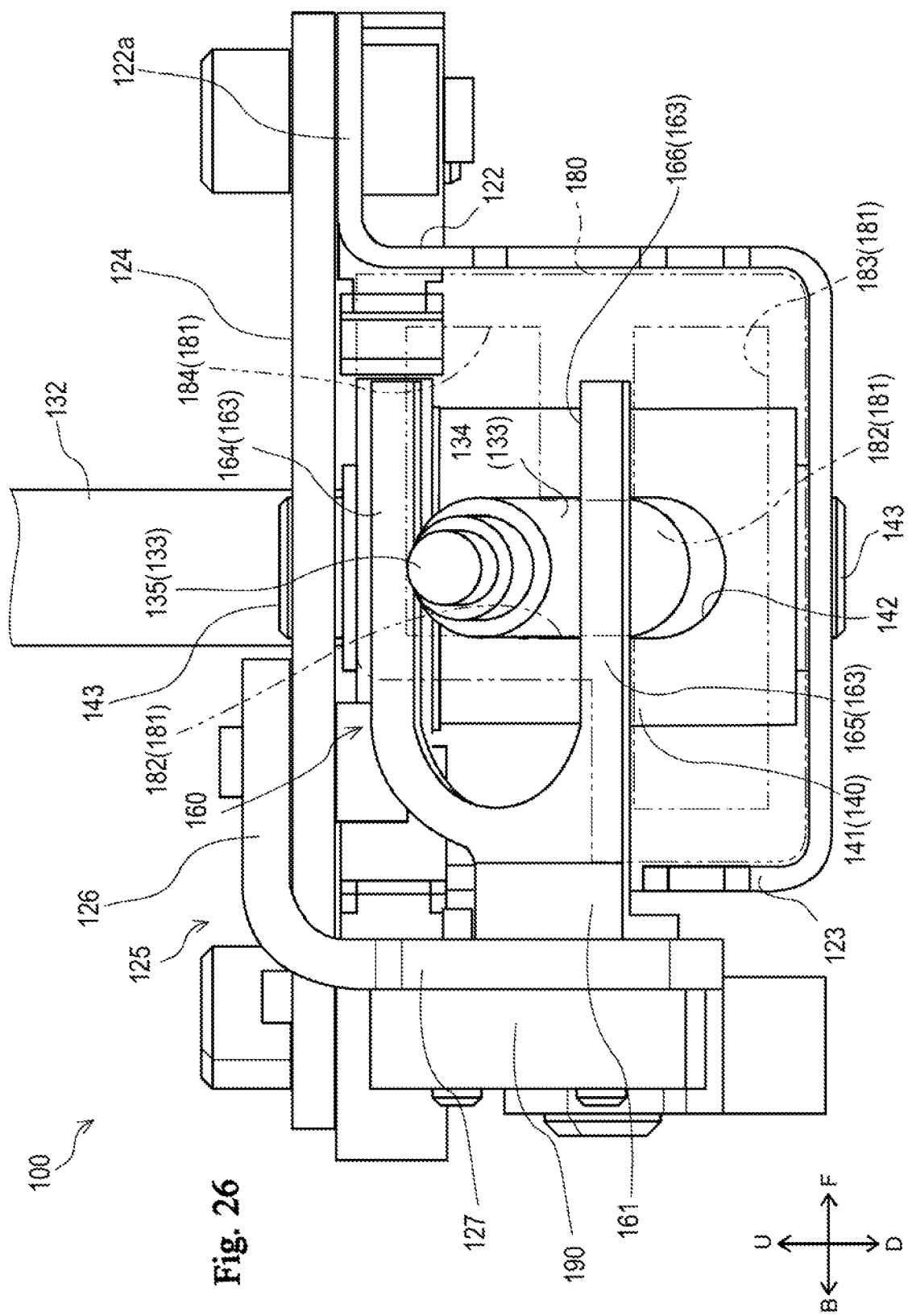
FIG. 26 is a side view illustrating the operation device in a neutral position.

In the following, a state in which the operation lever 130 is moved downward from the initial position as illustrated in FIGS. 9 and 26 will be described as a neutral position. In this state, the protrusion 135 is positioned at the upper end portion (the position indicated by B in FIG. 23) of the vertical guide recess 182. In addition, in this state, the operation lever 130 can rotate in the front-rear rotation direction along the second front-rear guide recess 184.

Figure 27:
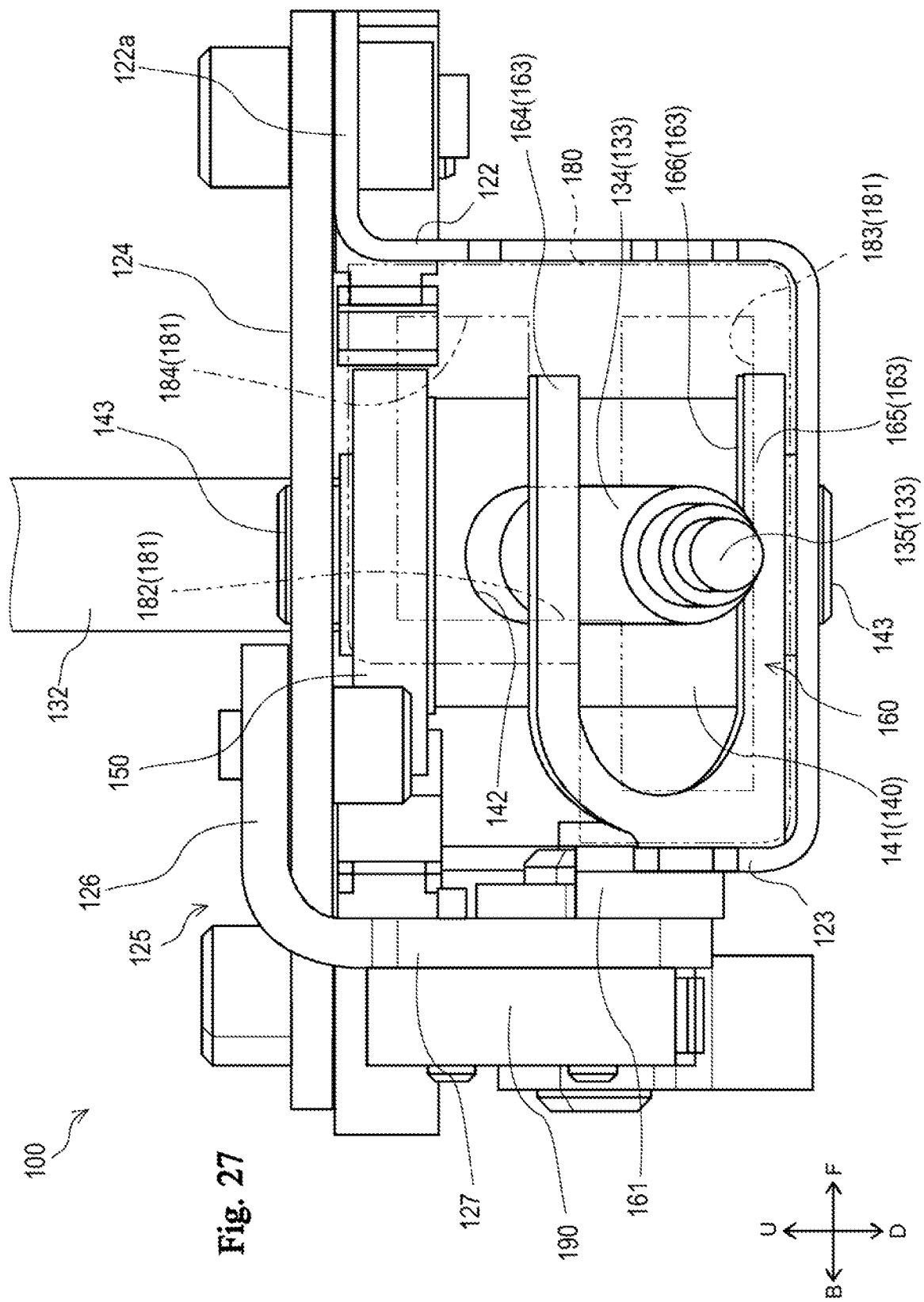
FIG. 27 is a side view illustrating the operation device at a rotation allowable position.

In the following, a state in which the operation lever 130 is moved upward from the initial position, as illustrated in FIG. 27, will be described as a rotation allowable position. In this state, the protrusion 135 is positioned at the central portion (the position indicated by C in FIG. 23) of the first front-rear guide recess 183 in the front-rear direction. In addition, in this state, the operation lever 130 can rotate in the front-rear rotation direction along the first front-rear guide recess 183.

Figure 28:
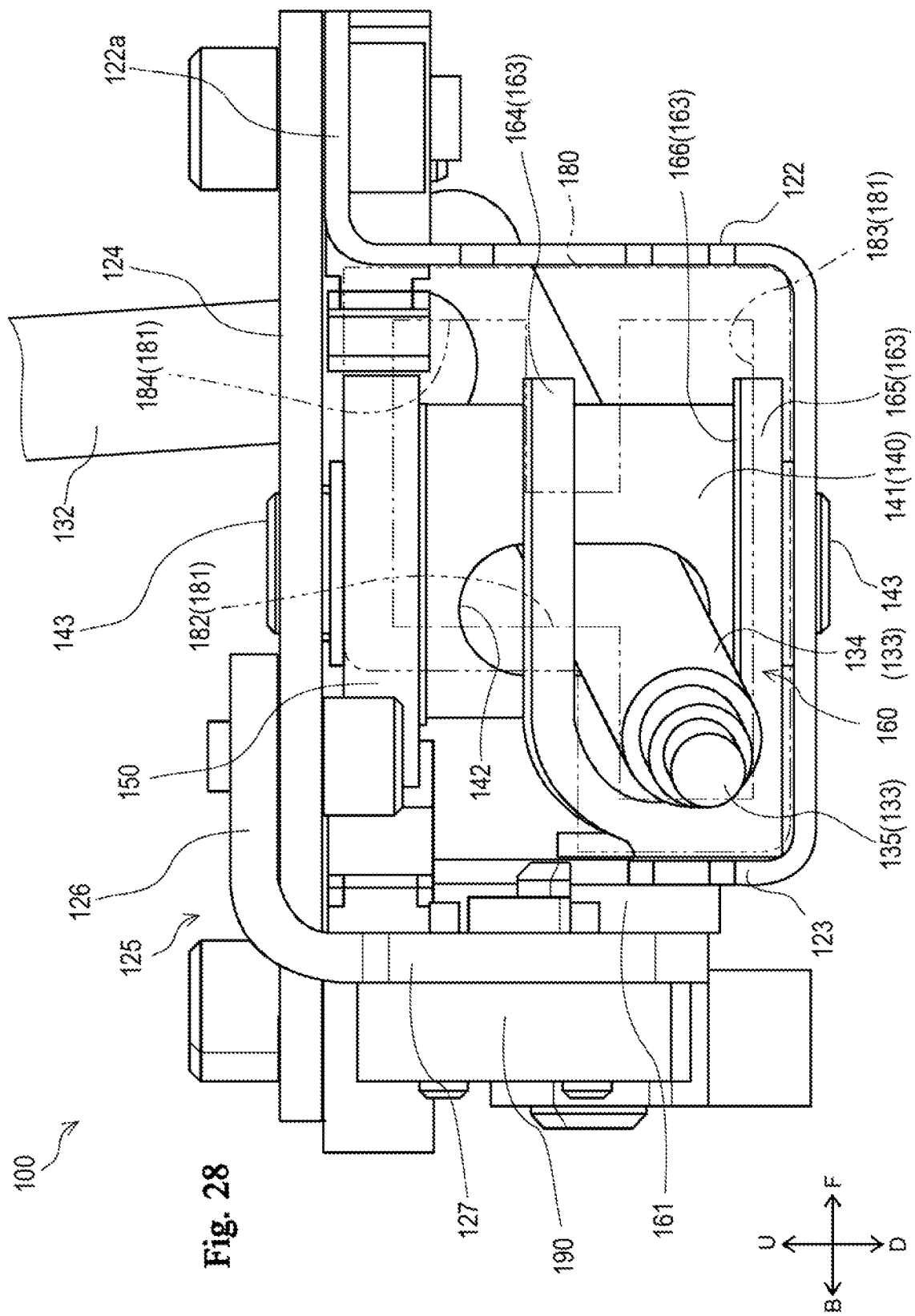
FIG. 28 is a side view illustrating the operation device in a forward position.

Hereinafter, as illustrated in FIGS. 28 and 15, a state in which the operation lever 130 is moved forward from the rotation allowable position will be described as a forward position. In this state, the protrusion 135 is positioned at the rear end portion (the position indicated by D in FIG. 23) of the first front-rear guide recess 183.

Figure 29:
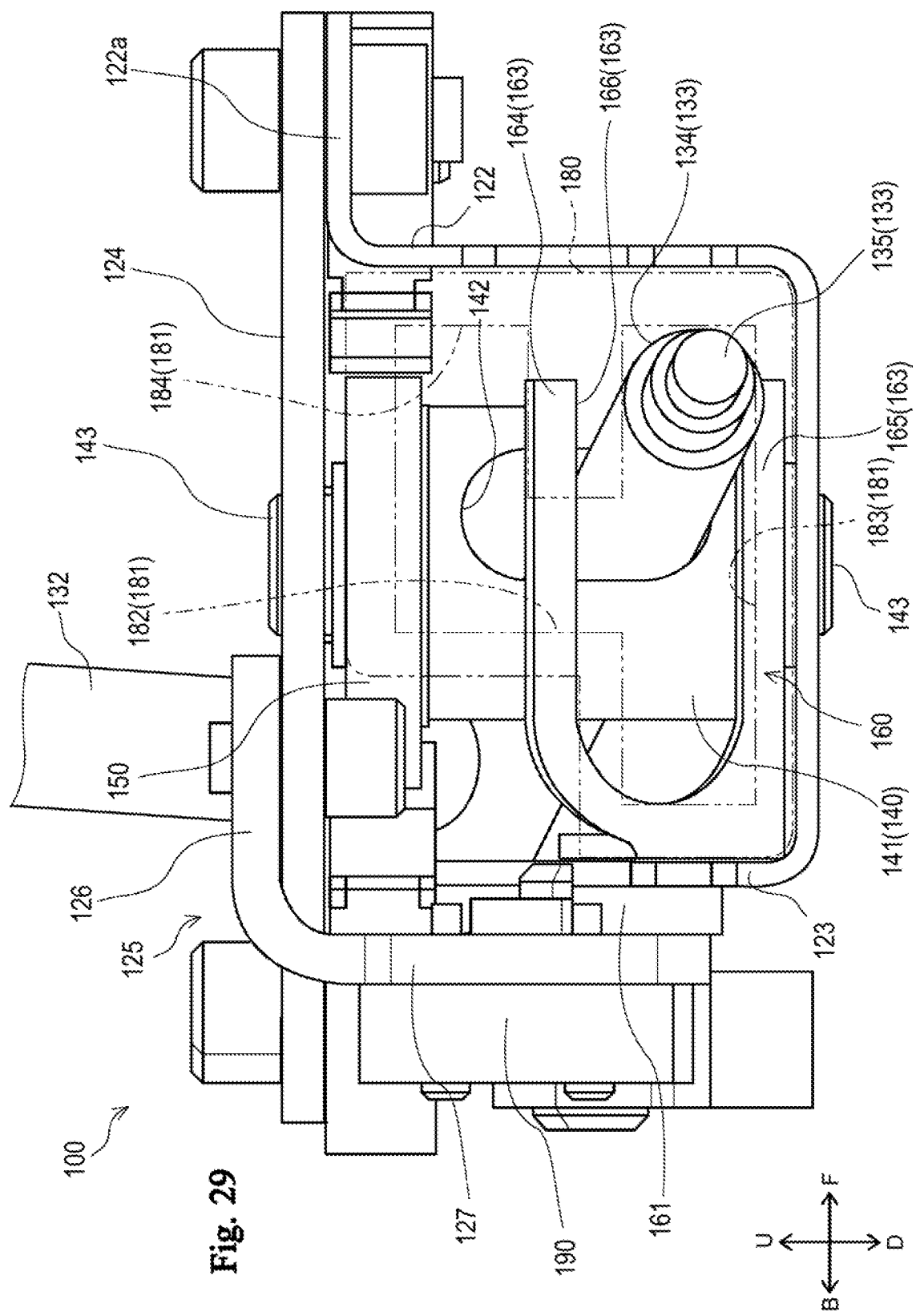
FIG. 29 is a side view illustrating the operation device in a backward position.

Hereinafter, a state in which the operation lever 130 is moved rearward from the rotation allowable position as illustrated in FIGS. 29 and 17 will be described as a backward position. In this state, the protrusion 135 is positioned at the front end portion (the position indicated by E in FIG. 23) of the first front-rear guide recess 183.

Figure 30:
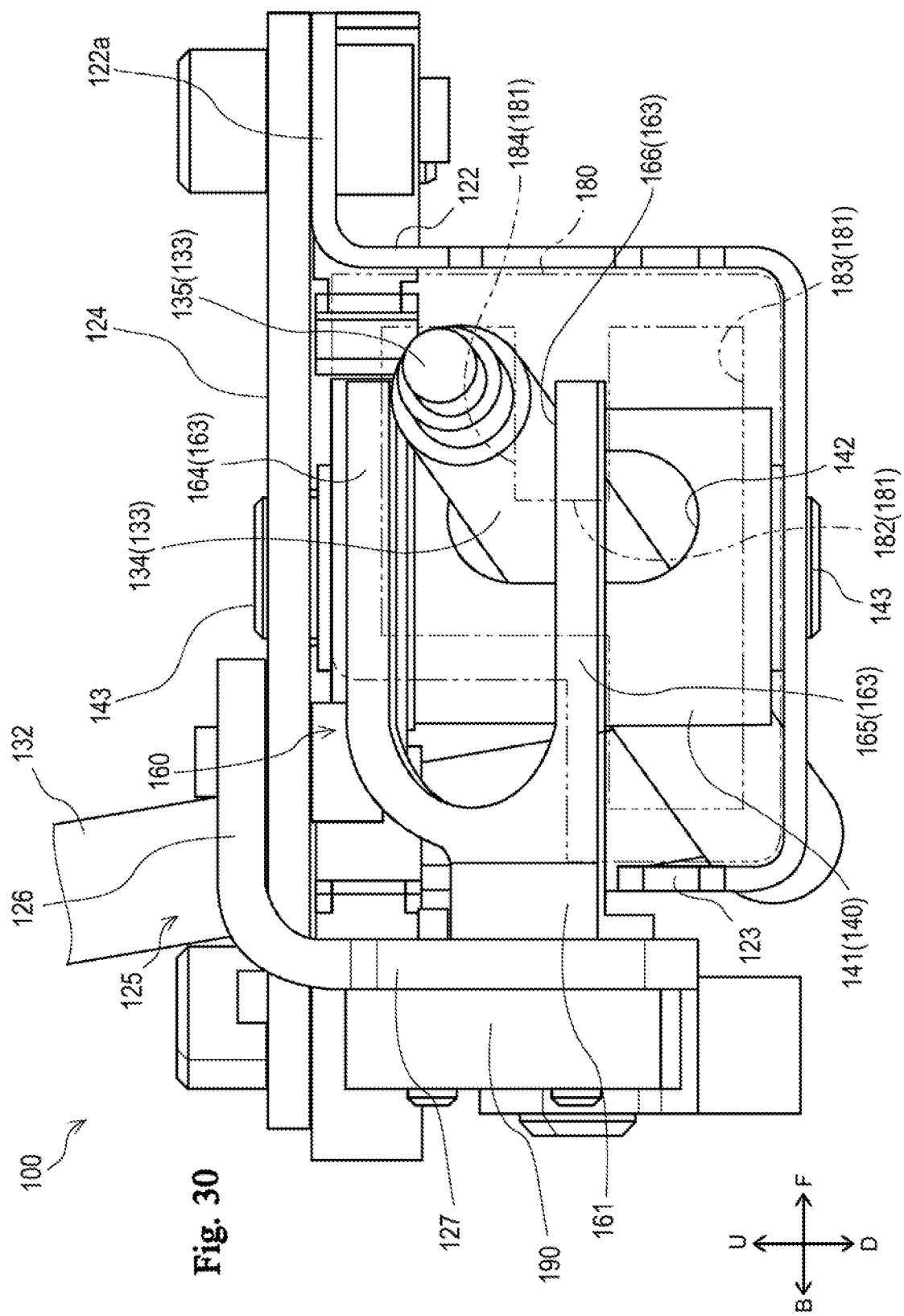
FIG. 30 is a side view illustrating the operation device in a parking position.
Figure 31:
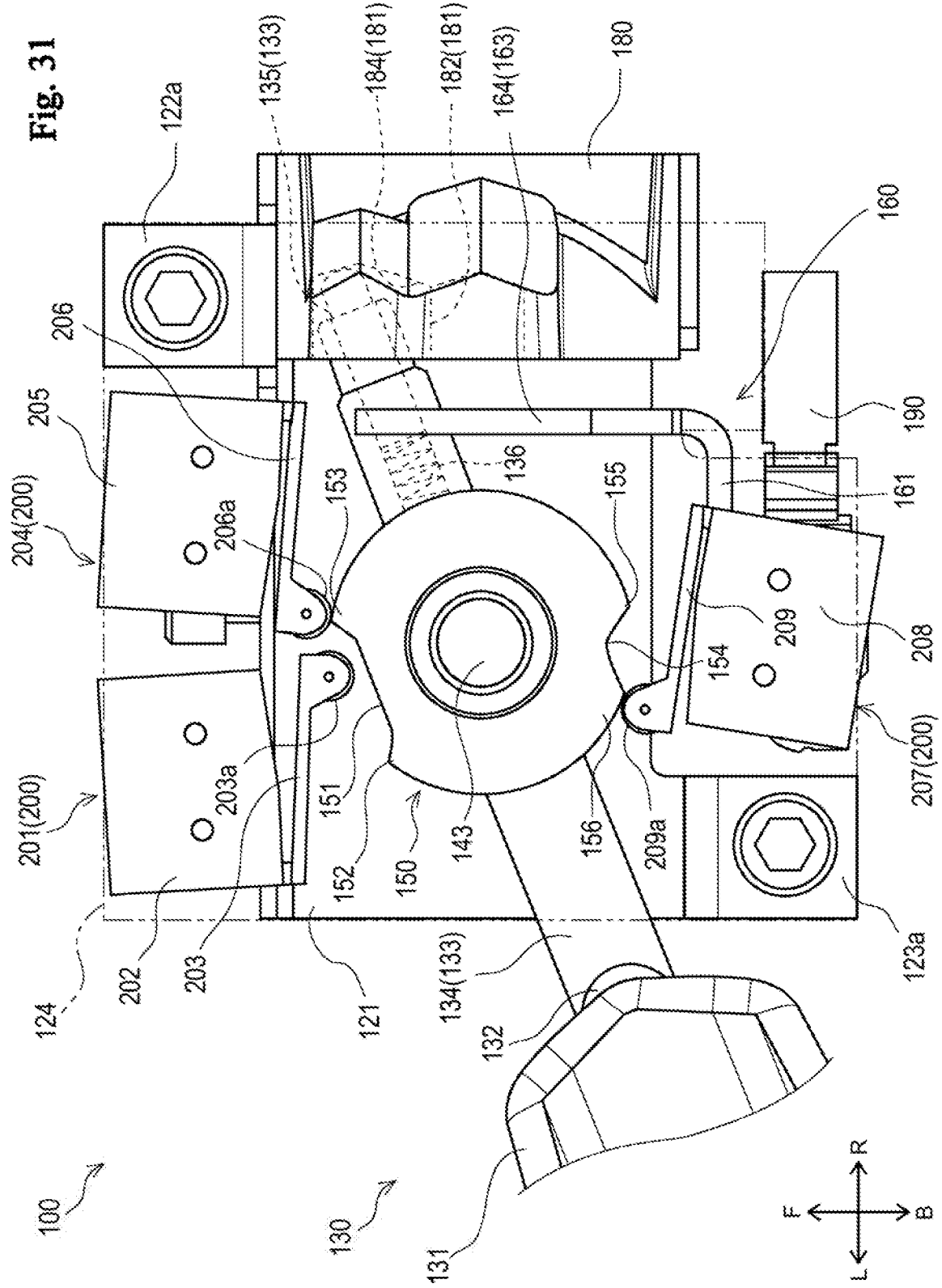
FIG. 31 is a plan view illustrating the operation device in the parking position.

In the following, a state in which the operation lever 130 is moved rearward from the neutral position as illustrated in FIGS. 30 and 31 will be described as a parking position. In this state, the protrusion 135 is positioned at the front end portion (the position indicated by F in FIG. 23) of the second front-rear guide recess 184.

The control device 210 illustrated in FIG. 2 executes control for switching the transmission 7 among the neutral state, the forward state, the backward state, and the parking state based on the switching operation through the operation lever 130. The control device 210 includes a storage unit, an arithmetic processing unit, and the like. The control device 210 is disposed at a predetermined position inside the tractor 1. The control device 210 is electrically connected to the neutral switch portion 190, the forward/backward switch portion 200, the side operation tool 9b, and the transmission 7 through predetermined signal lines.

The control device 210 executes a control for switching the transmission 7 among the neutral state, the forward state, the backward state, and the parking state by controlling a predetermined control valve based on the detection of the neutral switch portion 190 and the forward/backward switch portion 200. Incidentally, the control for setting the transmission 7 in the neutral state, the forward state, and the backward state is the same as in the first embodiment, and the description thereof will be omitted.

Further, when the control device 210 detects the pressing of the neutral switch portion 190, the backward switch portion 204, and the common switch portion 207, the control device 210 executes a control to set the transmission 7 in the parking state. Also in this case, similarly to the forward state and the backward state, the control device 210 can detect that either the backward switch portion 204 or the common switch portion 207 is malfunctioning.

The control device 210 can execute a control for switching the transmission 7 to the forward state or the backward state by the switching operation through the changeover switch provided on the side operation tool 9b. That is, in this embodiment, the transmission 7 can be switched by either the operation using the operation lever 130 or the operation through the changeover switch.

Hereinafter, an operation mode by the operation device 100 will be described.

Figure 22:
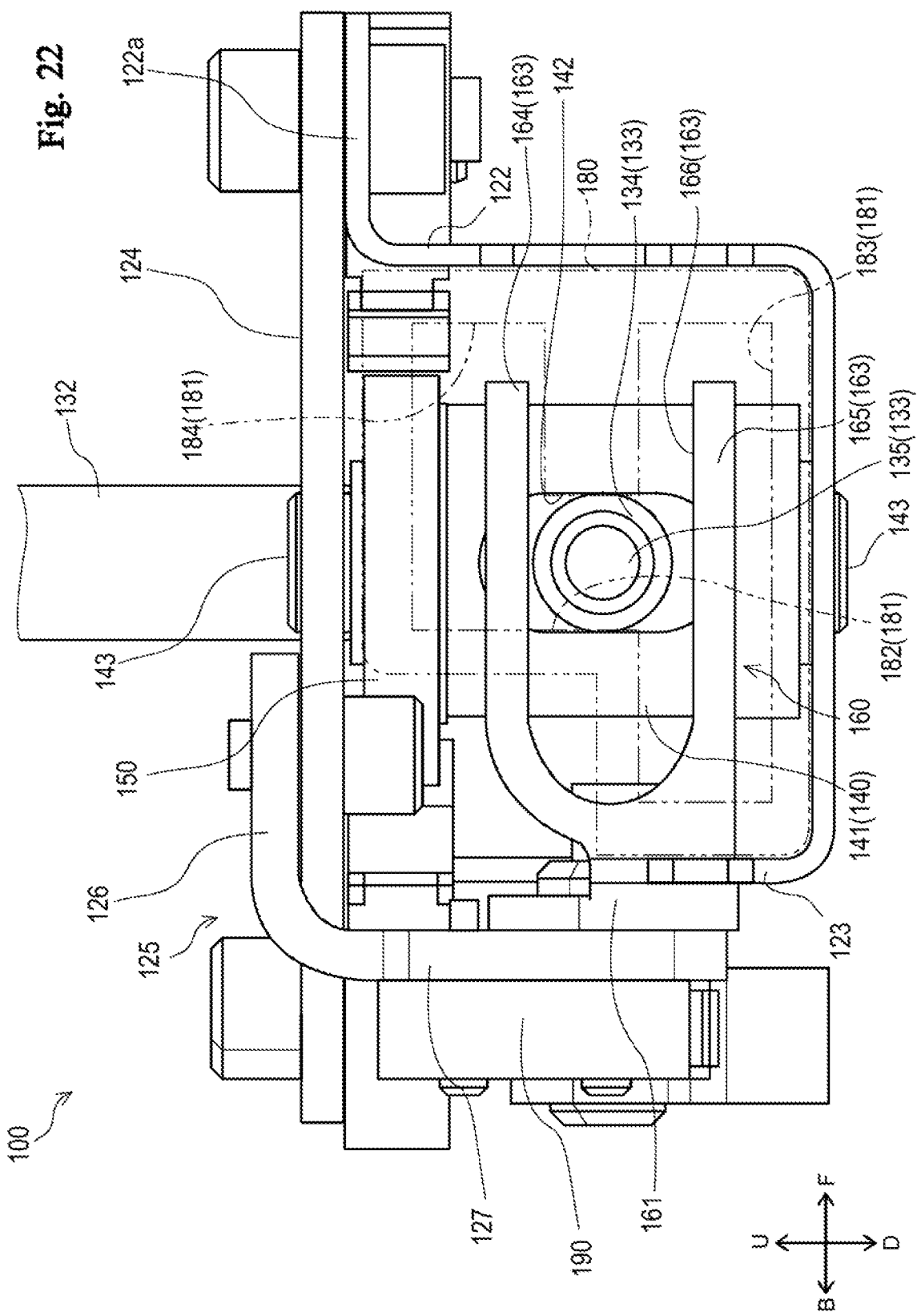
FIG. 22 is a side view illustrating the operation device in an initial position.
Figure 23:
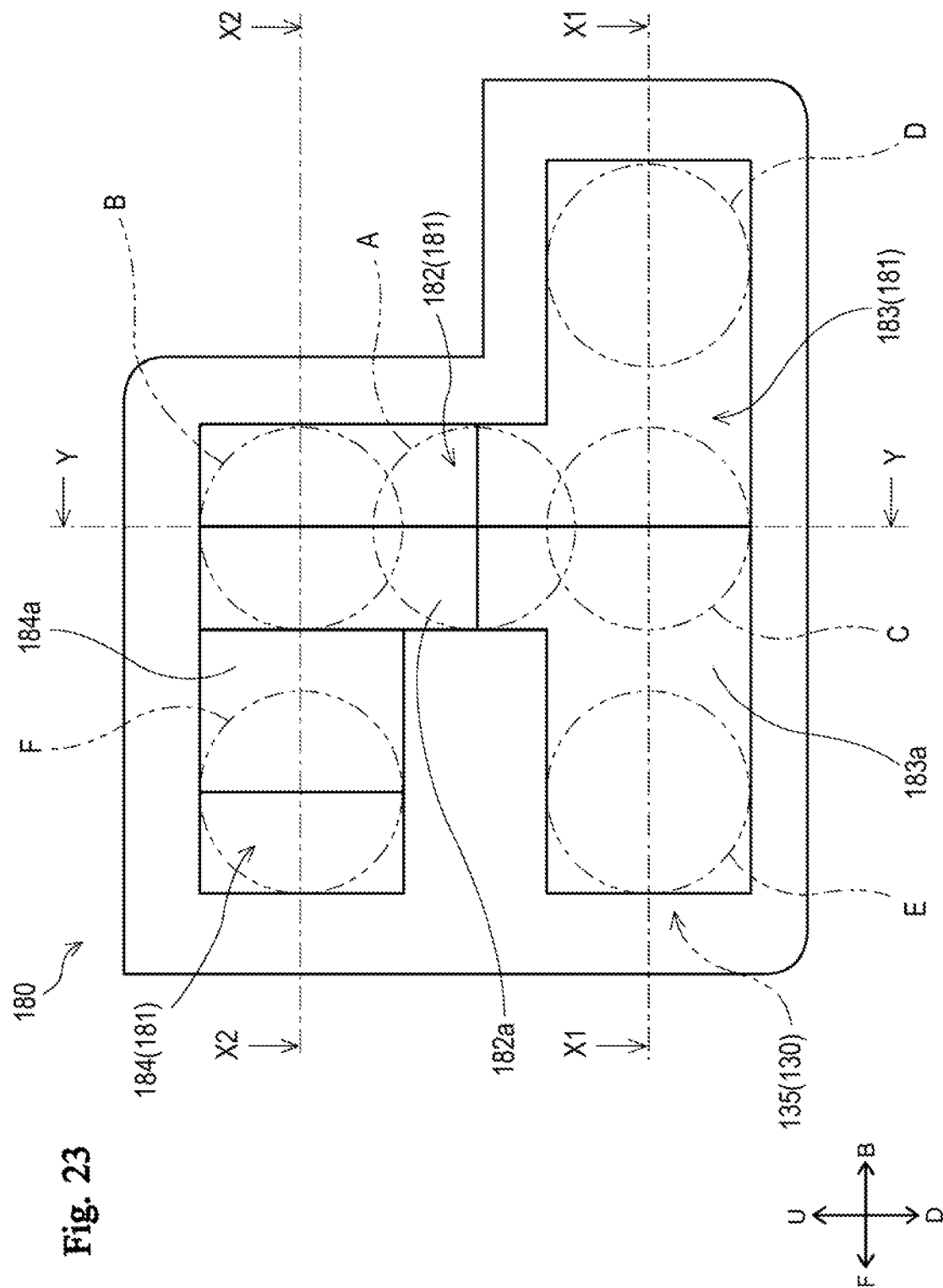
FIG. 23 is a side view illustrating a guide portion.

As illustrated in FIGS. 6, 8, and 22, when the operation lever 130 is in the initial position, the roller portion 192a of the neutral switch portion 190 is received in the recess 171 of the neutral cam portion 170. Further, as illustrated in FIG. 6, the roller portion 203a of the forward switch portion 201 and the roller portion 206a of the backward switch portion 204 are received in the first recess 151 of the forward/backward cam portion 150. Further, the roller portion 209a of the common switch portion 207 is received in the second recess 154. In this state, neither the neutral switch portion 190 nor the forward/backward switch portion 200 is pressed.

As illustrated in FIGS. 9 and 26, when the operation lever 130 is rotated downward about the vertical rotation shaft portion 144 to be in the neutral position, the second shaft portion 133 of the operation lever 130 presses the upper piece 164 of the receiving piece 163 of the neutral transmission portion 160. Accordingly, the upper piece 164 receives a force due to the rotation of the second shaft portion 133, and the neutral transmission portion 160 rotates about the rotation shaft portion 162 following the rotation of the operation lever 130.

When the neutral cam portion 170 rotates about the rotation shaft portion 162 with the rotation of the neutral transmission portion 160, the pressing portion 172 moves rightward to be displaced to a neutral pressing position of pressing the roller portion 192a of the neutral switch portion 190.

Further, as illustrated in FIG. 27, when the operation lever 130 is rotated upward about the vertical rotation shaft portion 144 to be in the rotation allowable position, the second shaft portion 133 of the operation lever 130 presses the lower piece 165 of the neutral transmission portion 160. Accordingly, the lower piece 165 receives a force due to the rotation of the second shaft portion 133, and the neutral transmission portion 160 rotates about the rotation shaft portion 162 following the rotation of the operation lever 130. In this state, the operation lever 130 can rotate in the front-rear rotation direction.

As illustrated in FIGS. 28 and 15, when the operation lever 130 in the rotation allowable position is rotated forward about the front-rear rotation shaft portion 143 to be in the forward position, the forward/backward transmission portion 140 receives a force due to the rotation through the vertical rotation shaft portion 144 and rotates about the front-rear rotation shaft portion 143 following the rotation of the operation lever 130.

When the forward/backward cam portion 150 rotates about the front-rear rotation shaft portion 143 following the rotation of the forward/backward transmission portion 140, the forward/backward cam portion 150 is displaced to the forward pressing position where the first forward pressing portion 152 of the forward/backward cam portion 150 presses the roller portion 203a of the forward switch portion 201 and the second forward pressing portion 155 of the forward/backward cam portion 150 presses the roller portion 209a of the common switch portion 207.

As illustrated in FIGS. 29 and 17, when the operation lever 130 in the rotation allowable position is rotated rearward about the front-rear rotation shaft portion 143 to be in the backward position, the forward/backward transmission portion 140 receives a force due to the rotation through the vertical rotation shaft portion 144 and rotates about the front-rear rotation shaft portion 143 following the rotation of the operation lever 130.

When the forward/backward cam portion 150 rotates about the front-rear rotation shaft portion 143 following the rotation of the forward/backward transmission portion 140, the forward/backward cam portion 150 is displaced to the backward pressing position where the first backward pressing portion 153 of the forward/backward cam portion 150 presses the roller portion 206a of the backward switch portion 204 and the second backward pressing portion 156 of the forward/backward cam portion 150 presses the roller portion 209a of the common switch portion 207.

In a state where the operation lever 130 is positioned at any one of the neutral position, the forward position and the backward position, with the rotation of the operation lever 130, the protrusion 135 abutting on the vertical guide inclined portion 182a or the first front-rear guide inclined portion 183a moves in the main body 134 against the urging force of the urging portion 136.

when a hand is released from the grip portion 131 of the operation lever 130 to release the operation, the protrusion 135 protrudes due to the urging force of the urging portion 136, and the protrusion 135 is guided to the vertically central portion of the vertical guide recess 182 by the vertical guide inclined portion 182a or the first front-rear guide inclined portion 183a, so that the operation lever 130 is returned to the initial position. Accordingly, the pressure of the neutral switch portion 190 and the forward/backward switch portion 200 is released in each operation by the operation lever 130.

With the above-described configuration, for example, even in a case where an operation of switching the transmission 7 to the forward state or the backward state is performed through the operation lever 130, and then the switching of the transmission 7 is performed through the side operation tool 9b, it is possible to suppress inconsistency between the operation through the operation lever 130 and the actual state of the transmission 7. That is, in an operation device different from the above-described configuration, in a case where the operation lever 130 is moved to a predetermined position and then held (locked) at the predetermined position without returning to the initial position, for example, in a case where the operation lever 130 is moved to the forward position and then the transmission 7 is switched to the backward state through the side operation tool 9b, inconsistency (mismatch) occurs between the operation through the operation lever 130 and the actual state of the transmission 7. On the other hand, according to the operation device 100, it is possible to suppress the occurrence of inconsistency between the operation through the operation lever 130 and the actual state of the transmission 7 as described above.

As illustrated in FIGS. 30 and 31, by rotating the operation lever 130 at the neutral position rearward about the front-rear rotation shaft portion 143, the operation lever 130 can be positioned at the parking position. At this time, with the rotation of the operation lever 130, the protrusion 135 abutting on the vertical guide inclined portion 182a moves in the main body 134 against the urging force of the urging portion 136.

When the protrusion 135 moves over the ridge at the boundary between the vertical guide inclined portion 182a and the second front-rear guide inclined portion 184a with the rotation of the operation lever 130, the protrusion 135 protrudes due to the urging force of the urging portion 136, and the protrusion 135 is guided to the central portion of the second front-rear guide recess 184 in the front-rear direction, so that the operation lever 130 is positioned at the parking position. In this state, the operation lever 130 is held at the parking position.

When the operation lever 130 is at the parking position, similarly to the backward position, the forward/backward transmission portion 140 receives a force due to the rotation through the vertical rotation shaft portion 144 and rotates about the front-rear rotation shaft portion 143 following the rotation of the operation lever 130. Accordingly, the forward/backward cam portion 150 is displaced to the backward pressing position in a state where the neutral cam portion 170 is displaced to the neutral pressing position.

By rotating the operation lever 130 at the parking position forward about the front-rear rotation shaft portion 143, the operation lever 130 can return to the initial position.

With the above configuration, when the operation lever 130 is moved to any one of the neutral position, the forward position, and the backward position, after the operation, the operation lever can return to the initial position. When the operation lever 130 is moved to the parking position, the operation lever 130 can be held in a state where the operation lever 130 is positioned at the parking position. Accordingly, it is possible to selectively use a mode in which the operation lever 130 is moved to an appropriate position for each operation or a mode in which the operation lever 130 is held at an appropriate position, thereby improving operability.

The outline of the disclosure is listed below based on the above embodiments.

The technique of an operation device capable of switching a transmission of a work vehicle is known. For example, the technique is as described in JP 2018-188080 A.

JP 2018-188080 A describes a shift operation device capable of performing an operation of switching a transmission mechanism of a tractor among forward, reverse, and neutral. The shift operation device is capable of switching a transmission by moving an operation tool to a desired shift position.

In the shift operation device described in JP 2018-188080 A, after the operation tool is moved to a desired shift position, the operation tool is held (locked) in a state where the operation tool is positioned at the desired shift position.

In the operation device capable of switching the transmission of the work vehicle as described above, it is expected that the operation through the operation tool is performed many times during the operation, and thus, further improvement in operability is desired.

The disclosure has been made in view of the above situation, and a problem to be solved is to provide an operation device and a work vehicle that can improve operability.

An operation device 100 according to the embodiment of the disclosure is capable of switching operation of a transmission 7 of a tractor 1 (work vehicle). The operation device 100 includes: an operation lever 130 that is movable to a plurality of operation positions; and a movement holding portion (a second shaft portion 133, an urging portion 136, and a guide recess 181) that moves the operation lever 130 to the initial position when the operation lever 130 is positioned at a neutral position, a forward position and a backward position (first operation position) among the plurality of operation positions and holds the operation lever 130 in a state where the operation lever is positioned at a parking position (second operation position) when the operation lever 130 is positioned at the parking position.

With such a configuration, the operability can be improved. That is, when the operation lever 130 is moved to the neutral position, the forward position, or the backward position, after the operation, the operation lever 130 can return to the initial position. Further, when the operation lever 130 is moved to the parking position, the operation lever 130 can be held in a state where the operation lever 130 is positioned at the parking position. Accordingly, it is possible to selectively use a mode in which the operation lever 130 is moved to an appropriate position for each operation or a mode in which the operation lever 130 is held at an appropriate position, thereby improving the operability of the operation device 100.

The movement holding portion includes a second shaft portion 133 (extendable portion) that is provided on the operation lever 130 and is expandable, a guide recess 181 (recess) that receives a tip portion of the second shaft portion 133 (extendable portion) in an extension direction, and an urging portion 136 that urges the second shaft portion 133 to extend such that the tip portion in the extension direction abuts on the guide recess 181. The second shaft portion 133 includes a vertical guide inclined portion 182a and a first front-rear guide inclined portion 183a (first inclined portion) that guide the second shaft portion 133 such that the operation lever 130 positioned at the neutral position, the forward position, or the backward position is moved to the initial position, and a second front-rear guide inclined portion 184a (second inclined portion) that guides the second shaft portion 133 such that the operation lever 130 positioned at the parking position is held at the parking position.

With this configuration, the operation device 100 can have a relatively simple configuration. That is, the operation lever 130 can be moved to an appropriate position or held at an appropriate position with a simple configuration in which the second shaft portion 133 is pressed against the guide recess 181.

The guide recess 181 guides the movement of the operation lever 130 to a plurality of operation positions.

With this configuration, the number of members of the operation device 100 can be relatively reduced. That is, the guide portion 180 can be provided with a function of guiding the operation lever 130, a function of moving the operation lever 130 to an appropriate position, or a function of holding the operation lever 130 at an appropriate position. Accordingly, since it is not necessary to provide devices each having the above functions, the number of members of the operation device 100 can be relatively reduced.

The operation device 100 further includes: a control device 210 capable of executing a control for switching the transmission 7 between a predetermined shift state (a neutral state, a forward state, and a backward state) and a parking state. The control device 210 sets the transmission to the shift state (the neutral state, the forward state, and the backward state) based on movement of the operation lever 130 to the neutral position, the forward position, or the backward position, and the transmission 7 to the parking state based on movement of the operation lever 130 to the parking position.

When the transmission 7 is in a predetermined shift state (the neutral state, the forward state, and the backward state), the operation lever 130 returns to the initial position for each operation, and when the transmission 7 is in the parking state, the operation lever 130 can be held in a state where the operation lever 130 is positioned at the parking position.

The shift state includes a neutral state, a forward state, and a backward state. The first operation position includes a neutral position, a forward position, and a backward position. The control device 210 sets the transmission 7 to the neutral state based on movement of the operation lever 130 to the neutral position, the transmission 7 to the forward state based on movement of the operation lever 130 to the forward position, and the transmission 7 to the backward state based on movement of the operation lever 130 to the backward position.

For each operation of switching the transmission 7 among the neutral state, the forward state, and the backward state, the operation lever 130 can return to the initial position.

The operation lever 130 is rotatable in a vertical rotation direction (first rotation direction) about a vertical rotation shaft portion 144 (first rotation shaft) and rotatable in the front-rear rotation direction (second rotation direction) about the front-rear rotation shaft portion 143 (second rotation shaft) non-parallel to the vertical rotation shaft portion 144. The operation lever 130 is at a position rotated from the initial position to an upper side (one side in the first rotation direction) and is movable to a rotation allowable position where rotation about the front-rear rotation shaft portion 143 is possible. The forward position is a position rotated from the rotation allowable position to a front side (one side in the second rotation direction), the backward position is a position rotated from the rotation allowable position to a rear side (another side in the second rotation direction), the neutral position is a position rotated from the initial position to a lower side (another side in the first rotation direction), and a position where rotation about the second rotation shaft is possible, and the parking position is a position rotated from the neutral position to the rear side (the one side or the other side in the second rotation direction).

With such a configuration, the operability can be improved. In other words, by positioning the initial position at a substantially middle portion among the neutral position, the forward position, the backward position, and the parking position, the operation lever 130 can be easily moved from the initial position to each position, thereby improving the operability.

The operation device 100 further includes: a neutral cam portion 170 (first cam portion) that rotates following a rotation of the operation lever 130 in the vertical rotation direction; a forward/backward cam portion 150 (second cam portion) that rotates following a rotation of the operation lever 130 in the front-rear rotation direction; a neutral switch portion 190 (first switch portion) that is pressed by the neutral cam portion 170 and detects the pressing in a state where the neutral cam portion 170 is rotated to a predetermined position; and a forward/backward switch portion 200 (second switch portion) that is pressed by the forward/backward cam portion 150 and detects the pressing in a state where the forward/backward cam portion 150 is rotated to a predetermined position.

With such a configuration, the switching operation of the transmission 7 by the operation lever 130 can be performed through the predetermined cam portion and the switch portion.

The neutral transmission portion 160 (first transmission portion) is further provided which transmits the rotation of the operation lever 130 in the vertical rotation direction to the neutral cam portion 170 and does not transmit the rotation of the operation lever 130 in the front-rear rotation direction to the neutral cam portion 170.

With this configuration, the neutral cam portion 170 is prevented from following the rotation of the operation lever 130 in the front-rear rotation direction, and thus the unintended contact of the neutral switch portion 190 accompanying the rotation of the operation lever 130 in the front-rear rotation direction can be suppressed.

The operation device 100 further includes: a forward/backward transmission portion 140 (second transmission portion) that transmits the rotation of the operation lever 130 in the front-rear rotation direction to the forward/backward cam portion 150 and does not transmit the rotation of the operation lever 130 in the vertical rotation direction to the forward/backward cam portion 150.

With this configuration, the forward/backward cam portion 150 is prevented from following the rotation of the operation lever 130 in the vertical rotation direction, and thus the unintended contact of the forward/backward switch portion 200 accompanying the rotation of the operation lever 130 in the front-rear rotation direction can be suppressed.

The tractor 1 according to this embodiment includes the operation device 100 according to this embodiment.

With such a configuration, operability can be improved.

The tractor 1 according to this embodiment is one embodiment of the work vehicle according to the disclosure.

The second shaft portion 133, the urging portion 136, and the guide recess 181 according to this embodiment are one embodiment of the movement holding portion according to the disclosure.

The neutral position, the forward position, and the backward position according to this embodiment are one embodiment of the first operation position according to the disclosure.

The parking position according to this embodiment is one embodiment of the second operation position according to the disclosure.

The second shaft portion 133 according to this embodiment is one embodiment of the extendable portion according to the disclosure.

The guide recess 181 according to this embodiment is one embodiment of the recess according to the disclosure.

The vertical guide inclined portion 182a and the first front-rear guide inclined portion 183a according to this embodiment are one embodiment of the first inclined portion according to the disclosure.

The second front-rear guide inclined portion 184a according to this embodiment is one embodiment of the second inclined portion according to the disclosure.

The vertical rotation shaft portion 144 according to this embodiment is an embodiment of the first rotation shaft according to the disclosure.

The front-rear rotation shaft portion 143 according to this embodiment is an embodiment of the second rotation shaft according to the disclosure.

The vertical rotation direction according to this embodiment is an embodiment of the first rotation direction according to the disclosure.

The front-rear rotation direction according to this embodiment is an embodiment of the second rotation direction according to the disclosure.

The neutral cam portion 170 according to this embodiment is an embodiment of the first cam portion according to the disclosure.

The forward/backward cam portion 150 according to this embodiment is an embodiment of the second cam portion according to the disclosure.

The neutral switch portion 190 according to this embodiment is an embodiment of the first switch portion according to the disclosure.

The forward/backward switch portion 200 according to this embodiment is an embodiment of the second switch portion according to the disclosure.

The neutral transmission portion 160 according to this embodiment is an embodiment of the first transmission portion according to the disclosure.

The forward/backward transmission portion 140 according to this embodiment is an embodiment of the second transmission portion according to the disclosure.

As described above, the first embodiment of the disclosure has been described. However, the disclosure is not limited to the above configuration, and various changes can be made within the scope of the disclosure described in the claims.

For example, in this embodiment, the operation device 100 switches the transmission 7 among the neutral state, the forward state, the backward state, and the parking state, but is not limited to such an embodiment. For example, the transmission 7 may be switched to another shift state.

In this embodiment, the example has been described in which the forward/backward switch portion 200 is configured by the three switch portions of the forward switch portion 201, the backward switch portion 204, and the common switch portion 207, but the disclosure is not limited to such an embodiment. For example, the forward/backward switch portion 200 may be configured by the forward switch portion 201 and the backward switch portion 204.

In this embodiment, an example has been described in which the parking position is a position where the operation lever 130 is moved rearward from the neutral position, but the parking position is not limited to such an embodiment. For example, the parking position may be a position where the operation lever 130 is moved forward from the neutral position.

In this embodiment, an example has been described in which the operation lever 130 can be moved to any one of the neutral position, the forward position, the backward position, and the parking position, but the disclosure is not limited to such an embodiment. For example, in addition to the above positions, a new position where the operation lever 130 can move may be added.

For example, it is conceivable to provide the new position in front of the neutral position. In this case, the guide portion 180 has a shape that allows the operation lever 130 to move to the new position. In this case, similarly to the neutral position, the forward position, and the backward position, the operation lever 130 at the new position may be guided to return to the initial position, and similarly to the parking position, the operation lever 130 at the new position may be configured to be held at the new position.

Incidentally, when the number of the new positions to which the operation lever 130 can move is increased, the operation lever 130 is not limited to the configuration in which the operation lever 130 can be moved from the neutral position as described above. For example, the operation lever 130 may be configured to be movable in the front-rear rotation direction in a state where the operation lever 130 is positioned further below the neutral position, or in a state where the operation lever 130 is positioned further above the rotation allowable position. In this case, a switch portion capable of detecting the position of the operation lever 130 may be further provided.

In this embodiment, an example has been described in which the second front-rear guide inclined portion 184a is provided in the second front-rear guide recess 184 of the guide portion 180, so that the operation lever 130 is held in a state where the operation lever 130 is positioned at the parking position. However, the disclosure is not limited to such an embodiment. For example, a lock mechanism that holds the operation lever 130 in a state where the operation lever 130 is positioned at the parking position may be provided separately from the guide portion 180.

As the lock mechanism, for example, a mechanism may be adopted which switches between regulation and permission of the movement of the operation lever 130 positioned at the parking position toward the neutral position under the control of the control device 210. In this case, as the lock mechanism, a configuration may be adopted in which the movement of the operation lever 130 is regulated by making a predetermined regulating portion protrude to be positioned on a movement trajectory of the operation lever 130 at the parking position toward the neutral position side. In this case, the movement of the operation lever 130 is allowed by releasing the regulation by the regulating portion.

In this case, a configuration may be adopted in which the movement of the operation lever 130 is regulated by the lock mechanism with the movement of the operation lever 130 from the neutral position to the parking position as a trigger. In this case, a configuration may be adopted in which the movement of the operation lever 130 is allowed by the lock mechanism with a depression operation of a brake pedal or an operation by a predetermined button as a trigger. Accordingly, it is possible to suppress unintended movement of the operation lever 130 at the parking position to the neutral position side.

What is claimed is:
1. An operation device capable of switching operation of a transmission of a work vehicle, comprising:
an operation lever that is rotatable in a first rotation direction about a first rotation shaft and rotatable in a second rotation direction about a second rotation shaft non-parallel to the first rotation shaft;

an urging portion that urges the operation lever to move to a predetermined initial position;

a first cam portion that rotates following a rotation of the operation lever in the first rotation direction;

a second cam portion that rotates following a rotation of the operation lever in the second rotation direction;

a first switch portion that is pressed by the first cam portion and detects the pressing in a state where the first cam portion is rotated to a predetermined position; and a second switch portion that is pressed by the second cam portion and detects the pressing in a state where the second cam portion is rotated to a predetermined position.

2. The operation device as claimed in claim 1, further comprising:

a first transmission portion that transmits the rotation of the operation lever in the first rotation direction to the first cam portion and does not transmit the rotation of the operation lever in the second rotation direction to the first cam portion.

3. The operation device as claimed in claim 2, wherein the first transmission portion includes a first receiving portion that moves following the rotation of the operation lever by receiving a force due to the rotation of the operation lever in the first rotation direction and does not receive a force due to the rotation of the operation lever in the second rotation direction, and a first cam portion fixing portion that is rotatably supported with a movement of the first receiving portion and to which the first cam portion is fixed.

4. The operation device as claimed in claim 2, further comprising:

a second transmission portion that transmits the rotation of the operation lever in the second rotation direction to the second cam portion and does not transmit the rotation of the operation lever in the first rotation direction to the second cam portion.

5. The operation device as claimed in claim 4, wherein the second transmission portion includes a second receiving portion that moves following the rotation of the operation lever by receiving a force due to the rotation of the operation lever in the second rotation direction and supports the operation lever to be rotatable in the first rotation direction, and a second cam portion fixing portion that is rotatably supported with a movement of the second receiving portion and to which the second cam portion is fixed.

6. The operation device as claimed in claim 1, wherein the second switch portion includes a first cam position detection switch portion that detects pressing by the second cam portion rotated to a first cam position, a second cam position detection switch portion that detects pressing by the second cam portion rotated to a second cam position, and a common switch portion that detects pressing by the second cam portion rotated to the first cam position and pressing by the second cam portion rotated to the second cam position.

7. The operation device as claimed in claim 6, wherein the second cam portion includes a first pressing portion that presses the first cam position detection switch portion, a second pressing portion that presses the second cam position detection switch portion, and a recess that is formed between the first pressing portion and the second pressing portion and avoids contact with the first cam position detection switch portion and the second cam position detection switch portion in a state where the operation lever is positioned at the initial position.

8. The operation device as claimed in claim 1, wherein the operation lever is displaceable to a first position positioned on one side in the first rotation direction from the initial position, a rotation allowable position that is positioned on another side in the first rotation direction from the initial position and in which rotation about the second rotation shaft is possible, a second position that is positioned on one side in the second rotation direction from the rotation allowable position, and a third position that is positioned on another side in the second rotation direction from the rotation allowable position, the first switch portion detects pressing of the first cam portion in a state where the operation lever is positioned at the first position, and the second switch portion detects pressing of the second cam portion in a state where the operation lever is positioned at the second position and pressing of the second cam portion in a state where the operation lever is positioned at the third position.

9. The operation device as claimed in claim 8, further comprising:

a control device capable of executing a control for switching the transmission among a neutral state, a forward state, and a backward state, wherein the control device sets the transmission to the neutral state based on detection of the pressing of the first cam portion in a state where the operation lever is positioned at the first position, the transmission to the forward state based on detection of the pressing of the second cam portion in a state where the operation lever is positioned at the second position, and the transmission to the backward state based on detection of the pressing of the second cam portion in a state where the operation lever is positioned at the third position.

10. The operation device as claimed in claim 8, wherein the operation lever is rotatable about the second rotation shaft at a position different from the rotation allowable position.

11. The operation device as claimed in claim 1, wherein the operation lever is movable to a plurality of operation positions, the operation device further comprising:

a movement holding portion that moves the operation lever to the initial position when the operation lever is positioned at a first operation position among the plurality of operation positions and holds the operation lever in a state where the operation lever is positioned at a second operation position when the operation lever is positioned at the second operation position.

12. The operation device as claimed in claim 11, wherein the movement holding portion includes an extendable portion that is provided on the operation lever and is expandable, and a recess that receives a tip portion of the extendable portion in an extension direction, the urging portion urges the extendable portion to extend such that the tip portion in the extension direction abuts on the recess, and the recess includes a first inclined portion that guides the extendable portion such that the operation lever positioned at the first operation position is moved to the initial position, and a second inclined portion that guides the extendable portion such that the operation lever positioned at the second operation position is held at the second operation position.

13. The operation device as claimed in claim 12, wherein the recess guides a movement of the operation lever to the plurality of operation positions.

14. The operation device as claimed in claim 11, further comprising:

a control device capable of executing a control for switching the transmission between a predetermined shift state and a parking state, wherein the control device sets the transmission to the shift state based on a movement of the operation lever to the first operation position, and the transmission to the parking state based on a movement of the operation lever to the second operation position.

15. The operation device as claimed in claim 14, wherein the shift state includes a neutral state, a forward state, and a backward state, the first operation position includes a neutral position, a forward position, and a backward position, and the control device sets the transmission to the neutral state based on a movement of the operation lever to the neutral position, the transmission to the forward state based on a movement of the operation lever to the forward position, and the transmission to the backward state based on a movement of the operation lever to the backward position.

16. The operation device as claimed in claim 15, wherein the operation lever is at a position rotated from the initial position to one side in the first rotation direction and is movable to a rotation allowable position where rotation about the second rotation shaft is possible, the forward position is a position rotated from the rotation allowable position to one side in the second rotation direction, the backward position is a position rotated from the rotation allowable position to another side in the second rotation direction, the neutral position is a position rotated from the initial position to another side in the first rotation direction, and a position where rotation about the second rotation shaft is possible, and the second operation position is a position rotated from the neutral position to the one side or the other side in the second rotation direction.

17. The operation device as claimed in claim 11, further comprising:

a first transmission portion that transmits the rotation of the operation lever in the first rotation direction to the first cam portion and does not transmit the rotation of the operation lever in the second rotation direction to the first cam portion.

18. The operation device as claimed in claim 17, further comprising:

a second transmission portion that transmits the rotation of the operation lever in the second rotation direction to the second cam portion and does not transmit the rotation of the operation lever in the first rotation direction to the second cam portion.

19. A work vehicle comprising the operation device as claimed in claim 1.

* * * * *